United States Patent
Campbell et al.

(10) Patent No.: US 11,880,894 B2
(45) Date of Patent: Jan. 23, 2024

(54) SYSTEMS AND METHODS FOR ECOSYSTEM CREDIT RECOMMENDATIONS

(71) Applicant: Indigo Ag, Inc., Boston, MA (US)

(72) Inventors: Eleanor Elizabeth Campbell, Carbondale, CO (US); Jacob S. McDonald, Reading, MA (US); Aaron J. Goodman, Cambridge, MA (US); Michael J. Salib, Cambridge, MA (US); Elisabeth F. Baldo, Cambridge, MA (US); Keith F. Ma, Cambridge, MA (US); Daniel Michael Stack, Marlborough, MA (US); Erich J. Treischman, Concord, MA (US); Melissa Motew, Madison, WI (US); Samuel J. Peters, Jamaica Plain, MA (US); Christopher K. Black, Goleta, CA (US); Ram B. Gurung, Fort Collins, CO (US); Charles D. Brummitt, Seattle, WA (US); Brian D. Segal, Washington, DC (US); David P. Smart, Andover, MA (US); Ashok A. Kumar, Malden, MA (US); Barclay Rowland Rogers, Memphis, TN (US); Maria Belousova, Milford, CT (US); Jyoti Shankar, Jersey City, NJ (US); Christopher Mark Harbourt, Saint Joseph, IL (US); Ronald W. Hovsepian, Boston, MA (US); Amit R. Menipaz, Newton, MA (US); Joseph Weeks, St. Petersburg, FL (US); Samantha Horvath, Champaign, IL (US)

(73) Assignee: INDIGO AG, INC., Charlestown, MA (US)

( * ) Notice: Subject to any disclaimer, the term of this patent is extended or adjusted under 35 U.S.C. 154(b) by 0 days.

(21) Appl. No.: 17/900,428

(22) Filed: Aug. 31, 2022

(65) Prior Publication Data

US 2023/0078852 A1    Mar. 16, 2023

Related U.S. Application Data

(60) Provisional application No. 63/345,461, filed on May 25, 2022, provisional application No. 63/318,993, (Continued)

(51) Int. Cl.
  G06Q 50/02     (2012.01)
  G06F 16/29     (2019.01)
  G06Q 30/018    (2023.01)

(52) U.S. Cl.
  CPC .............. *G06Q 50/02* (2013.01); *G06F 16/29* (2019.01); *G06Q 30/018* (2013.01); *G06Q 2220/00* (2013.01)

(58) Field of Classification Search
  CPC .. G06Q 50/02; G06Q 30/018; G06Q 2220/00; G06F 16/29
  See application file for complete search history.

(56) References Cited

U.S. PATENT DOCUMENTS

| 1,119,501 A | 12/1914 | Elvin et al. |
| 4,674,044 A | 6/1987 | Kalmus et al. |

(Continued)

FOREIGN PATENT DOCUMENTS

| EP | 1389767 | 2/2004 |
| EP | 3046066 A1 | 7/2016 |

(Continued)

OTHER PUBLICATIONS

Kasi "A Framework and System for a Multi-Model Decision Aid for Sustainable Farming Practice", May 2010, ProQuest. pp. 1-142 (Year: 2010).*

(Continued)

*Primary Examiner* — Romain Jeanty
(74) *Attorney, Agent, or Firm* — Fenwick & West LLP

(57) ABSTRACT

Systems, methods, and computer program products for recommending ecosystem credit tokens based on modelled (Continued)

outcomes are provided. In various embodiments, field data comprising geospatial boundaries of one or more field are received. One or more methodology is accessed. For each of the one or more fields, one or more farming practice is accessed, wherein each farming practice comprises a location and time. For each of the one or more fields, for each crop production period, an ecosystem attribute is generated by applying one or more ecosystem attribute quantification methods to each spatially and temporally unique set of one or more farming practices. Selection of one or more program is optimized for each field based on the set of selected programs being compatible within the field and production period.

18 Claims, 34 Drawing Sheets

Related U.S. Application Data filed on Mar. 11, 2022, provisional application No. 63/304,431, filed on Jan. 28, 2022, provisional application No. 63/280,074, filed on Nov. 16, 2021, provisional application No. 63/239,150, filed on Aug. 31, 2021.

(56) References Cited

U.S. PATENT DOCUMENTS

| | | |
|---|---|---|
| 4,677,552 A | 6/1987 | Sibley, Jr. |
| 4,903,201 A | 2/1990 | Wagner et al. |
| 5,063,507 A | 11/1991 | Lindsey et al. |
| 5,077,665 A | 12/1991 | Silverman et al. |
| 5,136,501 A | 8/1992 | Silverman et al. |
| 5,285,383 A | 2/1994 | Lindsey et al. |
| 5,297,031 A | 3/1994 | Gutterman et al. |
| 5,706,442 A | 1/1998 | Anderson et al. |
| 5,715,402 A | 2/1998 | Popolo |
| 5,727,165 A | 3/1998 | Ordish et al. |
| 5,732,400 A | 3/1998 | Mandler et al. |
| 5,775,734 A | 7/1998 | George, Jr. |
| 5,787,156 A | 7/1998 | Katz |
| 5,794,207 A | 8/1998 | Walker et al. |
| 5,845,266 A | 12/1998 | Lupien et al. |
| 5,873,071 A | 2/1999 | Ferstenberg et al. |
| 5,884,286 A | 3/1999 | Daugherty, III |
| 5,924,082 A | 7/1999 | Silverman et al. |
| 5,930,767 A | 7/1999 | Reber et al. |
| 5,960,411 A | 9/1999 | Hartman et al. |
| 5,970,479 A | 10/1999 | Shepherd |
| 6,104,643 A | 1/2000 | Minton |
| 6,058,379 A | 5/2000 | Odom et al. |
| 6,131,087 A | 10/2000 | Luke et al. |
| 6,134,535 A | 10/2000 | Belzberg |
| 6,242,474 B1 | 8/2001 | Garcia |
| 6,317,728 B1 | 11/2001 | Kane |
| 6,338,050 B1 | 1/2002 | Conklin et al. |
| 6,390,472 B1 | 5/2002 | Vinarsky |
| 6,393,406 B1 | 5/2002 | Eder |
| 6,401,041 B1 | 5/2002 | Peterson |
| 6,418,419 B1 | 7/2002 | Nieboer et al. |
| 6,422,508 B1 | 7/2002 | Barnes |
| 6,584,451 B1 | 6/2003 | Shoham et al. |
| 6,598,027 B1 | 7/2003 | Breen et al. |
| 6,622,129 B1 | 9/2003 | Whitworth |
| 6,673,479 B2 | 1/2004 | McArthur et al. |
| 6,865,582 B2 | 3/2005 | Obradovic et al. |
| 6,988,083 B2 | 1/2006 | Dines et al. |
| 7,076,452 B2 | 7/2006 | Florence et al. |
| 7,080,034 B1 | 7/2006 | Reams |
| 7,318,045 B2 | 1/2008 | Baecker et al. |
| 7,349,879 B2 | 3/2008 | Alsberg et al. |
| 7,415,418 B2 | 8/2008 | Zimmerman |
| 7,418,423 B2 | 8/2008 | Reding et al. |
| 7,742,979 B2 | 6/2010 | Reding et al. |
| 7,974,853 B1 | 7/2011 | Zimmerman |
| 8,019,694 B2 | 9/2011 | Fell et al. |
| 8,965,812 B2 | 2/2015 | Linville |
| 9,113,590 B2 | 8/2015 | Johnson |
| 9,381,646 B1 | 7/2016 | Fryshman |
| 9,489,576 B2 | 11/2016 | Johnson et al. |
| 9,519,861 B1 | 12/2016 | Gates et al. |
| 9,563,945 B2 | 2/2017 | Fryshman |
| 9,582,002 B2 | 2/2017 | Cavender-Bares |
| 9,582,873 B2 | 2/2017 | Ulman |
| 9,629,306 B2 | 4/2017 | Sauder et al. |
| 9,652,840 B1 | 5/2017 | Shriver et al. |
| 9,658,201 B2 | 5/2017 | Redden et al. |
| 9,745,060 B2 | 8/2017 | O'Connor et al. |
| 9,756,844 B2 | 9/2017 | Groeneveld |
| 9,974,226 B2 | 5/2018 | Rupp et al. |
| RE46,968 E | 7/2018 | Linville |
| RE47,742 E | 11/2019 | Linville |
| 10,564,316 B2 | 2/2020 | Xu et al. |
| 11,069,005 B2 | 7/2021 | Ethington et al. |
| 11,100,579 B1 | 8/2021 | Raguse et al. |
| 11,170,453 B2 | 11/2021 | Perry et al. |
| 11,263,707 B2 | 3/2022 | Perry et al. |
| 11,367,093 B2 | 6/2022 | Perry et al. |
| 11,657,903 B2 | 5/2023 | McBratney et al. |
| 11,670,401 B2 | 6/2023 | McBratney et al. |
| 11,763,271 B2 * | 9/2023 | Ashtekar .............. G06Q 10/30 705/308 |
| 2001/0032162 A1 | 10/2001 | Alsberg et al. |
| 2001/0032165 A1 | 10/2001 | Friend et al. |
| 2001/0034663 A1 | 10/2001 | Teveler et al. |
| 2002/0025330 A1 | 1/2002 | May |
| 2002/0023038 A1 | 2/2002 | Fritsch et al. |
| 2002/0023039 A1 | 2/2002 | Fritsch et al. |
| 2002/0032644 A1 | 3/2002 | Corby et al. |
| 2002/0059091 A1 | 5/2002 | Hay et al. |
| 2002/0065765 A1 | 5/2002 | Shuler et al. |
| 2002/0087453 A1 | 7/2002 | Nicolaisen et al. |
| 2002/0095369 A1 | 7/2002 | Kaplan et al. |
| 2002/0120555 A1 | 8/2002 | Lerner |
| 2002/0138393 A1 | 9/2002 | Tatge |
| 2002/0147670 A1 | 10/2002 | Lange |
| 2002/0183867 A1 | 12/2002 | Gupta et al. |
| 2002/0184135 A1 | 12/2002 | Zakaria |
| 2002/0194115 A1 | 12/2002 | Nordicht et al. |
| 2003/0019408 A1 | 1/2003 | Fraisse et al. |
| 2003/0050901 A1 | 3/2003 | Jester et al. |
| 2003/0084791 A1 | 5/2003 | Trenhaile et al. |
| 2003/0186408 A1 | 10/2003 | Eaton et al. |
| 2003/0195822 A1 | 10/2003 | Tatge |
| 2003/0236738 A1 | 12/2003 | Lange et al. |
| 2004/0024648 A1 | 2/2004 | Tatge |
| 2005/0114252 A1 | 5/2005 | Beurskens |
| 2005/0137964 A1 | 6/2005 | Nordlicht et al. |
| 2005/0234691 A1 | 10/2005 | Singh et al. |
| 2006/0111845 A1 | 5/2006 | Forbis et al. |
| 2006/0259417 A1 | 11/2006 | Marynowski et al. |
| 2006/0271262 A1 | 11/2006 | McLain |
| 2008/0033864 A1 | 2/2008 | McDonough |
| 2008/0201255 A1 | 8/2008 | Green |
| 2008/0215167 A1 | 9/2008 | Beck |
| 2008/0313013 A1 | 12/2008 | Fell et al. |
| 2010/0106653 A1 | 4/2010 | Sandholm et al. |
| 2010/0114753 A1 | 5/2010 | Osmanski et al. |
| 2010/0332430 A1 | 12/2010 | Caraviello et al. |
| 2011/0208636 A1 | 8/2011 | Bachu et al. |
| 2011/0290873 A1 | 12/2011 | Nishiguchi et al. |
| 2012/0116943 A1 | 5/2012 | Abramson |
| 2012/0246050 A1 | 9/2012 | McNew |
| 2013/0197814 A1 | 8/2013 | McBratney et al. |
| 2013/0332205 A1 | 12/2013 | Friedberg et al. |
| 2014/0039967 A1 | 2/2014 | Scharf et al. |
| 2014/0095261 A1 | 4/2014 | Johnson |
| 2014/0222374 A1 | 8/2014 | Lock et al. |
| 2014/0263822 A1 | 9/2014 | Malveaux |
| 2014/0279343 A1 * | 9/2014 | Farquhar .............. G06Q 40/04 705/37 |

(56) References Cited

U.S. PATENT DOCUMENTS

| | | | |
|---|---|---|---|
| 2014/0365354 A1* | 12/2014 | Shvarts | G06Q 40/08 |
| | | | 705/38 |
| 2015/0025926 A1* | 1/2015 | Green | G06Q 50/02 |
| | | | 705/7.13 |
| 2015/0242970 A1 | 8/2015 | Avey et al. | |
| 2015/0370935 A1 | 12/2015 | Starr | |
| 2015/0371324 A1 | 12/2015 | Kumar | |
| 2016/0026940 A1* | 1/2016 | Johnson | A01D 91/00 |
| | | | 705/7.11 |
| 2016/0050840 A1 | 2/2016 | Sauder et al. | |
| 2016/0071410 A1 | 3/2016 | Rupp et al. | |
| 2016/0073573 A1 | 3/2016 | Ethington et al. | |
| 2016/0157414 A1 | 6/2016 | Ackerman et al. | |
| 2016/0171680 A1 | 6/2016 | Lobell | |
| 2016/0179994 A1 | 6/2016 | Levine et al. | |
| 2016/0216245 A1 | 7/2016 | Sutton | |
| 2016/0232621 A1 | 8/2016 | Ethington et al. | |
| 2016/0247082 A1* | 8/2016 | Stehling | G06N 7/01 |
| 2016/0260021 A1 | 9/2016 | Marek | |
| 2016/0290918 A1 | 10/2016 | Xu et al. | |
| 2016/0302351 A1 | 10/2016 | Schildroth et al. | |
| 2016/0309646 A1 | 10/2016 | Starr et al. | |
| 2016/0350855 A1 | 12/2016 | Lerner | |
| 2017/0083747 A1 | 3/2017 | Guan et al. | |
| 2017/0089761 A1 | 3/2017 | McQuilkin et al. | |
| 2017/0090068 A1 | 3/2017 | Xiang et al. | |
| 2017/0105335 A1 | 4/2017 | Xu et al. | |
| 2017/0109395 A1 | 4/2017 | Farah | |
| 2017/0112043 A1 | 4/2017 | Nair et al. | |
| 2017/0124463 A1 | 5/2017 | Chen et al. | |
| 2017/0161627 A1 | 6/2017 | Xu et al. | |
| 2017/0168157 A1 | 6/2017 | Hagerman et al. | |
| 2017/0169523 A1 | 6/2017 | Xu et al. | |
| 2017/0177938 A1 | 6/2017 | Papanikolopoulos et al. | |
| 2017/0196171 A1 | 7/2017 | Xu et al. | |
| 2017/0199528 A1 | 7/2017 | Detweiler et al. | |
| 2017/0206415 A1 | 7/2017 | Redden | |
| 2017/0213141 A1 | 7/2017 | Xu et al. | |
| 2017/0228475 A1 | 8/2017 | Aldor-Noiman et al. | |
| 2017/0231213 A1 | 8/2017 | Gordon et al. | |
| 2017/0258005 A1 | 9/2017 | Cutter | |
| 2017/0270446 A1 | 9/2017 | Starr et al. | |
| 2017/0286574 A1 | 10/2017 | Chappell | |
| 2018/0020622 A1 | 1/2018 | Richt | |
| 2018/0060771 A1 | 3/2018 | Mangin | |
| 2018/0070527 A1 | 3/2018 | Richt | |
| 2018/0075545 A1 | 3/2018 | Richt | |
| 2018/0075546 A1 | 3/2018 | Richt | |
| 2018/0101612 A1 | 4/2018 | Rosztoczy et al. | |
| 2018/0181893 A1 | 6/2018 | Basso | |
| 2018/0189954 A1 | 7/2018 | Albrecht et al. | |
| 2018/0211156 A1 | 7/2018 | Guan et al. | |
| 2018/0322426 A1 | 11/2018 | Schmaltz et al. | |
| 2018/0342020 A1 | 11/2018 | Sen et al. | |
| 2018/0349520 A1 | 12/2018 | Bhalla et al. | |
| 2018/0373932 A1 | 12/2018 | Albrecht et al. | |
| 2019/0050741 A1 | 2/2019 | Mewes et al. | |
| 2019/0050948 A1 | 2/2019 | Perry et al. | |
| 2019/0147094 A1 | 5/2019 | Zhan et al. | |
| 2019/0156255 A1 | 5/2019 | Carroll et al. | |
| 2019/0228224 A1 | 7/2019 | Guo et al. | |
| 2019/0325492 A1 | 10/2019 | Perry et al. | |
| 2019/0347836 A1 | 11/2019 | Sangireddy et al. | |
| 2020/0068797 A1 | 3/2020 | Folle et al. | |
| 2020/0125929 A1 | 4/2020 | Guo et al. | |
| 2020/0128769 A1 | 4/2020 | Gillberg et al. | |
| 2020/0196535 A1 | 6/2020 | Dagondon et al. | |
| 2020/0219093 A1 | 7/2020 | Malhotra et al. | |
| 2020/0311828 A1 | 10/2020 | Schäfer | |
| 2020/0359550 A1* | 11/2020 | Tran | G06V 20/10 |
| 2021/0224927 A1 | 7/2021 | Perry et al. | |
| 2022/0138649 A1 | 5/2022 | Ashtekar et al. | |
| 2022/0207608 A1 | 6/2022 | Raguse et al. | |
| 2022/0343229 A1 | 10/2022 | Gruber et al. | |
| 2023/0078852 A1 | 3/2023 | Campbell et al. | |

FOREIGN PATENT DOCUMENTS

| | | | |
|---|---|---|---|
| JP | H11-232354 A | 8/1999 | |
| JP | 2017-169511 A | 9/2017 | |
| WO | WO 2001/046774 A1 | 6/2001 | |
| WO | WO 2001/057752 A1 | 8/2001 | |
| WO | WO 01/75706 A1 | 10/2001 | |
| WO | WO-2011/064445 A1 | 6/2011 | |
| WO | WO 2013/148290 A1 | 10/2013 | |
| WO | WO-2015051339 A1 * | 4/2015 | ............ A01G 1/001 |
| WO | WO 2016/090212 | 6/2016 | |
| WO | WO-2019173876 A1 * | 9/2019 | ............ A01G 22/00 |
| WO | WO-2021/080630 A1 | 4/2021 | |
| WO | WO-2023/034386 A1 | 3/2023 | |

OTHER PUBLICATIONS

Denise et al "Using Information on Ecosystem Goods and Services in Corps Planning: An Examination on Authorities, Policies, Guidance, and Practices", Sep. 2013, IWR (Institute for Water Resources), pp. 1-78. (Year: 2013).*

Marzieh et al "The impact of relative individual ecosystem demand on stacking ecosystem credit markets", Feb. 2018, Ecosystem Services vol. 29, Part A, pp. 137-144 (Year: 2018).*

Barns "Agricultural planning of annual plants under demand, maturation, harvest, and yield risk", Dec. 2012, European Journal of Operational Research, pp. 539-549 (Year: 2012).*

Stockdale Impacts of farming practice within organic farming systems on below-ground ecology and ecosystem function:, Dec. 2006, Aspects of Applied Biology, pp. 43-46 (Year: 2006).*

Manoj et al., "Blockchain ecosystem for credit transfer in education", Mathematical Problems in Engineering: 1-12 (2021).

Motallebi et al., "The impact of relative individual ecosystem demand on stacking ecosystem credit markets", Dec. 2018, Ecosystem Services 29: 137-144 (2018).

International Search Report and Written Opinion for International Application No. PCT/US22/42164 dated Dec. 21, 2022.

Sylvester, "E-agriculture in action: blockchain for agriculture. Opportunities and challenges", The Food and Agriculture Organization of the United Nations (FAO) and the International Telecommunication Union, 72 pages, (2019).

Del Grosso et al., (2010). Estimating uncertainty in N2O emissions from U.S. cropland soils. Global Biogeochemical Cycles, 24(1), n/a-n/a. https://doi.org/10.1029/2009GB003544.

Gurung et al (2021). Modeling ammonia volatilization from urea application to agricultural soils in the DayCent model. Nutrient Cycling in Agroecosystems, 119(2), 259-273. https://doi.org/10.1007/s10705-021-10122-z.

Gurung et al (2021). Modeling nitrous oxide mitigation potential of enhanced efficiency nitrogen fertilizers from agricultural systems. Science of the Total Environment, 801, 149342. https://doi.org/10.1016/j.scitotenv.2021.149342.

Gurung et al., (2020). Bayesian calibration of the DayCent ecosystem model to simulate soil organic carbon dynamics and reduce model uncertainty. *Geoderma*, 376, 114529.

IPCC (2006): 2006 IPCC Guidelines for National Greenhouse Gas Inventories. vol. 1, Chapter 3 Uncertainties.

IPCC (2019): 2019 Refinement to the 2006 IPCC Guidelines for National Greenhouse Gas Inventories. vol. 4, Chapter 5 Cropland.

Ogle et al (2003). Uncertainty in estimating land use and management impacts on soil organic carbon storage for US agricultural lands between 1982 and 1997. Global Change Biology, 9(11), 1521-1542. https://doi.org/10.1046/j.1365-2486.2003.00683.x.

Paustian et al (2012). COMET2.0—Decision Support System for Agricultural Greenhouse Gas Accounting. In Managing Agricultural Greenhouse Gases: Coordinated Agricultural Research through GRACEnet to Address our Changing Climate (pp. 251-270). Elsevier. https://doi.org/10.1016/B978-0-12-386897-8.00015-2.

U.S. EPA (2022). Inventory of U.S. Greenhouse Gas Emissions and Sinks. https://www.epa.gov/ghgemissions/inventory-us-greenhouse-gas-emissions-and-sinks.

USDA (2022), U.S. Agriculture and Forestry, Greenhouse Gas Inventory 1990-2018. Technical Bulletin No. 1957. Jan. 2022.

(56) References Cited

OTHER PUBLICATIONS

Adam, B.D. et al., "Storage Hedging: What's a Merchandiser to Do ?." Proceedings of the NCR-134 Conference on Applied Commodity Price Analysis, Forecasting, and Market Management, 1993, pp. 87-94.
Blank. S.C., "Research on futures markets: Issues, approaches, and empirical findings," Western Journal of Agricultural Economics, 1989, vol. 14, No. 1, pp. 126-139.
Bolton, D.K. et al., "Forecasting crop yield using remotely sensed vegetation indices and crop phenology metrics, " Agricultural and Forest Meteorology, vol. 173, May 2013, pp. 74-84.
Chabala, L. M. et al., "Application of Ordinary Kringing in Mapping Soil Organic Carbon in Zambia," Pedosphere 27(2), Apr. 2017, pp. 338-343.
Chicago Board of Trade, Why Trade Ag Products on Project A, 1994, pp. 1-5.
Commodity Trading Manual, published by Chicago Board of Trade, copyright 1998, 170 pages.
Crawford, P., "The New High-Tech Investing: Computer as Fund Manager," The International Herald Tribune, Feb. 1, 1992, 4 pages.
Daniels Trading, "Daniels Ag Advisory Glossary," Sep. 2004, pp. 1-2.
Diepeveen, D. et al., "Identifying key crop performance traits using data mining," World Conference on Agricultural Information and IT, Aug. 2008, pp. 1-6.
Dowell, F.E. et al., "Predicting Wheat Quality Characteristics and Functionality Using Near-Infrared Spectroscopy," Cereal Chemistry, vol. 83, Iss. 5, Sep. 2006, pp. 529-536.
Einstein-Curtis, A., "Online grain marketplace launches grain testing service," Feednavigator.com, Oct. 20, 2017, two pages, [Online] [Retrieved on Jun. 1, 2020] Retrieved from the Internet <URL: https://www.feednavigator.com/Article/2017/10/20/Online-grain-marketplace-launches-grain-testing-service>.
Ethridge, D.E., "A Computerized Remote-Access Commodity Market: Telcot," Southern Journal of Agricultural and Applied Economics, Dec. 1978, vol. 10, No. 2, pp. 177-182.
European Patent Office, Extended European Search Report, EP Patent Application No. 20836088.3, dated Jun. 14, 2023, ten pages.
Fields, G., "Here is How Trading Stocks by Computer Works," Miami Herald, Oct. 25, 1987, pp. 1-2.
Food Market Exchange, "FoodMarketExchange.com," Jun. 20, 2000, pp. 1-7, [Online] [Retrieved from the Internet Archive] <URL: http://web.archive.org/web/*/http://www.foodmarketexchange.com>.
Gan, Y. et al., "Improving Farming Practices Reduces the Carbon Footprint of Spring Wheat Production," Nature Communications, vol. 5, Article No. 5012, Nov. 18, 2014, pp. 1-13.
Hayenga, M.L. et al., "Formula pricing in five commodity marketing systems," American Journal of Agricultural Economics, Nov. 1980, vol. 62, No. 4, pp. 753-759.
Kastens, T.L. et al., "Post-harvest grain storing and hedging with efficient futures," Journal of Agricultural and Resource Economics, 1999, pp. 482-505.
Lemos, M. F., "Using GIS to Predict Corn Yields in Colombia," University of Redlands Thesis, May 2008, pp. 1-83, [Online] [Retrieved on Apr. 6, 2020] Retrieved from the Internet <URL: https://inspire.redlands.edu/gis_gradproj/177>.
Los Angeles Times, "Ins and Outs of Program Trading, and Why It's Being Blamed for Market Collapse," Dec. 6, 1987, pp. 1-5.
Meymandpour, R. et al. "The Economic Impacts of Electronic Marketplaces in Globalization Age: Examples from Agricultural Web Portals." 2009 2nd IEEE International Conference on Computer Science and Information Technology, Aug. 8-11, 2009, pp. 109-113.
Moschini, G. et al., "Constant or Time Varying Hedge Ratios", Proceedings of the NCR-134 Conference on Applied Commodity Price Analysis, Forecasting and Market Risk Management, 1993, pp. 1-17.
New York Mercantile Exchange, "A Guide to Energy Hedging," 1999, 1-66.
New York Times, "Gambling in Futures," Jan. 9, 1910, 1 page.
Norvell, J.M. et al., "Simultaneously Derived Optimal Hedge Ratios for East Central Illinois Corn and Soybean Producers", Proceedings of the NCR-134 Conference on Applied Commodity Price Analysis Forecasting and Market Risk, Chicago, Ill., 1992, pp. 1-16.
Patterson, M.D. et al., "Hedge Ratio Estimation and Soybean Storage" Proceedings of the NCR-134 Conference on Applied Commodity Price Analysis and Market Risk, Chicago, III, 1994, pp. 1-15.
PCT International Search Report and Written Opinion, PCT Application No. PCT/US2021/064200, dated Jun. 14, 2022, 20 pages.
Piggott, N.E., "North Carolina Soybean and Corn Prices with Basis 1980-2003," North Carolina State University, Jul. 2003, pp. 1-26.
Preliminary Amendment, U.S. Appl. No. 10/870,112, dated Feb. 6, 2008, 20 pages.
Purcell, W.D. et al., "Agricultural Futures and Options: Principles and Strategies" Second Edition, 1999, pp. 1-5, 7-22, 24-29, 31-54, 362-381.
Roper, W.R. et al., "Comparing Four Methods of Measuring Soil Organic Matter in North Carolina Soils," Soil Science Society of America Journal, vol. 83, Mar. 28, 2019, pp. 466-474.
Second Preliminary Amendment, U.S. Appl. No. 10/870,112, dated Mar. 21, 2008, 12 pages.
Strobl, M. et al., "An Examination of the Spatial and Intertemporal Aspects of Basis Determination," NCR-134 Conference on Applied Price Analysis, 1992, pp. 1-14.
Telcot, "User's Manual for Buyers," published by Plains Cotton Cooperative Association, 1985, pp. 1-172.
United States Department of Agriculture, Agricultural Marketing Service, "Electronic Trading of Agricultural Products", paper delivered Jul. 8, 1980 to Commonwealth Club, San Francisco, Jan. 1981, pp. 1-21.
U.S. Appl. No. 60/241,543, filed Oct. 18, 2000, Inventor Reding, G. et al.
U.S. Appl. No. 62/653,480, filed Apr. 5, 2018, Inventor Dagondon, S.D. et al.
USA Futures, "usafutures.com," Jan. 25, 1999, pp. 1-12, [Online] [Retrieved from the Internet Archive] <URL: http://web.archive.org/web/19990218043052/www.usafutures.com/futuresdirectory.htm>.
Wang, A.X. et al., "Deep Transfer Learning for Crop Yield Prediction with Remote Sensing Data," Proceedings of the 1st ACM SIGCAS Conference on Computing and Sustainable Societies, vol. 50, Jun. 2018, pp. 1-5.
Wang, Z.J. et al., "Prediction of grain protein content in winter wheat (*Triticum aestivum* L.) using plant pigment ratio (PPR)," Field Crops Research, vol. 90, Dec. 2004, pp. 311-321.
Webster's New Collegiate Dictionary, 1990, p. 265.
Wisner, R. et al., "Grain Price Hedging Basics", Iowa State University, Oct. 1995, pp. 1-3.
World Book Corp, "The World Book Encyclopedia," 1994, pp. 873-874.
Zanini, F.C. et al., "Did Producer Hedging Opportunities in the Live Hog Market Decline," The Proceedings of the NCR-134 Conference on Applied Commodity Price Analysis Forecasting and Market Risk, Chicago, Ill. 1997, 17 pages.

\* cited by examiner

Indigo Field Data Standardization

Metadata for connections between programs designed to 1. avoid double counting 2. facilitate interoperability 3. optimize program recommendations for growers 4. align with scientific development of standards & best practice

Carbon

*Constructs for Consistency in Handling Space & Time*

- Management Events (temporally explicit groupings of ag data)
- Management Zones (event-based accounting of space)
- Cultivation Cycles (event-based division of continuous time)
- Boundary Tracking (boundary provenance, including edits)
- Sample design (point-to-project stats for scale & uncertainty)

*Constructs for Consistency in Sustainability MRV*

- Baselines (event-based 'business as usual')
- Additionality (automated check of practice changes)
- Sensitive factors (optimizate for high-performing data)
- Bias assessments (guardrail/adjustment for missing data)
- Confidence (uncertainty quantification)
- Land MRV tracking (manage portfolio of fields/participation)
- Common Ag. Library Model-agnostic conversion service for management data into model inputs
- Model Standardization Cal/val and model updates using protocol standards and external expert review

Fig. 4B

Step 3: overlay all management event boundaries from any point in time to divide field area into unique spatial zones. Each zone will have a unique baseline history of events that occurred in that spatial extent of the field.

SYSTEMS AND METHODS FOR ECOSYSTEM CREDIT RECOMMENDATIONS

CROSS-REFERENCE TO RELATED APPLICATIONS

This application claims the benefit of U.S. Provisional Application Nos. 63/239,150, filed Aug. 31, 2021, 63/280,074, filed Nov. 16, 2021, 63/304,431, filed Jan. 28, 2022, 63/318,993, filed Mar. 11, 2022, and 63/345,461, filed May 25, 2022, each of which is hereby incorporated by reference in its entirety.

BACKGROUND

Farmers today are presented with a wide array of agronomic and eco-program choices that provide various economic incentives to adopt particular farming practices, such as environmentally-friendly growing practices to reduce the carbon footprint of a farm. Given the large number of options a farmer can choose from, there is currently no way to analyze the particular situation of a farmer to determine which one or combination of choices will provide the greatest economic incentive to that farmer. Moreover, after choosing one or more agronomic and/or eco-programs, the farmer must maintain compliance with the chosen program(s) so that they receive the economic incentive.

Additionally, a purchaser of enhanced products may require visibility into the environmental attributes of products in their portfolio, as well as the ability to track, update, and verify those environmental attributes over time, including, for example the risk of reversion of environmental attributes of the particular products in their portfolio, such as ecosystem credits. However, there is currently no way for the purchaser to receive an accurate and real-time risk assessment of the products within their portfolio.

Accordingly, there exists a need for a recommendation engine that can analyze the particular situation of a farmer to determine which one or combination of agronomic and eco-program choices will provide the greatest economic incentives as well as a compliance manager to assist the farmer in maintaining compliance with the selected programs. Additionally, there exists a need for a risk analysis platform for providing portfolio risk assessments to purchasers of enhanced products and data structures for facilitating profiling and aggregation of products into a portfolio or cohort for further analysis.

When issuing ecosystem credits, buyers may value different aspects of ecosystem credits more than others. Some buyers may value whether a particular ecosystem credit comes from a particular geographic location, is based on particular crop production practices, is from a specified time period, or any combination of the above. For example, if a company has purchased grain associated with particular location and/or crop production practices for a specific time period, the ecosystem credit associated with that particular location, crop production practices, and/or time period may be valued more to the company because holding that particular ecosystem credit allows the company to make verified product claims (e.g., their products are made using ingredients grown using environmentally-friendly techniques). To this company, that ecosystem credit is non-fungible (not perfectly substitutable with other credits). In another example, a company interested in offsetting emissions may not care about the particular location, crop production practices, and/or time period of their credit, as any ecosystem credits generated are perfectly substitutable, i.e., the credits are perfectly fungible.

Adoption of certain farming practices can produce verifiable environmental characteristics (for example, increasing the soil organic carbon and or reduce greenhouse gas emissions, reduced water usage, reduced chemical contamination (e.g., reduced nitrogen run-off, reduced insecticide/pesticide/herbicide residue, increased biodiversity, and the like). These environmental characteristics can be quantified and monetized as ecosystem credits (for example, a carbon credit equivalent to 1 metric ton of carbon sequestered) under a particular methodology (e.g., a set of requirements). These ecosystem credits are generally fully fungible, and may be retired (purchased and held without further trading) or may be traded on a secondary market. Companies may purchase and retire ecosystem credits to offset the negative impacts of their operations. For these companies ecosystem credits are perfectly fungible. Other companies gain additional benefit from being able to associate a particular environmental practice with a particular product (for example, wheat produced using farming practices that result in sequestration of soil organic carbon). Environmentally conscious consumers value and pay premiums for retail goods that have verified and traceable connections to environmentally beneficial production practices.

The highest quality ecosystem credits are generated according to strict scientific protocols (e.g., as described in a methodology) and issuance of credits is overseen by independent registries, and subject to registry requirements for verifying practices qualify for crediting and monitoring continued compliance with the protocols. Generation of high-quality ecosystem credits requires a significant amount of information, in particular information gathered throughout the production cycle for a particular good. Additionally, ecosystem crediting projects may consist of many different producers each employing different conservation activities at different locations. Data collection and verification of data to fulfill registry requirements may not be completed until or after final products are ready for sale, and ecosystem credits are often not issued by a registry until many months or a year after the product has been produced. Often a producer must sell their product before the ecosystem credit associated with that product's production is issued, which traditionally has meant that ecosystem credits are permanently disassociated from the products produced.

This application describes improved methods and data structures useful for associating products with the ecosystem credits issued based on production practices used to produce those goods, in particular where there is: i) a significant period of time between when a product is produced, when a product is harvested and sold, and when an ecosystem credit associated with the production of the product is generated and sold; and/or ii) a need for transparency and trust in the provenance of an ecosystem credit associated with a product.

Moreover, this application describes improved methods and data structures useful for generating high-quality, scientifically rigorous ecosystem credits and/or sustainability claims based on data collected on and about agricultural land and the production practices used to produce agricultural products. These approaches are particularly useful where there is: i) significant variability in the types and amounts of data available for the agricultural land area and production practices used to produce those goods, ii) optionality for participation in one to multiple programs; iii) significant variability in the time between when a product is produced, harvested, and transacted, and when an ecosystem credit and/or sustainability claim associated with the agricultural land or product is generated and sold; iv) a need for transparency and trust in the provenance of an ecosystem credit and/or sustainability claim associated with a transacted agricultural product and/or area of agricultural land; and/or v) a need for permanence and accounting of reversals, i.e., assurance that a product will continue to exist or will be accounted if it no longer exists, based on continued monitoring.

BRIEF SUMMARY

In various embodiments, methods and computer program products for generating a recommendation are provided. Field data comprising geospatial boundaries of one or more field are received. One or more methodology is accessed. For each of the one or more fields, one or more farming practice is accessed, wherein each farming practice comprises a location and time. For each of the one or more fields, for each crop production period, an ecosystem attribute is generated by applying one or more ecosystem attribute quantification methods to each spatially and temporally unique set of one or more farming practices. Selection of one or more program is optimized for each field based on the set of selected programs being compatible within the field and production period.

In various embodiments, methods and computer program products for generating a zone-cycle are provided. Field data comprising geospatial boundaries of one or more fields are received. Management event data comprising one or more management events located within the one or more fields are received. For each management event, a management event boundary is received defining geospatial boundaries corresponding to at least a portion of the one or more fields. One or more management zones is determined based on the management event boundaries.

In various embodiments, methods and computer program products for generating a field object are provided. Agricultural product data comprising an origin location and a crop type are received. Remote sensing data for a geographic region comprising the origin location are accessed. A machine learning model is applied to the remote sensing data to determine field-level farming practice combinations. Ecosystem observation data are accessed. The one or more ecosystem attribute quantification methods are applied to the ecosystem observation data and field-level farming practice combinations to generate one or more ecosystem attribute. A field object is generated, comprising: the origin location, the production period, and one or more ecosystem attribute.

In various embodiments, methods and computer program products for maintaining a collection of ecosystem credit tokens are provided. An ecosystem attribute target profile is accessed for the collection of ecosystem credit tokens, wherein the target profile comprises a set of one or more ecosystem characteristics, quantities of one or more ecosystem characteristics, and permanence of one or more ecosystem characteristics. A set of ecosystem credit tokens is accessed, wherein each ecosystem credit token data record comprises one or more of: a validated and verified management event, a methodology, an ecosystem attribute, a boundary, an ecosystem impact, an ecosystem credit, and an ecosystem attribute quantification method. For each ecosystem credit token of the set of ecosystem credit tokens: at least one difference between the ecosystem credit token data record and a field object comprising field metadata is detected; an updated data record is generated; an ecosystem attribute quantification method is applied to the updated data record; a probability of reversal of an ecosystem attribute is determined; modification of the ecosystem credit token is automatically triggered if applying an ecosystem attribute quantification method to the updated data record produces a change in program eligibility or a change in an ecosystem attribute. The updated data record comprises: the values from the immutable data record if the immutable data record and field object values are the same or if the field object values are missing; and the values from the field data object if immutable data record and field object values are different or if the immutable data record values are missing. A current profile of the collection of ecosystem credit tokens is determined, wherein the current profile comprises: the unique set of ecosystem characteristics within the collection, quantities of the ecosystem characteristics within the collection, and permanence of the ecosystem characteristics within the collection. The collection of ecosystem credit tokens is automatically updated to maintain a current profile matching the target profile.

In various embodiments, a method is provided where at least one field object is accessed. Each field object includes field metadata and the field metadata includes: a field identifier; a geographical boundary of the field; one or more management event for the field, agronomic data for the one or more management event, evidential data related to the one or more management event, and/or one or more product identifiers; an outcome indicator; and a mutability indicator. At least one model having an associated methodology is accessed. For each field object: one of the at least one model having an applicable methodology is applied to that field object thereby determining an outcome and the outcome indicator is modified to indicate the determined outcome. Optionally, a list of the at least one outcome is provided to the user.

In various embodiments, the outcome indicator represents a change in an ecosystem attribute relative to a baseline scenario in which one or more management events differ from the one or more management events for the field. In other embodiments, the outcome indicator represents a difference in an ecosystem attribute for a field relative to a baseline scenario that is an ecosystem attribute profile of a region. In various embodiments, the outcome indicator represents a change in an ecosystem attribute relative to a baseline scenario determined based on actual or estimated regional practices, where a region of the regional practice can be the field object, one or more field objects having a different field identifiers than the reference field, or one or more supply sheds. Accordingly, in various embodiments, performance of a field can be compared to what the farmer would otherwise have done on that farm, or performance of a field can be compared to outcomes based on the regional norm.

BRIEF DESCRIPTION OF THE SEVERAL VIEWS OF THE DRAWINGS

FIGS. 4A-4B illustrate a framework for integrating new field data according to embodiments of the present disclosure.

DETAILED DESCRIPTION

Figure 1:
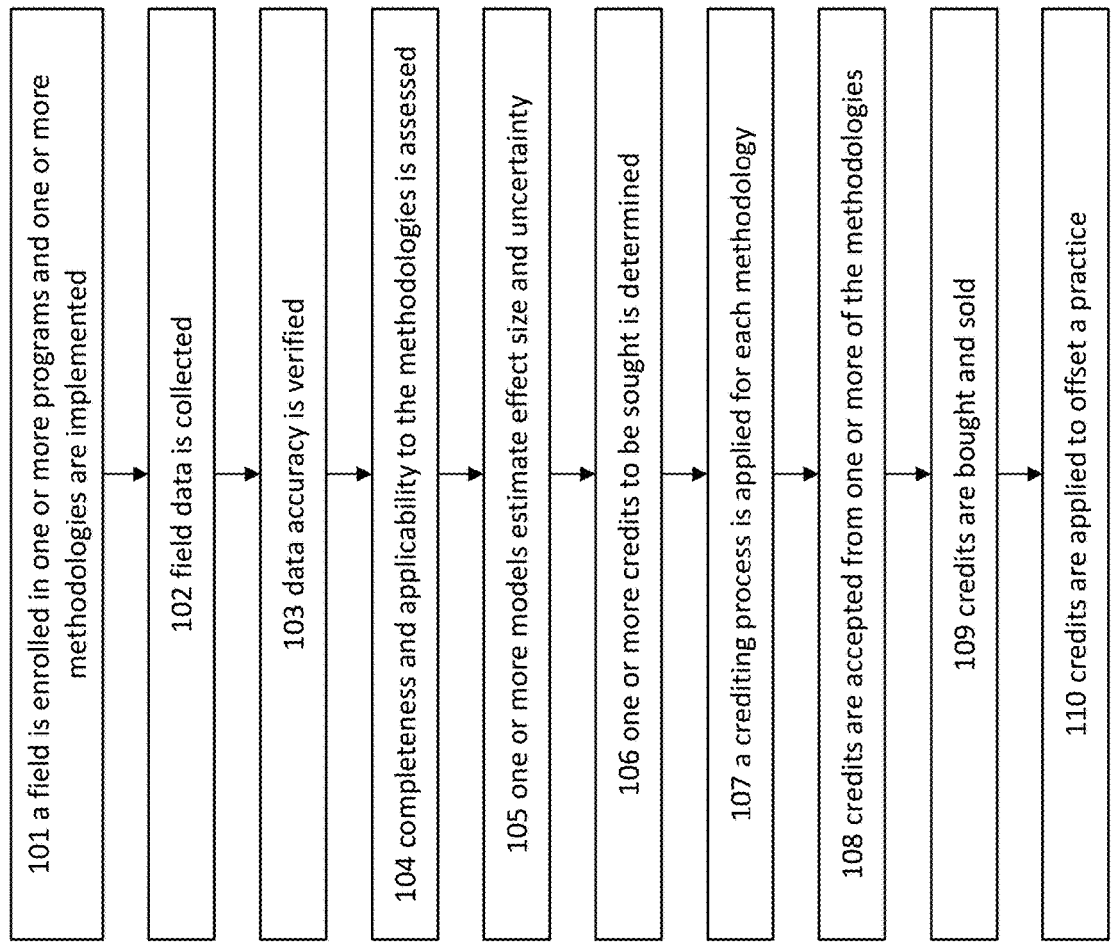
FIG. 1 illustrates a flow diagram of an ecosystem credit lifecycle according to embodiments of the present disclosure.

FIG. 1 illustrates a flow diagram 100 of an ecosystem credit lifecycle. At 101, a field is enrolled in one or more programs and one or more methodologies are implemented. At 102, field data is collected. At 103, data accuracy is verified. At 104, completeness and applicability of the data to the methodologies is assessed. At 105, one or more models are applied to estimate the effect size and uncertainty associated with a change in practice. At 106, one or more credits (e.g., a mixture of credits) to be sought is determined for a particular field. At 107, a crediting process is applied for each methodology. At 108, credits are accepted from one or more of the methodologies. At 109, credits are bought and/or sold. At 110, credits are applied to offset a practice.

In various embodiments, a data structure is provided that represents an abstraction of a field that currently has, may generate, and/or is seeking to purchase, one or more ecosystem credit tokens. In various embodiments, the data structure instantiates a field data object (e.g., an abstract data type) that is an abstraction of a field. In various embodiments, the data structure includes metadata related to a particular field (e.g., a single production area such as a farm). In various embodiments, the metadata may be provided to one or more methodology to thereby determine whether the field is eligible for one or more ecosystem credit tokens based on a change in a practice performed at the field. In various embodiments, the data structure includes an identifier of a field, a geographical boundary associated with the field, one or more crop production or farming practices used in the field, agronomic data (e.g., soil data) for the field, a time period during which the crop production practices are performed in the field, an identifier for one or more products (e.g., grain) produced in the field, and/or an indication of whether the data structure is mutable or immutable. In various embodiments, the data structure includes an indication of whether an ecosystem credit is (relative to a buyer of that credit) fungible or non-fungible.

While the examples provided herein refer to a single data structure, it will be appreciated that in various embodiments, the data structure may be distributed over multiple linked objects. For example, the data structure may comprise a plurality of database entries related by one or more key values. In another example, the data structure may comprises a plurality of objects related by association or inheritance.

In various embodiments, the data structure includes evidential data or links to evidence that data within the data structure is verified and/or accurate. In various embodiments, the evidential data may be received from a third party database or a third party verifier. In various embodiments, the third party database comprises a soil database. In various embodiments, the third party database include a satellite imagery database. In various embodiments, the third party data includes any suitable publicly-available government database of data (e.g., gNATSGO, RaCA).

In some embodiments, the data structure includes one or more types of data records. The data records comprise at least one of: a sustainable region registration record (SLRR); a zone-cycle data record (ZCDR); an accounts data record (ACDR); a production data record (PRDR); an ecosystem attribute data record (EADR); and a sustainable facility registration record (SFRR).

A sustainable region registration record (SLRR) is a data record used to capture information related to the area enrolled in at least one sustainability program, for example, one or more fields or portions of fields). An SLRR identifies the area where an activity or activities of significance for a given sustainability program occur (e.g., a field boundary). Once enrolled and through data validation/QAQC, the SLRR becomes a fixed geospatial area for quantification and reporting. Additions, losses, or divisions of an SLRR are restricted, and are only done following rules to account/report changes across enrolled sustainability programs. In some embodiments, a SLRR is defined by a shape drawn within a graphical user interface of a client device. In some embodiments, a SLRR is defined by a boundary based on the highest frequency edge positions of overlapping regions, for example, each region may be a continuous area defined by the path of a machine (for example, an area covered by a planting machine in planting a crop, drone, robot, etc.), and multiple regions may be an aggregation of multiple areas covered by one or more machines over one or more periods of time (e.g., hours, days, weeks, years). In some embodiments, a SLRR is defined by a boundary based on a perimeter defined by a series of geolocations collected from a series of stationary devices. In some embodiments, a SLRR is defined by a boundary based a series of geolocations collected from a device (e.g., cell phone, vehicle, ATV, etc.) traveling about the perimeter of a production location (e.g. field).

A zone-cycle data record (ZCDR) is a data record containing a unique combination of production practices (e.g., agronomic, forestry, or aquacultural production practice) data and or measurement (for example, measurement of GHG emissions, measurement of soil texture and or composition, etc.), spatial information (for example, an area within a SLRR) and temporal geospatially and temporally explicit information related to the inputs to the agricultural process that change in time (for example, growing season to growing season). In some embodiments, a ZCDR for a land-based area is linked to a SLRR, as it captures data describing the management of some portion of the land that is claiming sustainable management quantification. In some embodiments, this data structure also contains information about the methodology and its associated reporting period, for example via a link to a ECDR.

An accounts data record (ACDR) is a data record used to capture information related to an entity that will be paid for ag production generated from a give zone-cycle (sustainability credits and/or claims).

A production data record (PRDR) is a data record used to capture information related to physical outputs of an agricultural process, such as total harvest or crop yield. In some embodiments, information related to physical outputs of an agricultural process are geospatially and temporally explicit.

An ecosystem attribute data record (EADR) is a data record used to capture quantified ecosystem impacts, the ZCDR associated with the final input data, reference to the methodology applied (in some embodiments the model version utilized to generate the ecosystem impact), an allocation of benefits. A data record containing quantified ecosystem impacts linked to one or more of: a ZCDR, a PRDR, for example ecosystem impacts used to produce sustainability credits that are submitted to a 3rd party for verification. An ECDR will always be linked to a ZCDR, as it captures the data describing changes in ecosystem variables on some portion of that land.

A sustainable facility registration record (SFRR) is a data record used to capture information related to a field enrolled in at least one sustainability program. For non-land based projects or projects located in manufactured production facility (such as a factory, vertical farm, or greenhouse) a data record may include a sustainable facility registration record (SFRR) instead of a SLRR. Like an SLRR, an SFRR identifies the area where an activity or activities of significance for a given sustainability program occur. Unlike an SLRR, the geolocation of an SFRR may change over time (for example, an aquaculture facility may move to various locations within an ocean, a production process many change to a different location within a building).

In some embodiments, a field data object is populated automatically using data obtained from one or more sensor including without limitation sensors located on or integrated into: soil probes, land based vehicles (e.g., tractors, planters, trucks, robots), hand-held devices (e.g., a cell phones, cameras, spectrophotometers), drones, airplanes, and satellites. In some embodiments, a "field sensor" is a sensor operating within a field boundary for example, a soil moisture sensor, a flux tower (for example, a micrometeorological tower to measure the exchanges of carbon dioxide, water vapor, and energy between the biosphere and atmosphere), a soil temperature sensor, an air temperature sensor, a pH sensor, a nitrogen sensor, an irrigation system, a tractor, a robot, a vehicle, etc. In some embodiments, preliminary field data is automatically populated based on average practices and average practice dates within a region (for example as detected based on current season or historical remote sensing data analysis). Preliminary data are, in some embodiments, verified by input received from a farmer's user device, for example preliminary data may be presented and verified within a graphical user interface of a farmer user device, preliminary data may be verified by location and or accelerometer data or other data collected from a user device. For example, a harvest practice identified by remote sensing data may be confirmed where machine data corresponding a the typical engine speed of a harvester is recorded between the periodic images within a remote sensing time series collected from a satellite, where the first of that time series period does not indicate harvest has occurred and the next image indicates that harvest has occurred or is in progress. In some embodiments, a user device can be a cell phone, smart device, or farm equipment such as a drone or tractor. Other data collected from a user device may include a machine data (such as engine rpm, fuel level, location, machine hours, and changes in the same), input usage (for example, amounts and types of seeds, fertilizers, chemicals, water, applied), imagery and sensor data (for example, photographs, videos, LiDAR, infrared).

In some embodiments, a field data object is generated after a product is harvested. For example, a field data object may retrospectively be generated for each ingredient of agricultural origin in a processed product, for example based on the year and supply shed from which the ingredient was obtained. In some embodiments, an ecosystem benefit is calculated for one or more ingredients of a processed product from remote sensing data collected in the region of the supply shed (for example, all agricultural production areas within a supply shed, all agricultural production areas of a specified crop and or crop quality) from the year of purchase and or prior years.

Exemplary remote sensing algorithms suitable for use in automatic population and validation are given in the remote sensing algorithms section, below. Such algorithms may be used to determine geographical boundaries of one or more fields, the presence or absence of one or more management events, evidential data related to one or more management event, or any of a variety of agriculturally relevant attributes. In some embodiments, the prevalence of one or more crop types, and one or more management events, may be determined for each crop type, each crop production cycle and each supply shed from which an ingredient within a processed product was procured. In various embodiments, a supply shed or supply chain from which an ingredient within a processed product was procured may be documented by purchase records documenting the entry of a product into a supply shed (for example a scale ticket documenting delivery of a product to an elevator) or supply chain (for example, a delivery confirmation documenting delivery of a product to a processing facility of buyer). In various embodiments, a supply shed or supply chain from which an ingredient within a processed product was procured may be estimated based on historical or regional practice, for example, in a relevant time period a buyer purchased a type of agricultural commodity from a limited number of known producers, or from a known set of aggregators or intermediate processors each sourcing a known percentage or amount of a type of agricultural commodity from a number of known producers, or from a certain region (for example, one or more counties, or one or more states).

In various embodiments, once the buyer of a credit purchases an ecosystem credit associated with a particular change in practice, the data structure is changed to an immutable state. In various embodiments, a mutable/immutable indicator field within the data structure is toggled from a mutable state to an immutable state. In various embodiments, once the data structure has been changed to the immutable state, the data structure can no longer be modified.

In various embodiments, the system may access one or more models. In various embodiments, the models are configured to output an ecosystem outcome based on the metadata contained within the data structure. In various embodiments, separate models may be accessed for different types of ecosystem programs. For example, one or more model may be accessed for a water use abatement program. In another example, one or more model may be accessed for a greenhouse gas emission program. In various embodiments, a model may be applied to the data structure to thereby determine an ecosystem outcome. In various embodiments, once the ecosystem outcome is determined for a particular model, the ecosystem outcome may be written to the data structure or linked to the data structure. In various embodiments, the data structure may include an indicator of the methodology or program used to determine the outcome.

In various embodiments, two or more data structures may be generated for a particular field where the metadata of the field data structure is modified to represent various hypothetical scenarios for the field. For example, one data structure may be generated for the field including one crop production process and another data structure may be generated for the same field including a different crop production practice to thereby model out the effects of a field implementing the first crop production process versus the other crop production process.

For example, in a pay-for-practice program, a farmer of a field receives a premium for using a particular farming practice for a particular time period (e.g., a single year or with no enduring commitment). "Farming practices" (equivalently "crop production practices") are actions taken or avoided at a location (for example, a point location or an area) within a field boundary (or production facility) at a specified time (e.g., at a particular time and or date, for example a planting date) or time period (e.g., crop season or year). Such actions taken or avoided may include, without limitation, planting a crop, planting a particular variety of seed (e.g., a non-GMO seed), planting a cover-crop, one or more cover crop species planted, using a particular tillage technique (including not tilling), irrigation type, using water conservation techniques, using or not using pesticides or insecticides, type of input applied (for example, a fertilizer, manure, one or more microbe, a material for direct air capture of a greenhouse gas, a silicate material (for example, crushed silicate rock such as basalt), a material for passive direct air capture of a greenhouse gas, a harvesting technique, a type and or amount of field residue, a field residue burning event, etc.). In various embodiments, farming practices may apply to entire fields, to more than one field, or subregions or points within a field. Within a single crop season some farming practices may be applied to an entire field, while other farming practices may be applied to a subfield region.

In another example, an environmental benefit program is a premium paid to farmers engaging in particular farming practices.

In various embodiments, ecosystem credit programs and environmental benefit programs may have a number of differences. Additionally refers to the concept that a practice change leading to a desirable environmental characteristic would not have happened but for a crediting program. Additionally is central to most ecosystem credit programs. In contrast, environmental benefit programs often benchmark an environmental benefit against the environmental effects of county or national average practices, so a farmer who has been engaged in a particular beneficial practice for decades would be eligible for a benefit program (because there is a difference in the environmental impact of their practices relative to their peers) but would not be eligible for a crediting program because their practices are not additional (and, thus, do not satisfy additionally). In various embodiments, crediting programs have a multi-year look-back period such that actions in years prior affect eligibility for the crediting program and help determine the baseline level.

In various embodiments, crediting programs require a long term commitment to maintaining the environmental benefit referred to as permanency or a permanency requirement (e.g., for a carbon crediting program, the soil carbon stocks are required to be permanently increased over baseline levels as measured over a 100 year period, and are secured against reversals by an insurance buffer pool of credits). In various embodiments, environmental benefit programs do not have a permanency requirement or have a reduced commitment to maintaining an environmental benefit when compared to crediting programs.

In various embodiments, ecosystem credit programs follow a methodology including set criteria for eligibility, standard protocols for calculating effects, and compliance of a crediting project is rigorously verified, for example, by an independent third-party. In various embodiments, environmental benefit programs are internal standards which may be highly customized to needs of a particular customer and compliance may be self-monitored and/or self-verified.

In various embodiments, a field may switch between or co-participate in ecosystem credits and/or environmental benefit programs. In various embodiments, ecosystem crediting programs allow participating fields some (e.g., limited) gap years in participation (but not reversals in benefits achieved) or co-participation in other programs so long as the practices/benefits are not incompatible. In various embodiments, when switching between programs over time, the actions taken in prior and subsequent years must be compatible with the various program's requirements both in terms of not reversing ecosystem benefits ("reversals"), and maintaining program eligibility.

In various embodiments, double-counting must be avoided for crediting programs. In various embodiments, the price of the credit must be fully attributable to the particular quantified benefit in order to support a market price of a credit. In various embodiments, the data structures may be used to determine whether co-participation in ecosystem crediting programs and environmental benefit programs have unrelated or otherwise compatible practice changes and/or benefits.

In various embodiments, a field is a unique object that has temporal and spatial dimensions. In various embodiments, the field is enrolled in one or more programs, where each program corresponds to a methodology. As used herein a "methodology" (equivalently "program eligibility requirements" or "program requirements") is a set of requirements associated with a program, and may include, for example, eligibility requirements for the program (for example, eligible regions, permitted practices, eligible participants (for example, size of farms, types of product permitted, types of production facilities permitted, etc.) and or environmental effects of activities of program participants, reporting or oversight requirements, required characteristics of technologies (including modeling technologies, statistical methods, etc.) permitted to be used for prediction, quantification, verification of results by program participants, etc. Examples of methodologies include protocols administered by Climate Action Reserve (CAR) (climateactionreserve.org), such as the Soil Enrichment Protocol; methodologies administered by Verra (verra.org), such as the Methodology for Improved Agricultural Land Management, farming sustainability certifications, life cycle assessment, and other similar programs. In various embodiments, the field data object includes field metadata. "One or more methodologies" refers to a data structure comprising program eligibility requirements for a plurality of programs. More briefly, a methodology may be a set of rules set by a registry or other third party, while a program implements the rules set in the methodology.

In various embodiments, the field metadata includes a field identifier that identifies a farm (e.g., a business) and a farmer who manages the farm (e.g., a user). In various embodiments, the field metadata includes field boundaries that are a collection of one or more polygons describing geospatial boundaries of the field. In some embodiments, polygons representing fields or regions within fields (e.g., management event boundaries, etc.) may be detected from remote sensing data using computer vision methods (for example, edge detection, image segmentation, and combinations thereof) or machine learning algorithms (for example, maximum likelihood classification, random tree classification, support vector machine classification, ensemble learning algorithms, convolutional neural network, etc.).

In various embodiments, the field metadata includes farming practices that are a set of farming practices on the field. In various embodiments, farming practices are a collection of practices across multiple years. For example, farming practices include crop types, tillage method, fertilizers and other inputs, etc. as well as temporal information related to each practice which is used to establish crop growing seasons and ultimately to attribute outcomes to practices. In various embodiments, the field metadata includes outcomes. In various embodiments, the outcomes include at least an effect size of the farming practices and an uncertainty of the outcome. In various embodiments, an outcome is a recorded result of a practice, notably: harvest yields, sequestration of greenhouse gases, and/or reduction of emissions of one or more greenhouse gases.

In various embodiments, the field metadata includes agronomic information, such as soil type, climate type, etc. In various embodiments, the field metadata includes evidence of practices and outcomes provided by the grower or other sources. For example, a scale ticket from a grain elevator, an invoice for cover crop seed from a distributor, farm machine data, remote sensing data, a time stamped image or recording, etc. In various embodiments, the field metadata includes product tracing information such as storage locations, intermediaries, final buyer, and tracking identifiers.

In various embodiments, the field object is populated by data entry from the growers directly. In various embodiments, the field object is populated using data from remote sensing (satellite, sensors, drones, etc.). In various embodiments, the field object is populated using data from agronomic data platforms such as John Deere and Granular, and/or data supplied by agronomists, and/or data generated by remote sensors (such as aerial imagery, satellite derived data, farm machine data, soil sensors, etc.). In various embodiments, at least some of the field metadata within the field object is hypothetical for simulating and estimating the potential effect of applying one or more practices (or changing one or more practices) to help growers make decisions as to which practices to implement for optimal economic benefit.

In various embodiments, the system may access one or more model capable of processing the field object, processing the field object (e.g., process the field object based on one or more model), and returning an output based on the metadata contained within the field object. In various embodiments, a collection of models that can be applied to a field object to estimate, simulate, and/or quantify the outcome (e.g., the effect on the environment) of the practices implemented on a given field. In various embodiments, the models may include process-based biogeochemical models. In various embodiments, the models may include machine learning models. In various embodiments, the models may include rule-based models. In various embodiments, the models may include a combination of models (e.g., ensemble models).

In various embodiments, the determined outcome(s) by the model(s) result in ecosystem credits verified by registries. In various embodiments, the determined outcome(s) are quantified, measured, and/or reported (e.g., via a GHG emissions or responsible water usage report). In various embodiments, rule-based evaluation of outcomes may be performed, such as pay-for-practice.

In various embodiments, the relationship between metadata within the field object (e.g., the field identifier, the methodologies, and an ecological outcome) has two stages: 1) a mutable stage and 2) an immutable stage. In various embodiments, the field metadata is mutable before an ecosystem credit has been issued or an ecosystem benefit is verified. In various embodiments, the portion of field metadata upon which an ecosystem credit or ecosystem benefit is generated is made immutable as soon as an ecosystem credit or ecosystem benefit is submitted for issuance or verification. In various embodiments, potential outcomes (from changing one or more variables within the field data object) are evaluated by modifying metadata within the mutable data object and applying one or more methodologies, such as by changing the farming practices. In various embodiments, potential outcomes are evaluated for a field to thereby determine incentives/economic outcomes that maximize income for the grower (e.g., which credit type is economically best for the grower). In various embodiments, potential outcomes are evaluated for supply/demand optimization reasons (e.g., a CPG company is looking for grain bundled with a specific practice change). In various embodiments, potential outcomes are evaluated for the purpose of giving advice/recommendations to the grower prior to adopting one or more changes (e.g., farming practice changes).

In various embodiments, the relationship between metadata within the field object (e.g., the field identifier, the methodologies, and an ecological outcome) becomes immutable when an ecosystem credit associated with the metadata within the field object has been generated (i.e., when an ecosystem credit representing an outcome of a change in practices reflected in the field data object is issued by a registry). In various embodiments, the relationship between metadata within the field object (e.g., the field identifier, the methodologies, and an ecological outcome) and a production data record for the field becomes immutable when a token representing an ecosystem benefit associated with the metadata within the field object is transferred to another party, or when a physical product associated with the field identifier is transferred to another party. In various embodiments, the relationship between different fields of a sustainable data record are made immutable at different times, for example: the relationship between metadata within the field object (e.g., a zone-cycle, the field identifier, a methodology, and an ecological outcome) become immutable when a token representing an ecosystem benefit is generated, and the relationship between the metadata within the field object and an amount of physical product in a production data record for the field becomes immutable when the amount of physical product is transferred to another party. A transfer can, in various embodiments, represent a change in ownership, a change in virtual location (for example, transfer within a registry account structure, for example retirement), a change in a physical product's location (for example, delivery to a grain elevator), or a change in a physical product's state (for example, upon conversion of a raw agricultural product to a processed product). In a further example of immutable relationships between different elements of a sustainable data record developing over time, each component of a sustainable data record referenced may have numerous immutable relationships between within the sustainable data record structure that are added over time. For example, a new immutable relationship may be generated between metadata within the field object (e.g., a zone-cycle, the field identifier, a methodology, and an ecological outcome) for each zone cycle within a period of time associated with an ecosystem credit (e.g., for a credit associated with 100 year permanence period). In a further example, a new immutable relationship may be generated between metadata within a field object and the amount of physical product in a production data record for each harvest period, for example for each harvest period that the field is used to produce physical product.

In various embodiments, when a credit is sold, the system generates a publicly-verifiable record of at least a portion (e.g., all) of the field object. In various embodiments, the publicly-verifiable record is recorded in a blockchain ledger. In various embodiments, the field object includes a privacy token. In various embodiments, the publicly-verifiable record may include a hash of the privacy token, one or more methodologies, and/or the credit outcome(s) (e.g., a number of credits).

In various embodiments, once an immutable outcome is produced, one or more derivative mutable objects are created to track the application of that field data object (and therefore, the authorized credit token associated with the field data object). In various embodiments, transfer of a token representing an ecosystem benefit may be tracked. In various embodiments, splitting and/or merging (packaging) of tokens representing an ecosystem benefit may be tracked via the derivative mutable objects. In various embodiments, the one or more derivative mutable objects may include a reference (e.g., a pointer) to the immutable field data object. In various embodiments, one or more derivative mutable objects may be used to track agricultural products resulting from the particular field and the product's association with the immutable credit outcome (e.g., farming practice changes to produce less greenhouse gases).

In various embodiments, once an application (e.g., sale) of a credit or part of a credit is recorded (either to offset emissions or to command premiums for a product), the sale may be recorded in the field data object and the mutable field data object is toggled to an immutable state, thereby recording forever the application of that credit outcome. In various embodiments, toggling the data object to an immutable state prevents double application of a credit.

In various embodiments, data related to the particular field may be collected. In various embodiments, the data is pre-processed (e.g., cleaned, normalized, etc.). In various embodiments, the data is populated within the respective field data object. In various embodiments, the data is continuously received from one or more sources (e.g., periodically, in real-time, etc.).

In various embodiments, accuracy of the data is verified. In various embodiments, the collected data is cross-referenced against other data sources known to be accurate, such as, for example, a publicly-available government database (e.g., soil database), machine data, or satellite imagery.

In various embodiments, the completeness of the data is determined. In various embodiments, missing data is synthesized. In various embodiments, collected data is provided to a trained learning model to thereby synthesize any missing data values from the collected data. In various embodiments, the applicability of the collected data to the one or more methodologies (including additionally) is determined. In various embodiments, if collected data is not applicable to the accessed one or more methodologies, the collected data is removed (e.g., deleted) from the field data object to thereby conserve object size.

In various embodiments, one or more models are applied to the field data object. In various embodiments, the one or more models receive as input the field data object, extract the metadata contained therein, and generate one or more outputs based on the metadata. In various embodiments, the one or more outputs include an estimated effect size (e.g., the effect of a practice change) and uncertainty associated with the estimate.

In various embodiments, a list of potential outcomes (and/or credits associated with the outcomes) is provided to a user associated with the field for which the field data object represents. In various embodiments, the user selects one or more of the determined outcomes. In various embodiments, the system may authorize the issuance of ecosystem credits based on the one or more selected outcomes. In various embodiments, the one or more determined outcomes are provided to the user in a ranked list. In various embodiments, the ranked list is ranked based on economic benefit to the user (e.g., a higher monetary value paid to the user for a particular practice change will be presented first before a lower monetary value). In various embodiments, the system determines at least one optimal outcome for the user. In various embodiments, the optimal outcome includes at least one local maximum (e.g., a maximum short-term benefit, such as a maximum cash paid up-front for a particular practice change or a maximum estimated immediate greenhouse gas reduction). In various embodiments, the optimal outcome includes a global maximum (e.g., a maximum long-term benefit, such as a maximum amount of cash paid out over time or a maximum estimated greenhouse gas reduction over time). In various embodiments, the system pre-selects one or more of the determined outcomes representing the maximum value path for the emission reductions associated with one or more programs. In various embodiments, because proposing mixtures of credits to verifiers is generally only performed once, verifiability and timeliness/cost (e.g., more or less verifier time) may be taken into account when presenting or selecting the one or more credits with the maximum value to the user. For example, if a particular credit has a high monetary value, but takes a long time to verify and/or has a high cost to verify, the system may provide and/or select another credit (e.g., the next-highest monetary value credit).

In various embodiments, the system may receive one or more approved mixtures from verifiers. In various embodiments, the mixture(s) which maximize ultimate value (e.g., immediate monetary value to the grower, longer-term value, etc.), minimizes risk of the credit issuer and/or credit authorizer, and satisfies a need for liquidity so that growers can be paid out in a timely manner.

In various embodiments, once verified data is received from the grower and the methodology relevant to the data are determined (e.g., what methodology the data will satisfy either directly or after allowed gap-filling techniques) will satisfy, the system applies the model(s) to determine the effect size and uncertainty for a field. In various embodiments, determination of methodology is based on a particular time period for the field, for example a zone-cycle.

In various embodiments, a field may be excluded from some or all issuances for a particular time period. In various embodiments, the field may be included in a single issuance for a particular time period. In various embodiments, the field may be included in a combination of issuances for a particular time period. In various embodiments, two or more combinations of ecosystem credits may be submitted to one or more verifier. In various embodiments, if only single issuances will be used, the field may be submitted to multiple verifiers, but only one acceptance from a single verifier will be used. In various embodiments, fields are excluded from credit seeking for a specific issuance if they are (among other reasons): 1. incomplete or otherwise not modelable and the field is applying for their first year (i.e., the field has no credit liability); 2. the field has left the program and any future payments on their earned credits are ceased (e.g., to minimize the impact of untracked reversal); 3. the field makes it through modeling and the system decides to not seek credits for the field through a specific issuance and there are no liabilities in that issuance (e.g., previously issued credits which require reversal tracking); 4. it is the field's first year applying and the system is placing a hold on the field to include the field in a later issuance to minimize an uncertainty value.

In various embodiments, data collected includes agronomic data. For example, agronomic data includes any of the following information: crops planted, planting date, crop outcome (harvesting, termination, crop failure, etc.), method of harvesting (if any), date of harvest, yield (volume & area); cover crop planted (if any), species of cover crop (percentage of blend of species if more than one species was planted), cover crop planting date, date the cover crop was harvested or terminated, method for harvesting or terminating the cover crop; fertilizer applied (if any), type of fertilizer, fertilizer application rate, date of fertilizer application, nitrification inhibitor applied (if any), urease inhibitor applied (if any); organic amendments applied (if any), organic amendment application rate, organic amendment application date, method of organic amendment application; grazing (if any), type of animal grazed, number of animals grazed, dates of grazing, hours per day of grazing; and/or irrigation (if any), irrigation type, irrigation dates; tillage (if any), tillage method, tillage dates; passive direct capture technology applied (if any), a date of application of a passive direct capture technology. In various embodiments, agronomic data are collected contemporaneously with their generation (for example, a planted date is collected from a machine while that machine is planting), or agronomic data are collected days, months, or years after the associated agronomic events occurred (for example, historical satellite imagery). In some embodiments, the system receives information describing an agricultural product, for example a supply chain for a processed product, and estimates the associated agronomic data completely from historical data (for example, satellite data).

In various embodiments, the collected data includes conservation data. For example, conservation data includes any of the following information: highly erodible soil, wetlands, and other protective statuses, soil types like Histosols; drainage type; past land clearing practices (if any), dates of past land clearing practices; participation in other conservation programs; and/or adherence with environmental protection regulations (if applicable), such as Clean Water Act Data may be collected by a number of different technologies: photographs submitted thorough a mobile app, machine data, in-ground or remote sensors (including satellites), receipts (including scale tickets), public data sets (including the EPA ECHO database, Cropland Data Layer).

In various embodiments, data is continuously submitted to the models (e.g., data is recorded in the data objects that are provided to the models). In various embodiments, continuous submission may be required of fields regardless of whether the field is credit generating for each issuance. In various embodiments, models require submission of information about excluding a field from an issuance to prevent fraud. In various embodiments, data are submitted at least once per year for each field. In various embodiments, subsequent submissions have similar content to an initial monitoring report but cover the period between the previous filing and the end of the issuance. In various embodiments, growers are prompted to provide information about their ongoing practices through a data portal and submit to a data validation process. In various embodiments, once data validation is complete, a final file is submitted for the reporting period which triggers model runs. Where an event is "automatically" triggered, in some embodiments, it is initiated without additional human intervention. In various embodiments, the final file is made immutable and appended to the field data object. Optionally, the model and model version (for example, a version number of a model may be updated each time a parameter file, input database, or source code change is made) are immutably associated with the final file and the model output or output indicator. In some embodiments, one or more of the final file, model version number, and output indicator are recorded in a ledger, for example a blockchain ledger.

In various embodiments, the model outputs two predictions for two scenarios: with-project and baseline (counterfactual). In various embodiments, the models apply a Markov chain Monte Carlo (MCMC) regime so many outputs (e.g., thousands of iterations) are determined to produce final predictions for each scenario. In various embodiments, total emissions (or sequestration) are estimated over each scenario. In various embodiments, a difference between the with-project and baseline estimates is computed to arrive at the emissions reduction. In various embodiments, liquidity requirements may be provided to the methodology. In various embodiments, determinations of subsetting the issued population and splitting the population between issuances is automated.

In various embodiments, if a field generates multiple ecosystem benefits for the same period, the final files associated with each benefit may be submitted to a compliance verification system. The compliance verification system, compares the metadata bundle (e.g., final file) of each ecosystem benefit with a zone-cycle database to authenticate each benefit (for example, the data and methodology associated with each benefit are compatible with the methodology requirements of all methodologies associated with the same zone cycles, e.g., the benefits are distinct in time, space, or type). In various embodiments, if a field is included in multiple issuances for the same period, information may be submitted about the other issuances to each respective verifier and show proof that there is no double counting of issuances for a particular field. In various embodiments, the monitoring report submitted to every involved verifier includes model outputs and the chain of calculations that leads to the various mixtures of credits being proposed.

In various embodiments, emissions reductions and additionally verifications are reported to a publicly-auditable place. In various embodiments, emissions reductions and additionally verifications are attached with corresponding values to the issuer of credits.

In various embodiments, double counting can be in respect to both (1) effect size and (2) additionally requirements. An example of effect size double counting would be selling the same GHG emission reductions as two types of credits. An example of additionally double counting would be selling a GHG emission reduction credit and a water use abatement credit, but those both resulted from the same practice change and therefore that practice change can only be considered additional under a single methodology.

In various embodiments, crediting process for each methodology may be applied (e.g., in reporting and/or review. In various embodiments, an ecosystem credit authorizer and a grower collaborate to collect and format data about an operation. In various embodiments, the data is verified by the ecosystem credit authorizer with feedback from the grower to ensure the program meets certain internal standards of quality to thereby ensure the expected results from methodology-specific independent review. In various embodiments, initial received data is used to verify new data received in the future. In various embodiments, data is translated to model inputs and outputs. In various embodiments, information about the model that was applied (e.g., model, version, etc.) and the parameters it was applied with are carried forward with the model inputs and outputs. In various embodiments, practice data, model inputs, model outputs, and/or accompanying metadata are packaged and submitted to an independent verifier. In various embodiments, the data package is cryptographically signed by the ecosystem credit authorizer. In various embodiments, a verifier has access to inspect the software and model. In various embodiments, the verifier is provided with specific inputs, so that they may generate outputs using the model(s) to ensure that outputs match. In various embodiments, verifiers may include companies and/or other organizations that specialize in auditing ecological programs.

In various embodiments, if an independent modeling partner is commissioned, a signature may be provided to ensure the modeling partner produced the model outputs submitted to the verifier. In various embodiments, the ecosystem credit authorizer will sign their data including model inputs and the partner will sign their outputs and metadata plus the model inputs so the full chain of inputs can be checked. In various embodiments, verifications generally ensure that the practices on a farm are complete and self-consistent (e.g., that every crop planted is terminated in some way, etc.) and that the quantitative values provided by a grower fall within expected norms (e.g., as determined by literature review and/or an engineering consultation). In various embodiments, when a grower provides suitable evidence that what they reported is accurate, no verifications need to be performed. In various embodiments, certain data are replaced with conservative default values (e.g., values that represent normal operation of a farm among a cohort of similar growers or with practices in another time period on the same field). Conservative generally means that the values are likely to result in neutral model results. In various embodiments, emissions reductions are calculated at a per-field or sub-field level. In various embodiments, the emissions reductions are reported at a per-field or sub-field level alongside the project wide totals. In various embodiments, the field IDs or sub-field IDs are used to find the respective model outputs and from there the model inputs.

In various embodiments, the verifier approves or rejects some or all of the submission including specific combinations of issuances that were submitted. In various embodiments, the verifier results are obfuscated such that the field may still be identified. For example, the field's location may be replaced with an anonymous identifier, information about practices and the approved or rejected outcomes may be anonymized. In various embodiments, the anonymized information from the verifier is packaged. In various embodiments, that package is published by the verifier publicly in a traceable way (e.g., website with CA certificate) and/or cryptographically signed by the verifier using a published public key. In various embodiments, any PII and/or commercially-sensitive information that isn't relevant to the auditing process is obfuscated or removed entirely, such as site locations and field boundaries, business contact information, ownership/organizational information, etc.

In various embodiments, credits are accepted from one or a combination of the methodologies. In various embodiments, the ecosystem credit authorizer employs a system for confirmation and or verification. The confirmation/verification system, determines, of the approved possible combinations of methodologies, which will be used for a field for a period to generate credits. In various embodiments, the confirmation/verification system provides: 1. the determined credit outcome is approved by all of the verifiers necessary for the programs a field is enrolled in; and 2. which programs the field is currently enrolled in. In various embodiments, the confirmation/verification system receives a request to verify one or more credit outcomes for a specified zone-cycle. In various embodiments, the methodology models may be used to verify an outcome occurred (e.g., a signature from a verifier provides proof that an outcome occurred). In various embodiments, to provide an indication that the credit outcome is approved by all verifiers, the confirmation/verification system points to or includes signed artifacts from the necessary verifiers. In various embodiments, to provide which programs the field is currently enrolled in, the confirmation/verification system (1) publishes for public audit a listing of each field (optionally, by obfuscated identifier) and the programs they are enrolled in and/or (2) reports to a third party which programs each field is in and have the third party publish or sign something accordingly (with revocation or a valid time period).

In some embodiments, the confirmation/verification system reports to a third party which programs each field is and the confirmation/verification system publishes (for example, a certificate) or signature (with revocation or a valid time period). In various embodiments, the confirmation/verification system (1) publishes for audit a listing of each field (optionally, by obfuscated identifier) and its field metadata for one or more zone-cycles and/or (2) reports to a third party, field metadata for one or more zone-cycles and the confirmation/verification system publishes (for example, a certificate) or signature (with revocation or a valid time period). In some embodiments, the confirmation/verification system publishes a certificate or signature which may be automatically renewed or cancelled upon confirmation or failure to confirm occurrence of one of more farming practice or ecosystem outcome. In various embodiments, occurrence or non-occurrence of a farming practice may be determined via automatic monitoring of production locations (e.g., practice detection via analysis of remote sensing data, data feeds from production equipment and or ground based sensors, examples of which are presented below) or automated prompts to a client device of a farmer.

In various embodiments, once a field is enrolled in a program (which implements a methodology) the field is required to be continuously monitored under that methodology and must be submitted for verification through the monitoring period to be eligible for future payments. In various embodiments, one or more verifier for each methodology is tasked with ensuring that they received a field's data for every prior issuance when processing any future issuances for a field. In various embodiments, continuous monitoring is performed in the same way as initial monitoring. In various embodiments, continuous monitoring is incentivized by both ongoing credit generation and continued payments on previously issued credits. In various embodiments, if a grower chooses not to participate, future payments will be halted under the assumption of complete reversal and deductions from the ecosystem credit authorizer's buffer pool will be made accordingly.

In various embodiments, growers are penalized for missing data on verified additional practice changes. For example, if a grower doesn't meet verification requirements for additionally-related events, then they will be excluded from the program going forward. In various embodiments, certain events that are not penalized are gap-filled with synthesized data (for example, farming practices detected by current and or past remote sensing data collected from the field or similar fields, such as those fields with similar past production and farming practices as determined by remote sensing data within the same supply shed).

In various embodiments, additionally and net sequestration are separate concepts. In various embodiments, if a grower reverses an additional practice, they may no longer be eligible for any crediting and are unlikely to produce credits regardless. In various embodiments, if net sequestration is zero or negative, the grower will not be issued any credits and negatives are accounted for from the ecosystem credit authorizer's buffer pool.

In various embodiments, credits are bought and sold by growers. In various embodiments, the ecosystem credits are tracked throughout the lifecycle, including post-sale to other future holders of the credits. In various embodiments, ecosystem attributes can be traced through processing and transportation back to the originally-issued credits for a particular field (for example, a particular zone-cycle) such that there is no double counting. For example, ecosystem credits are tracked in a chain of transactions so that an ecosystem credit authorizer does not sell the same credit twice. In various embodiments, if credits are sold directly to the end user seeking of offset an environmental activity (e.g. greenhouse gas emission), the ecosystem credit authorizer records in an auditable database that the credit was created and then retired. In various embodiments, any change in singular ownership is recorded in an auditable database. In various embodiments, ecosystem attributes for each action applied to a physical product (e.g., processing, storage, transportation, etc.) are recorded along with originally-issued credits for a particular field (for example, a particular zone-cycle). In some embodiments, an ecosystem credit authorizer receives a request (e.g., from a purchaser or user of a product) to verify an ecosystem attribute of a product and the ecosystem credit authorizer returns an audit report including verified ecosystem attributes of the product and a certification that no conflicting ecosystem benefits have been attributed to the same zone-cycle in which the raw agricultural product was produced.

In various embodiments, the ledgers, databases, and tracking/tracing described herein is compatible with the fungible status tracking portion described below.

In various embodiments, an ecosystem credit token may be split into subunits (e.g., where multiple parties own a portion of a single ecosystem credit provided the sum of all parties' percent ownership is 100% or less). In various embodiments, splitting ecosystem credit tokens is accomplished by the credit originator keeping a public ledger of those transactions with an API or business process to submit transactions. In various embodiments, the public ledger is maintained by one or more independent organization (e.g., a methodology organization). In various embodiments, the ledger may be decentralized. In various embodiments, the ledger is a blockchain ledger. In various embodiments, the ledger is based on a protocol for each holding party to publish their own ledger of credits created, bought, sold, and retired and that trail could be audited before and after transactions. In various embodiments, the ledger may be operated by an independent exchange, where the ledger isn't public and trust is placed on the exchange itself to ensure the ledger balances. In various embodiments, if a proof-of-work-based ledger is used, the amount of electricity used and the GHG emissions associated with that electricity is not insignificant and an estimate of those emissions are deducted from the un-retired credit for every transaction associated with it. In various embodiments, a minimum value is set such as 1 kg carbon dioxide equivalent ($CO_2e$) (~1 miles driven in a truck).

In various embodiments, once all the verifications are performed and the user (e.g., a, grower) accepts a proposed ecosystem credit or mixture of ecosystem credits, the ecosystem credits are authorized by the ecosystem credit authorizer based on the change in practice. In various embodiments, a mutability indicator in the field data object is toggled such that the field data object becomes immutable. In various embodiments, the immutable data object may be recorded in a ledger, as described above.

In various embodiments, systems, methods, and computer program products are provided for recording and auditing consumption of products associated with ecosystem credit tokens by consumers. In various embodiments, a token is a digital representation of one or more ecosystem credit assets (e.g., one or more ecosystem credits) comprising programmable, verifiable, and or traceable rights management attributes. In various embodiments, the token includes any suitable data structure configured to represent rights in an ecosystem credit. For example, a single token may represent a single, predetermined right in an ecosystem credit. In another example, a single token may represent two or more ecosystem credits associated with a single production identifier. In various embodiments, the rights defined in the token are based (e.g., dependent) on the outcome of the selection of the ecosystem program that was selected. In various embodiments, the token is a digital representation of an asset and has programmable, verifiable, and/or traceable rights management. Suitable data structures may include: arrays, hash tables, stacks, queues, heaps, linked lists, trees, graphs, and/or an abstract data type. In the example of an abstract data structure, the data structure may be instantiated as a data object in an object-orientated programming language where the data object includes the various fields of the token and/or the relationships between the fields. In various embodiments, the data object may be configured to allow a user to toggle one or more of the fields. In various embodiments, the data object may allow a user to toggle the field(s) only once such that any additional user toggle requests would not toggle the value (e.g., would return an error). In various embodiments, a field may have two statuses and be toggled between the two statuses. In various embodiments, a field may have only one possible value and the presence of that value indicates one state, while the absence indicates another state.

Figure 2:
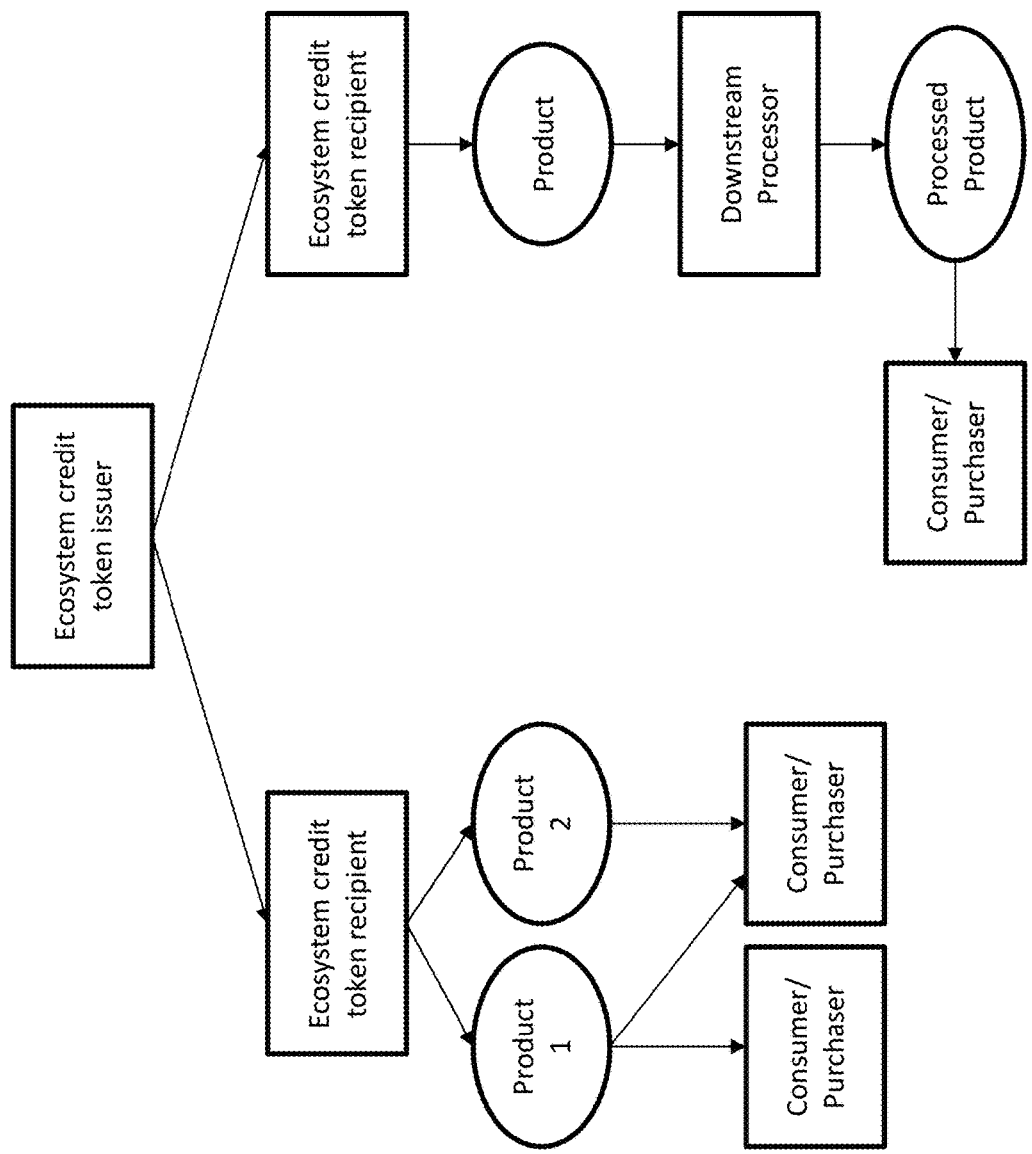
FIG. 2 illustrates an exemplary environment with an ecosystem credit token issuer and multiple token recipients according to embodiments of the present disclosure.

In various embodiments, as shown in FIG. 1, one or more ecosystem credit tokens (e.g., corresponding to carbon credits) may be issued by an ecosystem credit token issuer (e.g., a project developer of an ecosystem credit generating project) to one or more entities (e.g., a producer or consumer of products). In various embodiments, the entities may purchase ecosystem credit tokens on a secondary market in addition, or as an alternative, to being issued ecosystem credit tokens. In various embodiments, when acquired by the entity, the ecosystem credit tokens may be fungible with any other ecosystem credit tokens issued by the issuer or purchased in the secondary market. Because consumers may want to know how the products they purchase use sustainable practices, which may be associated with the ecosystem credit tokens, the present disclosure describes a process for converting fungible tokens (or subunits of one or more fungible token) into non-fungible tokens such that the non-fungible tokens (or subunits of one or more fungible token) uniquely correspond to a particular product purchased by a consumer. In various embodiments, the process of converting the fungible token to a non-fungible token may occur when a particular event (e.g., a sale, harvest, etc.) occurs. FIG. 2 illustrates relationships of products and processed products purchased by consumers, purchasers, and/or downstream processors to an ecosystem credit token issuer.

In various embodiments, the ecosystem credit token may include metadata. In various embodiments, any portion or all of the metadata for the ecosystem credit token may be included as metadata in the field data object described above. In various embodiments, the metadata may include a field indicating whether the token is fungible or non-fungible. In various embodiments, the field may be toggled to a value representing that the token is non-fungible. In various embodiments, once toggled, the field may be immutable and unable to be switched back to the original value (i.e., fungible). In various embodiments, the field is added only to indicate a non-fungible status and once added is immutable. In various embodiments, a fungible token is burned and replaced by a non-fungible token. In various embodiments, metadata associated with the ecosystem credit token may include information that is needed to associate the credit. In various embodiments, metadata associated with the ecosystem credit token may include at least one of: a product type, product name, product location, product quantity, product production time, product production location (or a unique identifier representing the same), or product production practice.

In various embodiments, a product identifier may be a unique identifier identifying a product, a production location, and/or a production period (for example, a growing season or harvest date). For example, a product identifier may be a unique identifier identifying a product, and an management zone and production period within which the product was produced. In various embodiments, a product identifier may be generated at any suitable time. For example, a product identifier may be generated at the time a product begins production (e.g., at planting), at the time a product is produced (e.g. at harvest), at the time a product is sold, and/or at the time an ecosystem credit generated using product metadata is issued or sold. In various embodiments, the product identifier may be unique to the product. In various embodiments, the product identifier may be immutable throughout the product lifecycle. In various embodiments, the product identifier may be made immutable after a product is harvested. In various embodiments, a product identifier may correspond to any quantity of a product. In various embodiments, a product identifier may identify a production location, a crop, and/or a production season. In various embodiments, the producer may sell that harvest in any number of transactions of any size. In various embodiments, the product associated with each of those sales may be resold several times for a number of reasons. For example, the product may be sold/resold as arbitrage trades, changing hands in the distribution channels for raw commodities, various processing steps (including where multiple by-products are created and each may retain association with the product identifier).

In various embodiments, a product identifier may correspond to a predetermined quantity of a product (e.g., 5000 bushels of corn). In various embodiments, a product identifier may correspond to an individual product (e.g., wheat).

In various embodiments, the product identifier may be generated centrally, or in a distributed manner. In various embodiments, when generated centrally, a single authority may be responsible for assigning and tracking product identifiers. In various embodiments, when generated in a distributed manner, the identifier may be generated algorithmically in a manner that avoids collisions.

In various embodiments, the product identifier may be associated with any suitable number of quality attributes, ecosystem attributes, ecosystem impacts, ecosystem credits, and or ecosystem credit tokens. In various embodiments, each quality attribute may be differentiating for the product. In various embodiments, the quality attributes of a product may grow and/or change over time. For example, one or more quality attributes may change when a commodity is sorted (e.g., to remove broken kernels), a portion of the commodity is damaged in storage, a ecosystem credit token is later generated and associated with production of the product, and/or validity of an ecosystem credit associated with production of the product is verified and monitored over time. In various embodiments, verifying and monitoring may comprise self-reporting by producers, visits to production locations by third-party verifiers, remote monitoring of production locations (e.g., practice detection via analysis of remote sensing data, data feeds from production equipment and or ground based sensors). In various embodiments, a project developer, verifier, or ecosystem credit issuer (e.g., registry) may provide updates to the ecosystem credit token metadata over time, for example, as milestone permeance verification periods are achieved or not achieved. In various embodiments, the ecosystem token metadata may include a field to indicate whether the complete amount of one or more ecosystem credits is available and suitable for transacting. In various embodiments, if an ecosystem token having a non-fungible status is associated with an ecosystem credit that subsequently is determined to have a reversal of an ecosystem benefit, the determination of a reversal triggers the system to identify and automatically change the status of any fungible ecosystem tokens having the same product identifier as the ecosystem credit having the reversal to a non-fungible status, wherein the quantity of the total ecosystem benefit currently associated with the original plus the additional ecosystem tokens having the same product identifier is equal to the amount of ecosystem benefit associated with the original ecosystem credit when that ecosystem's non-fungible status was first set.

In various embodiments, when generating ecosystem credit tokens according to ecosystem credit metadata, a product producer (e.g., grower) may own the credit and the project developer may be the agent. In various embodiments, the project developer may own the credit and may perform an accounting of X % of sales to the product producer. In various embodiments, a product producer may place limitations on the way in which ecosystem credits are sold. In various embodiments, the limitations on sale may be managed by restrictions on the tokens. For example, a product producer may want to hold onto their assets (e.g., until a target price for an ecosystem credit is achieved). In another example, for contract growers or direct corporate producers, the product producer may want to associate their ecosystem credits to their production but not sell (because the product producer may also be processing and marketing the end product).

In various embodiments, product metadata may be submitted to the system by a grower or a third party. In various embodiments, the product metadata may be submitted via an online web portal after the particular grower or third party logs in with unique credentials. In various embodiments, product metadata may be submitted by one party, and then verified by another party. For example, a product producer (e.g., grower) might submit information on growing practices, while a third party lab might submit a separate verification based on soil samples or other testing. In various embodiments, product metadata may be submitted automatically by in-field sensors. In various embodiments, product metadata may be submitted automatically from remote sensing systems.

In various embodiments, product metadata may be stored and maintained in a central datastore (e.g., by linking product attributes to a product identifier in a relational database), or may be maintained in a distributed manner, such as in a public ledger implemented in blockchain.

In various embodiments, a grower or third party may be verified before the entity is permitted to submit product data. In various embodiments, verification may be submitted, for example, by applying a cryptographic signature to metadata. In various embodiments, a public key infrastructure may be maintained to allow verification of a signature.

In various embodiments, the verification process may include various checks and approvals based on data points and/or validation signals of a grower or third party. In various embodiments, verification processes may be performed using one or more APIs. In various embodiments, verification processes may be performed using one or more File Feeds. In various embodiments, verification processes may be performed manually (e.g., through an automated calling or email system). In various embodiments, a verification process may be performed in partnership with key credentialing systems/agencies (e.g., governmental or private agencies). In various embodiments, the credentialing system may include a government or non-government agency. In various embodiments, the verification process may include analyzing industry standard data points and/or identifications.

In various embodiments, data points used for verification may include: a Dunn and Brad Street Number and/or mailing address, company formation details, background check information, credit check information, bank account information, etc. In various embodiments, a verification process may include: confirming that the grower or third party is verified and legitimate, validating that the grower or third party is authorized to request/receive given data. In various embodiments, the details of the grower or third party may be stored in a provider profile at a database. In various embodiments, the grower or third party may sign various authorizations to request/receive data. In various embodiments, the grower or third party may also be assigned various system identifiers and/or secure tokens for use in securing any transactions within the product data submission system. In various embodiments, a commercially-available verification process may be used. In various embodiments, a verification process may assess each grower or third party according to various industry standards, create an audit trail of documentation, send alerts when verification documents are expiring, communicate third-party risk with dashboards and point-and-click reports, etc.

In various embodiments, the status of a given product may be updated over time by supplementing the product metadata, including, for example, flagging that a crop has been harvested. In various embodiments, a grower or third party may provide updates to the product metadata over time if qualities of the product change (e.g., a pesticide is sprayed, the crop is harvested, a portion of the crops develop a disease and are unsuitable for consumption, a portion of the harvest is spoiled, etc.). In various embodiments, any suitable crop tracking or farm and/or supply chain management software may integrate with the system to automatically provide updates to the product metadata, for example, via a restful API. In various embodiments, when a product is generated and a transaction event occurs (e.g., the crop is harvested, the crop is sold, the crop is processed into another product and sold, etc.), the pre-generation production metadata may be associated with that transaction so that it can be traced throughout the supply chain. In various embodiments, the product identifier is not required to be a particular unique string. In various embodiments, the product identifier may be a unique combination of a production location, a crop, and/or a production season.

In various embodiments, where metadata is associated with a bulk commodity, the metadata may include a field for identifying partial or complete destruction of the commodity. For example, if half of the commodity is spoiled or otherwise unable to be transacted with (e.g., not to specification), a field identifier may include a percent (e.g., 50%) of the bulk commodity that is usable for a transaction. In various embodiments, the product metadata may include a binary field to indicate whether the complete amount of the bulk commodity is available and suitable for transacting.

In various embodiments, the recipient metadata may be incorporated into the token when the token is issued. In various embodiments, recipient metadata may include a transaction identifier (e.g., an Ethereum transaction), a product producer (e.g., grower) or third party identifier (e.g., name), and/or a location of the recipient.

In various embodiments, an update to the product metadata may be verified. In various embodiments, ranges of values that are known to be suitable for a product may be permitted, while values that are out of those ranges may be blocked from being submitted. In various embodiments, the system may query a third party database (e.g., a government soil or land management practice database) to confirm product metadata that has been submitted. In various embodiments, the system may pull product metadata automatically, for example, via an API.

In various embodiments, a product may be linked to a token when a predetermined event has occurred. In various embodiments, instantiation of a product identifier, addition and/or verification of metadata, or a product transaction may trigger an event. In various embodiments, the event may be delivered to one or more event listeners automatically. In various embodiments, the one or more event listeners may link the product (e.g., using the unique product identifier) with an ecosystem credit token (or portion of an ecosystem token if the token is subdivided into smaller units). In various embodiments, the one or more event listener may package the relevant information up to be processed and written to a public ledger (e.g., a blockchain ledger). For example, an ecosystem credit issuer may register as an event listener for harvest of a crop. In response, the event listener can perform the computations necessary for the issuance of an ecosystem credit token to the ecosystem credit project developer, harvester, and/or product producer (e.g., grower).

In various embodiments, an ecosystem credit issuer may include a registry of ecosystem credits. In various embodiments, a project developer may issue ecosystem tokens based on the ecosystem credit registry data. In various embodiments, the ecosystem credit issuer is a different entity from the entity generating the ecosystem credit token.

In various embodiments, an ecosystem credit issuer reads product metadata in order to generate and issue an ecosystem credit to a recipient. An ecosystem credit issuer system reads product ecosystem credit metadata and, optionally, any available product transaction data in order to issue an ecosystem credit and/or generate an ecosystem credit token. As part of this process, it will verify the input data by checking signatures. As noted above, the credit generation may be initiated as a result of a predetermined event, such as harvest.

In various embodiments, ecosystem credit token generation may be performed prior to production (e.g., harvesting) of the product (e.g., a crop). In various embodiments, credit generation, production, and assignment of a credit to a product may be temporally distant from each other. In various embodiments, ecosystem credit token generation may be performed after or concurrent with ecosystem credit issuance. In various embodiments, ecosystem credit issuance and ecosystem credit token generation associated with a product, production location, and production period (e.g., growing season), occur after the production period. In some embodiments, weeks, months or years after the production period and or product sale.

In various embodiments, a token may be cryptographically signed by an issuer in order to provide future authentication. In various embodiments, credits may be maintained within a project developer's account at the registry. In various embodiments, if the credit sold, the credit of the seller can be transferred to the registry account of a buyer and/or retired within the project developer's account. In various embodiments, a project developer may have a registry account which contains active (i.e., unsold) credits, as well as subaccounts for retired (i.e., sold and "used" without being transferred to another party). In various embodiments, any digital token may have an indicator as to whether the generated credit has been retired and, if so, by whom and for whom. In various embodiments, a buyer may take ownership of the credit(s), in which case a project developer may transfer the credits into their registry account. In this example, the buyer may then keep the credit(s) as active or retire the credit(s) at their own discretion.

In various embodiments, the ecosystem credit tokens may be maintained in a central datastore. In various embodiments, the ecosystem credit tokens may be maintained in a distributed manner, such as in a public ledger. In various embodiments, the public ledger may be implemented in blockchain.

In various embodiments, registry credits may be serialized. In various embodiments, accounting of registry credits may be performed within the registry system. In various embodiments, maintaining a ledger outside of the registry may enhance the ability to check for double registration of a project between multiple registries.

In various embodiments, to authenticate a token, the token may be presumed to be computed correctly based on trust in the credit issuer. In various embodiments, the issuer may be verified similar to the grower and/or third parties as described above before the issuer is permitted to interact with the system (e.g., issue ecosystem credit tokens to a particular project developer, grower, or third party). In various embodiments, the validity of the token itself can be authenticated by verifying a cryptographic signature of the issuer.

In various embodiments, one or more ecosystem credit tokens may be divided into two or more subtokens. In various embodiments, the division of tokens into subtokens may be performed using a blockchain protocol. In various embodiments, the tokens may be generated having a smallest unit of subdivision pre-defined based on a standard, such as an Ethereum standard for tokens. In various embodiments, the subtokens that collectively make up a single token may be tracked and verified as is known in the art according to various blockchain standards, such as the Ethereum standard.

In various embodiments, while ecosystem credits may be issued in bulk, in various scenarios it is advantageous to uniquely associate credits with a given product. To accommodate this, a token may be toggled from a fungible status to a non-fungible status. The token is thus indelibly linked to a product. The product may then change hands, but the ecosystem credit may be verified by relying on the link between the token and the product.

Figure 3:
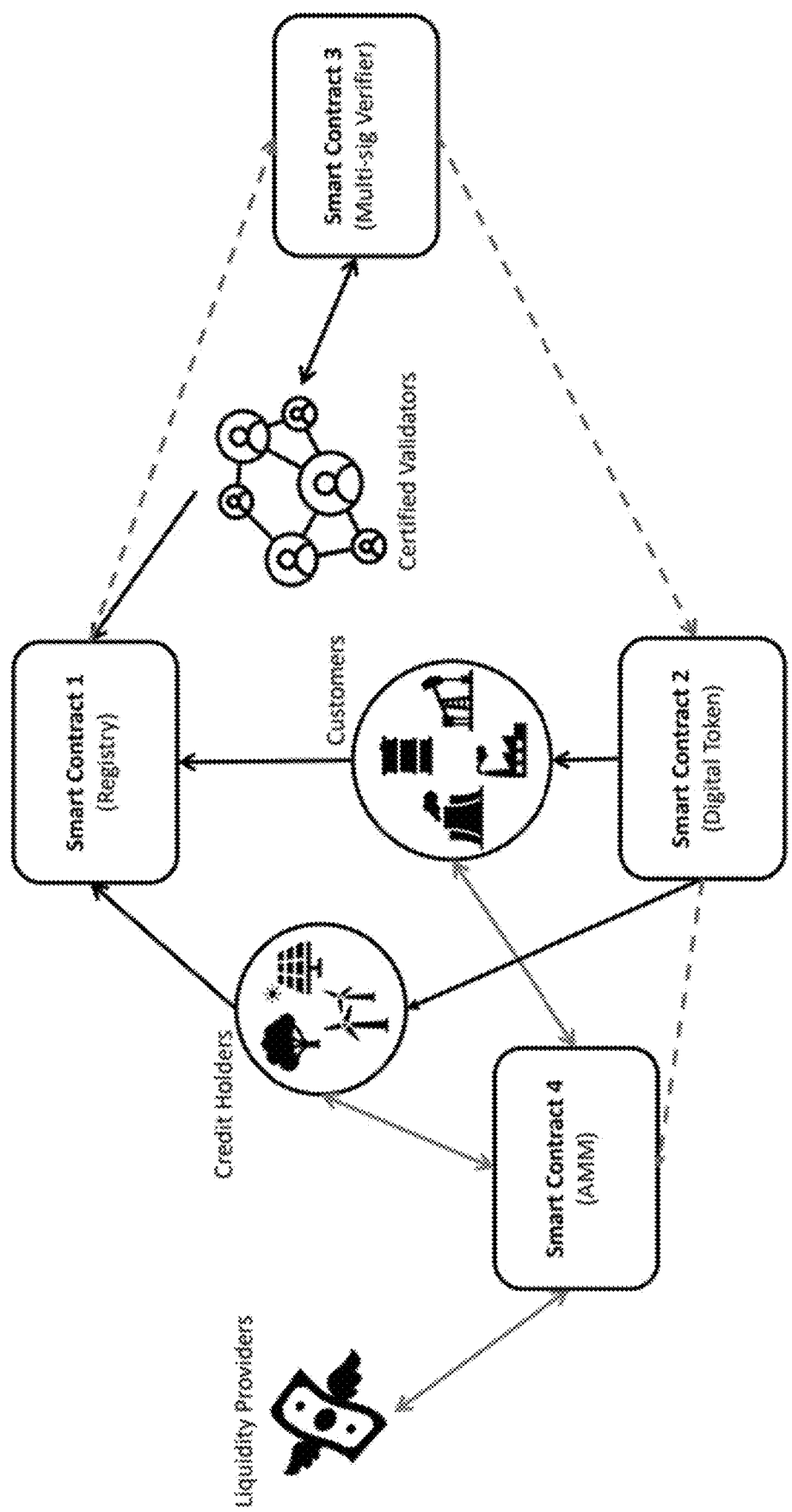
FIG. 3 illustrates an exemplary system architecture based on a blockchain ledger according to embodiments of the present disclosure.

FIG. 3 illustrates an exemplary system architecture based on a blockchain ledger. In various embodiments, blockchain technology provides an immutable, cryptographically-secured distributed ledger on the blockchain allows for reliable issuance and tracking of carbon credits. In various embodiments, public blockchains may be easily accessible to small and medium-sized enterprises, reducing the entry threshold for the carbon trading market. In various embodiments, the information provided by growers and third parties is transparent and accessible to everyone. In various embodiments, automated market makers (AMMs) may be developed on blockchains allowing for the trading of digitized assets directly on the blockchain without intermediary and minimal algorithmic fees. In various embodiments, AMMs may provide the infrastructure required to create a digital carbon credit ecosystem and engage all the stakeholders.

In various embodiments, a blockchain ledger for issuing ecosystem credit tokens may function based on the Ethereum protocol. In various embodiments, the tokens may be generated using the ERC-20 standard for fungible tokens. In various embodiments, the ERC-20 standard provides for functions including: determining total amount of tokens, determining number of tokens on the balance of a specific address, provides functions for transferring tokens from a primary address to the address of another user, provides functions for transferring tokens between users, provides functions for checking the residual amount of tokens on a smart contract with the ability to withdraw funds, and provides functions ensuring that the sender has enough tokens to complete the transaction at the time of sending. In various embodiments, the tokens may be generated using the ERC-721 Non-Fungible Token Standard. In various embodiments, the tokens may be generated using the ERC-777 Token Standard.

In various embodiments, the blockchain ledger may implement one or more smart contracts for various functions of issuing and/or processing the tokens and product metadata (e.g., linking the unique product identifier to a token or portion of a token). In various embodiments, ecosystem credits may be transferred to the blockchain by converting them into digital tokens distributed to carbon credit generators after properly validation. In various embodiments, issuers and recipients of ecosystem credits may use a decentralized exchange platform on blockchain to trade and/or transfer credits.

In various embodiments, token may be retired via a "buy and burn" model by sending the given Tokens to a smart contract or defined blockchain address whose private key is not known by any party and can be visible to the collective of validators as well as regulators or other stakeholders. In various embodiments, when a token is burned, the token may be replaced with a non-fungible token when a predetermined event (e.g., a harvest or sale) occurs.

As shown in FIG. 3, the system may include four (4) smart contracts interacting with three (3) stakeholders and liquidity providers. In various embodiments, the first smart contract is a registry system on the blockchain configured to record the essential information for the following stakeholders: (a) Verifiers who validate ecosystem credits from credit holders/recipients and may verify that tokens are burnt according to a predetermined method (e.g., burn 100% of tokens own by a grower if they sell all of their harvest); (b) Credit-holders who already hold credits in the ecosystem credit trading environment; and (c) Customers who are individuals and companies interested in buying or receiving ecosystem credits and/or burning tokens.

In various embodiments, the second smart contract includes a smart contract to mint digital tokens based on predetermined criteria as described above. In various embodiments, credits are approved through a series of functions: (a) Approve credits entered by the credit-holders, which is certified by the verifiers, (b) Mint the token, (c) Make the token transferable and burnable, (d) Burn offset tokens, (e) Mint non-fungible tokens as a badge of successful burning tokens, which may represent, for example, offsetting carbon emissions.

In various embodiments, the third smart contract includes a smart contract with a multi-signature allows verifiers to verify the minting and burn the tokens. In various embodiments, the contract may require approval by at least 70% of the verifiers to be automatically executed.

In various embodiments, the fourth smart contract may include an automated market maker (AMM) smart contract that allows: (a) automated trading of tokens with digital money (e.g., stable coins or future central bank digital currencies), (b) provides incentives for liquidity providers (LPs) by charging a transaction fee (e.g., 0.3%) and distributing it among LPs, (c) provides a dynamic price discovery for the tokens in a free market.

Definitions

As used herein an "ecosystem benefit" is used equivalently with "ecosystem attribute" or "environmental attribute," each refer to an environmental characteristic (for example, as a result of agricultural production) that may be quantified and valued (for example, as an ecosystem credit or sustainability claim). Examples of ecosystem benefits include without limitation reduced water use, reduced nitrogen use, increased soil carbon sequestration, greenhouse gas emission avoidance, etc. An example of a mandatory program requiring accounting of ecosystem attributes is California's Low Carbon Fuel Standard (LCFS). Field-based agricultural management practices can be a means for reducing the carbon intensity of biofuels (e.g., biodiesel from soybeans).

An "ecosystem impact" is a change in an ecosystem attribute relative to a baseline. In various embodiments, baselines may reflect a set of regional standard practices or production (a comparative baseline), prior production practices and outcomes for a field or farming operation (a temporal baseline), or a counter-factual alternative scenario (a counter-factual baseline). For example, a temporal baseline for determination of an ecosystem impact may be the difference between a safrinha crop production period and the safrinha crop production period of the prior year. In some embodiments, an ecosystem impact can be generated from the difference between an ecosystem attribute for the latest crop production period and a baseline ecosystem attribute averaged over a number (e.g., 2, 3, 4, 5, 6, 7, 8, 9, 10) of prior production periods.

An "ecosystem credit" is a unit of value corresponding to an ecosystem benefit or ecosystem impact, where the ecosystem attribute or ecosystem impact is measured, verified, and or registered according to a methodology. In some embodiments, an ecosystem credit may be a report of the inventory of ecosystem attributes (for example, an inventory of ecosystem attributes of a management zone, an inventory of ecosystem attributes of a farming operation, an inventory of ecosystem attributes of a supply shed, an inventory of ecosystem attributes of a supply chain, an inventory of a processed agricultural product, etc.). In some embodiments, an ecosystem credit is a life-cycle assessment. In some embodiments, an ecosystem credit may be a registry issued credit. Optionally, an ecosystem credit is generated according to a methodology approved by an issuer. An ecosystem credit may represent a reduction or offset of an ecologically significant compound (e.g., carbon credits, water credits, nitrogen credits). In some embodiments, a reduction or offset is compared to a baseline of 'business as usual' if the ecosystem crediting or sustainability program did not exist (e.g., if one or more practice change made because of the program had not been made).

In some embodiments, a reduction or offset is compared to a baseline of one or more ecosystem attributes (e.g., ecosystem attributes of one or more: field, sub-field region, county, state, region of similar environment, supply shed geographic region, a supply shed, etc.) during one or more prior production period. For example, ecosystem attributes of a field in 2022 may be compared to a baseline of ecosystem attributes of the field in 2021. In some embodiments, a reduction or offset is compared to a baseline of one or more ecosystem attributes (e.g., ecosystem attributes of one or more: field, sub-field region, county, state, region of similar environment, supply shed geographic region, a supply shed, etc.) during the same production period. For example, ecosystem attributes of a field may be compared to a baseline of ecosystem attributes of a supply shed comprising the field. An ecosystem credit may represent a permit to reverse an ecosystem benefit, for example, a license to emit one metric ton of carbon dioxide. A carbon credit represents a measure (e.g., one metric ton) of carbon dioxide or other greenhouse gas emissions reduced, avoided or removed from the atmosphere. A nutrient credit, for example a water quality credit, represents pounds of a chemical removed from an environment (e.g., by installing or restoring nutrient-removal wetlands) or reduced emissions (e.g., by reducing rates of application of chemical fertilizers, managing the timing or method of chemical fertilizer application, changing type of fertilizer, etc.). Examples of nutrient credits include nitrogen credits and phosphorous credits. A water credit represents a volume (e.g., 1000 gallons) of water usage that is reduced or avoided, for example by reducing irrigation rates, managing the timing or method of irrigation, employing water conservation measures such as reducing evaporation application.

A "sustainability claim" is a set of one or more ecosystem benefits associated with an agricultural product (for example, including ecosystem benefits associated with production of an agricultural product). Sustainability claims may or may not be associated with ecosystem credits. For example, a consumer package good entity may contract raw agricultural products from producers reducing irrigation, in order to make a sustainability claim of supporting the reduction of water demand on the final processed agricultural product. The producers reducing irrigation may or may not also participate in a water ecosystem credit program, where ecosystem credits are generated based on the quantity of water that is actually reduced compared against a baseline.

"Offsets" are credits generated by third-parties outside the value chain of the party with the underlying carbon liability (e.g., oil company that generates greenhouse gases from combusting hydrocarbons purchases carbon credit from a farmer).

"Insets" are ecosystem resource (e.g., carbon dioxide) reductions within the value chain of the party with the underlying carbon liability (e.g., oil company who makes biodiesel reduces carbon intensity of biodiesel by encouraging farmers to produce the underlying soybean feedstock using sustainable farming practices). Insets are considered Scope 1 reductions.

Emissions of greenhouse gases are often categorized as Scope 1, Scope 2, or Scope 3. Scope 1 emissions are direct greenhouse gas emissions that occur from sources that are controlled or owned by an organization. Scope 2 emissions are indirect greenhouse gas emissions associated with purchase of electricity, stem, heating, or cooling. Scope 3 emissions are the result of activities from assets not owned or control led by the reporting organization, but that the organization indirectly impacts in its value chain. Scope 3 emissions represent all emissions associated with an organization's value chain that are not included in that organization's Scope 1 or Scope 2 emissions. Scope 3 emissions include activities upstream of the reporting organization or downstream of the reporting organization. Upstream activities include, for example, purchased goods and services (e.g., agricultural production such as wheat, soybeans, or corn may be purchased inputs for production of animal feed), upstream capital goods, upstream fuel and energy, upstream transportation and distribution (e.g., transportation of raw agricultural products such as grain from the field to a grain elevator), waste generated in upstream operations, business travel, employee commuting, or leased assets. Downstream activities include, for example, transportation and distribution other than with the vehicles of the reporting organization, processing of sold goods, use of goods sold, end of life treatment of goods sold, leased assets, franchises, or investments.

An ecosystem credit may generally be categorized as either an inset (when associated with the value chain of production of a particular agricultural product), or an offset, but not both concurrently.

As used herein, a "crop-growing season" may refer to fundamental unit of grouping crop events by non-overlapping periods of time. In various embodiments, harvest events are used where possible.

An "issuer" is an issuer of ecosystem credits, which may be a regulatory authority or another trusted provider of ecosystem credits. An issuer may alternatively be referred to as a "registry".

A "token" (alternatively, an "ecosystem credit token") is a digital representation of an ecosystem benefit, ecosystem impact, or ecosystem credit. The token may include a unique identifier representing one or more ecosystem credits, ecosystem attribute, or ecosystem impact, or, in some embodiments a putative ecosystem credit, putative ecosystem attribute, or putative ecosystem impact, associated with a particular product, production location (e.g., a field), production period (e.g., crop production season), and/or production zone cycle (e.g., a single management zone defined by events that occur over the duration of a single crop production season).

"Ecosystem credit metadata" is at least information sufficient to identify an ecosystem credit issued by an issuer of ecosystem credits. For example, the metadata may include one or more of a unique identifier of the credit, an issuer identifier, a date of issuance, identification of the algorithm used to issue the credit, or information regarding the processes or products giving rise to the credit. In some embodiments, the credit metadata may include a product identifier as defined herein. In other embodiments, the credit is not tied to a product at generation, and so there is no product identifier included in the credit metadata.

A "product" is any item of agricultural production, including crops and other agricultural products, in their raw, as-produced state (e.g., wheat grains), or as processed (e.g., oils, flours, polymers, consumer goods (e.g., crackers, cakes, plant based meats, animal-based meats (for example, beef from cattle fed a product such as corn grown from a particular field), bioplastic containers, etc.). In addition to harvested physical products, a product may also include a benefit or service provided via use of the associated land (for example, for recreational purposes such as a golf course), pasture land for grazing wild or domesticated animals (where domesticated animals may be raised for food or recreation).

"Product metadata" are any information regarding an underlying product, its production, and/or its transaction which may be verified by a third party and may form the basis for issuance of an ecosystem credit and/or sustainability claim. Product metadata may include at least a product identifier, as well as a record of entities involved in transactions.

As used herein, "quality" or a "quality metric" may refer to any aspect of an agricultural product that adds value. In some embodiments, quality is a physical or chemical attribute of the crop product. For example, a quality may include, for a crop product type, one or more of: a variety; a genetic trait or lack thereof; genetic modification of lack thereof; genomic edit or lack thereof; epigenetic signature or lack thereof; moisture content; protein content; carbohydrate content; ash content; fiber content; fiber quality; fat content;

oil content; color; whiteness; weight; transparency; hardness; percent chalky grains; proportion of corneous endosperm; presence of foreign matter; number or percentage of broken kernels; number or percentage of kernels with stress cracks; falling number; farinograph; adsorption of water; milling degree; immature grains; kernel size distribution; average grain length; average grain breadth; kernel volume; density; L/B ratio; wet gluten; sodium dodecyl sulfate sedimentation; toxin levels (for example, mycotoxin levels, including vomitoxin, fumonisin, ochratoxin, or aflatoxin levels); and damage levels (for example, mold, insect, heat, cold, frost, or other material damage).

In some embodiments, quality is an attribute of a production method or environment. For example, quality may include, for a crop product, one or more of: soil type; soil chemistry; climate; weather; magnitude or frequency of weather events; soil or air temperature; soil or air moisture; degree days; rain fed; irrigated or not; type of irrigation; tillage frequency; cover crop (present or historical); fallow seasons (present or historical); crop rotation; organic; shade grown; greenhouse; level and types of fertilizer use; levels and type of chemical use; levels and types of herbicide use; pesticide-free; levels and types of pesticide use; no-till; use of organic manure and byproducts; minority produced; fair-wage; geography of production (e.g., country of origin, American Viticultural Area, mountain grown); pollution-free production; reduced pollution production; levels and types of greenhouse gas production; carbon neutral production; levels and duration of soil carbon sequestration; and others. In some embodiments, quality is affected by, or may be inferred from, the timing of one or more production practices. For example, food grade quality for crop products may be inferred from the variety of plant, damage levels, and one or more production practices used to grow the crop. In another example, one or more qualities may be inferred from the maturity or growth stage of an agricultural product such as a plant or animal. In some embodiments, a crop product is an agricultural product.

In some embodiments, quality is an attribute of a method of storing an agricultural good (e.g., the type of storage: bin, bag, pile, in-field, box, tank, or other containerization), the environmental conditions (e.g., temperature, light, moisture, relative humidity, presence of pests, CO2 levels) during storage of the crop product, method of preserving the crop product (e.g., freezing, drying, chemically treating), or a function of the length of time of storage. In some embodiments, quality may be calculated, derived, inferred, or subjectively classified based on one or more measured or observed physical or chemical attributes of a crop product, its production, or its storage method. In some embodiments, a quality metric is a grading or certification by an organization or agency. For example, grading by the USDA, organic certification, or non-GMO certification may be associated with a crop product. In some embodiments, a quality metric is inferred from one or more measurements made of plants during growing season. For example, wheat grain protein content may be inferred from measurement of crop canopies using hyperspectral sensors and/or NIR or visible spectroscopy of whole wheat grains. In some embodiments, one or more quality metrics are collected, measured, or observed during harvest. For example, dry matter content of corn may be measured using near-infrared spectroscopy on a combine. In some embodiments, the observed or measured value of a quality metric is compared to a reference value for the metric. In some embodiments, a reference value for a metric (for example, a quality metric or a quantity metric) is an industry standard or grade value for a quality metric of a particular agricultural good (for example, U.S. No. 3 Yellow Corn, Flint), optionally as measured in a particular tissue (for example, grain) and optionally at a particular stage of development (for example, silking). In some embodiments, a reference value is determined based on a supplier's historical production record or the historical production record of present and/or prior marketplace participants.

A "field" is the area where agricultural production practices are being used (for example, to produce a transacted agricultural product) and/or ecosystem credits and/or sustainability claims.

As used herein, a "field boundary" may refer to a geospatial boundary of an individual field.

As used herein, an "enrolled field boundary" may refer to the geospatial boundary of an individual field enrolled in at least one ecosystem credit or sustainability claim program on a specific date.

As used herein, a "management event" may refer to a grouping of data about one or more farming practices (such as tillage, harvest, etc.) that occur within a field boundary or an enrolled field boundary. A "management event" contains information about the time when the event occurred, and has a geospatial boundary defining where within the field boundary the agronomic data about the event applies. Management events are used for modeling and credit quantification, designed to facilitate grower data entry and assessment of data requirements. Each management event may have a defined management event boundary that can be all or part of the field area defined by the field boundary. A "management event boundary" (equivalently a "farming practice boundary") is the geospatial boundary of an area over which farming practice action is taken or avoided. In some embodiments, if a farming practice action is an action taken or avoided at a single point, the management event boundary is point location. As used herein, a farming practice and agronomic practice are of equivalent meaning.

As used herein, a "management zone" may refer to an area within an individual field boundary defined by the combination of management event boundaries that describe the presence or absence of management events at any particular time or time window, as well as attributes of the management events (if any event occurred). A management zone may be a contiguous region or a non-contiguous region. A "management zone boundary" may refer to a geospatial boundary of a management zone. In some embodiments, a management zone is an area coextensive with a spatially and temporally unique set of one or more farming practices. In some embodiments, an initial management zone includes historic management events from one or more prior cultivation cycles (for example, at least 2, at least 3, at least 4, at least 5, or a number of prior cultivation cycles required by a methodology). In some embodiments, a management zone generated for the year following the year for which an initial management zone was created will be a combination of the initial management zone and one or more management event boundaries of the next year. A management zone can be a data-rich geospatial object created for each field using an algorithm that crawls through management events (e.g., all management events) and groups the management events into discrete zonal areas based on features associated with the management event(s) and/or features associated with the portion of the field in which the management event(s) occur. The creation of management zones enables the prorating of credit quantification for the area within the field boundary based on the geospatial boundaries of management events.

In some embodiments, a management zone is created by sequentially intersecting a geospatial boundary defining a region wherein management zones are being determined (for example, a field boundary), with each geospatially management event boundary occurring within that region at any particular time or time window, wherein each of the sequential intersection operations creates two branches—one with the intersection of the geometries and one with the difference. The new branches are then processed with the next management event boundary in the sequence, bifurcating whenever there is an area of intersection and an area of difference. This process is repeated for all management event boundaries that occurred in the geospatial boundary defining the region. The final set of leaf nodes in this branching process define the geospatial extent of the set of management zones within the region, wherein each management zone is non-overlapping and each individual management zone contains a unique set of management events relative to any other management zone defined by this process.

As used herein, a "zone-cycle" may refer to a single cultivation cycle on a single management zone within a single field, considered collectively as a pair that define a foundational unit (e.g., also referred to as an "atomic unit") of quantification for a given field in a given reporting period.

As used herein, a "baseline simulation" may refer to a point-level simulation of constructed baselines for the duration of the reported project period, using initial soil sampling at that point (following SEP requirements for soil sampling and model initialization) and management zone-level grower data (that meets SEP data requirements).

As used herein, a "with-project simulation" may refer to a point-level simulation of adopted practice changes at the management zone level that meet SEP requirements for credit quantification.

As used herein, a "field-level project start date" may refer to the start of the earliest cultivation cycle, where a practice change was detected and attested by a grower.

As used herein, a "required historic baseline period" may refer to years (in 365 day periods, not calendar years) of required historic information prior to the field-level project start date that must fit requirements of the data hierarchy in order to be modeled for credits. A number of required years is specified by the SEP, based on crop rotation and management.

As used herein, a "cultivation cycles" (equivalently a "crop production period" or "production period") may refer to the period between the first day after harvest or cutting of a prior crop on a field or the first day after the last grazing on a field, and the last day of harvest or cutting of the subsequent crop on a field or the last day of last grazing on a field. For example, a cultivation cycle may be: a period starting with the planting date of current crop and ending with the harvest of the current crop, a period starting with the date of last field prep event in the previous year and ending with the harvest of the current crop, a period starting with the last day of crop growth in the previous year and ending with the harvest or mowing of the current crop, a period starting the first day after the harvest in the prior year and the last day of harvest of the current crop, etc. In some embodiments, cultivation cycles are approximately 365 day periods from the field-level project start date that contain completed crop growing seasons (planting to harvest/mowing, or growth start to growth stop). In some embodiments, cultivation cycles extend beyond a single 365 day period and cultivation cycles are divided into one or more cultivation cycles of approximately 365 days, optionally where each division of time includes one planting event and one harvest or mowing event.

As used herein, a "historic cultivation cycles" may refer to defined in the same way as cultivation cycles, but for the period of time in the required historic baseline period.

As used herein, a "historic segments" may refer to individual historic cultivation cycles, separated from each other in order to use to construct baseline simulations.

As used herein, a "historic crop practices" may refer to crop events occurring within historic cultivation cycles.

As used herein, a "baseline thread/parallel baseline threads" may refer to each baseline thread is a repeating cycle of the required historic baseline period, that begin at the management zone level project start date. The number of baseline threads equals the number of unique historic segments (e.g., one baseline thread per each year of the required historic baseline period). Each baseline thread begins with a unique historic segment and runs in parallel to all other baseline threads to generate baseline simulations for a with-project cultivation cycle.

As used herein, an "overlap in practices" may refer to an unrealistic agronomic combinations that arise at the start of baseline threads, when dates of agronomic events in the concluding cultivation cycle overlap with dates of agronomic events in the historic segment that is starting the baseline thread. In this case, logic is in place based on planting dates and harvest dates to make adjustments based on the type of overlap that is occurring.

An "indication of a geographic region" is a latitude and longitude, an address or parcel id, a geopolitical region (for example, a city, county, state), a region of similar environment (e.g., a similar soil type or similar weather), a supply shed, a boundary file, a shape drawn on a map presented within a GUI of a user device, image of a region, an image of a region displayed on a map presented within a GUI of a user device, a user id where the user id is associated with one or more production locations (for example, one or more fields).

For example, polygons representing fields may be detected from remote sensing data using computer vision methods (for example, edge detection, image segmentation, and combinations thereof) or machine learning algorithms (for example, maximum likelihood classification, random tree classification, support vector machine classification, ensemble learning algorithms, convolutional neural network, etc.).

Exemplary Embodiments

In various embodiments, a method of managing ecosystem credits is provided where ecosystem credit metadata is received from an ecosystem credit issuer. An ecosystem credit token is generated according to the ecosystem credit metadata. The ecosystem credit token is stored in a pool of ecosystem credit tokens. One or more tokens in the pool is toggled from a fungible status to a non-fungible status, and toggling to the non-fungible status includes linking the one or more tokens to a unique product identifier associated with a product.

In various embodiments, ownership information is linked to the unique product identifier. A "user ID" is a unique identifier associated with a single entity. For example, a user ID can be used to identify a set of production locations under shared management; a set of production locations under a shared advisory structure; one or more quantity of an agricultural product owned by a single entity; one or more quantity of an agricultural product controlled by a single entity; one or more quantity of ecosystem attributes, ecosystem impacts, or ecosystem credits owned, controlled or claimed by a single entity, one or more quantity of ecosystem attributes, ecosystem impacts, or ecosystem credits recommended, quantified, verified, or issued by a single entity, etc.

In various embodiments, a method of tracking ecosystem credits is provided where a unique product identifier is generated. The unique product identifier is associated with a product and linked to product metadata. An ecosystem credit token is generated based on the product metadata, and the ecosystem credit token is linked to the unique product identifier. An interface operable to authenticate of the ecosystem credit token is provided.

In various embodiments, an environmental attribute may be linked to an agricultural product at a variety of scales of spatial resolution and or according to the identity of an originating organization; an agricultural product linked to an environmental attribute is sometimes referred to as a "coupled crop." For example, at the field level, an environmental attribute is attributed to a particular field and linked to the crop coming from that field ("field coupling"). In some embodiments, a coupled crop is segregated from commodities coming from other fields during the harvest and post-harvest period or only aggregated with production from fields associated with similar environmental attributes. Optionally field coupled agricultural products remain segregated from the initial point of delivery, and in some cases, the remaining supply chain to the end use. In various embodiments, fields may be grouped at the farm level (for example, nearby fields of a single farming operation, fields of one or more farmers that are members of an organization such as a co-op, fields of one or more farmers participating in a single program, such as a program adopting a common standard of farming practices, and linked to the crop coming from those fields ("farm coupling").

In another embodiment, an environmental attribute is attributed to a particular region (for example, a supply shed) and linked to the crop acquired from that region ("supply shed coupling"). A supply shed coupled crop is not generally segregated during the harvest or post-harvest period to the point of initial delivery, or throughout the supply chain. Supply shed coupling does not require that the crops and the environmental attributes come from the same fields or even the same farmers so long as both came from the same region. In another embodiment, an environmental attribute may be attributed to more than one region (for example, multiple supply sheds) and linked to the crop acquired from those regions ("multiple supply shed coupling"). In various embodiments, a coupled crop is linked according to the identity or characteristics of an originating organization, for example agricultural production can be linked to agricultural products produced by a particular farmer (where a farmer may be an individual or any variety of formal or informal business entities) or characteristics of an organization (for example, small farming operations, farming operations in Alaska, etc.) ("farmer coupling").

In some embodiments, a quantity of agricultural products having quantified environmental attributes are directly used to produce a processed product having a sustainability claim based on the agricultural product's quantified environmental attributes. For example, a producer of pasta purchases wheat produced using agronomic practices associated with sequestration of three metric tons of carbon dioxide equivalent emissions, produces pasta using processes producing one metric ton of carbon dioxide equivalents (for example, Scope 1 emissions), and markets the pasta with a sustainability claim of sequestering two metric tons of carbon dioxide equivalent emissions. The pasta maker would need to have a dedicated system from processing sustainable wheat, if they produced other products using conventionally produced wheat (wheat not associated with quantified environmental attributes, i.e., not a coupled crop).

In some embodiments, a quantity of agricultural products having quantified environmental attributes enter the supply stream of an entity (for example, a manufacturer of processed products) and are combined with non-coupled agricultural products. For example, a producer of dog food purchases 1 metric ton of rice produced using agronomic practices associated with quantified water conservation, produces two products A and B, where product A utilizes 1 metric ton of rice. The producer of dog food does not segregate the coupled rice from the conventional (non-coupled) rice in their supply chain, and produces product A, including a sustainability claim of water conservation associated with the quantity of coupled crop purchased.

In some embodiments, a quantity of agricultural products having quantified environmental attributes is transacted separately from its environmental attribute. For example, a quantity of agricultural products having quantified environmental attributes is delivered to a grain elevator and the product enters an unsegregated supply chain. An environmental credit may be generated relating to the quantification of the environmental attribute (for example, an absolute quantification, an estimate, or a difference from a measured or inferred baseline). The environmental attribute may be transferred to an entity purchasing an uncoupled agricultural product, for example at a geographically distinct location. In some embodiments, the purchased uncoupled agricultural product is the same crop, optionally the same variety, optionally the same quality as the agricultural products having quantified environmental attributes.

In various embodiments, a third party verification of the product metadata is received. In various embodiments, a unique transaction identifier is generated, and the unique transaction identifier is associated with a transaction of the product and transaction metadata. In various embodiments, a third-party verification of the transaction metadata is received. In various embodiments, the transaction includes harvesting the product. In various embodiments, the transaction includes selling the product. In various embodiments, the transaction includes processing the product into a processed product. In various embodiments, the transaction includes selling the processed product. In various embodiments, the ecosystem credit token comprises a fungibility indicator. In various embodiments, the fungibility indicator is immutable. In various embodiments, the ecosystem credit token, the unique product identifier, and/or the unique transaction identifier are provided through a public ledger. In various embodiments, the public ledger comprises a blockchain ledger. In various embodiments, the public ledger is maintained by a network comprising a plurality of nodes. In various embodiments, the ecosystem credit token comprises a tradability indicator. In various embodiments, a QR code or barcode encoding the unique product identifier is provided. In various embodiments, the product metadata comprises a product type, product quantity, product production time, product production location, or product production practice. In various embodiments, the ecosystem credit token includes a carbon credit. In various embodiments, the authenticity of the ecosystem credit token is verified by cryptographic verification.

In various embodiments, the authenticity of the ecosystem credit token is verified by verifying the product metadata and/or the transaction metadata. In various embodiments, verifying the authenticity of the ecosystem credit token includes at least one of: receiving verification information from a product producer, receiving verification information from a third-party verifier, and/or remote monitoring of production locations. In various embodiments, receiving verification information from the product producer includes self-reporting. In various embodiments, receiving verification information from the third-party verifier includes an inspection of a production location and/or validation of the verification information received from a product producer or of the remote monitoring of production locations. In various embodiments, remote monitoring comprises at least one of: analysis of remote sensing data, data feeds from production equipment and or ground based sensors. In various embodiments, receiving the third-party verification of the product metadata comprises receiving a digital signature of the third-party. In various embodiments, receiving the third-party verification of the transaction metadata comprises receiving a digital signature of the third-party. In various embodiments, generating the ecosystem credit token is performed in response to receiving the third-party verification of the transaction metadata. In various embodiments, generating the ecosystem credit token includes providing the product metadata to an ecosystem credit issuer, receiving ecosystem credit metadata therefrom, and generating the ecosystem credit token according to the ecosystem credit metadata. In various embodiments, transaction metadata corresponding to a transaction of the ecosystem credit token is received, and the transaction metadata is provided through the public ledger. In various embodiments, a request is received via the interface to authenticate the ecosystem credit token. In various embodiments, the ecosystem credit token is transferred to a pool of tokens.

In various embodiments, a method of tracking ecosystem credits associated with products is provided where ecosystem credit metadata is received from an ecosystem credit issuer, a plurality of ecosystem credit tokens is generated according to the ecosystem credit metadata, and recipient data comprising a plurality of recipients for the plurality of ecosystem credit tokens is received. For each recipient in the plurality of recipients, at least a portion of the ecosystem credit tokens is assigned to the respective recipient. For each recipient, the tokens assigned to the recipient are divided into a plurality of subsets, and each subset of the plurality of subsets includes at least a portion of an ecosystem credit token in the plurality of ecosystem credit tokens. One or more subset is linked to a unique product identifier corresponding to a product. The ecosystem credit tokens are stored on a blockchain ledger. A plurality of transactions are received from a plurality of consumers, and each transaction in the plurality of transactions corresponds to at least one product. For each transaction, one or more subsets of tokens corresponding to the at least one product in the transaction are converted from a fungible status to a non-fungible status and the conversion is recorded on the blockchain ledger.

In various embodiments, a query is received from a consumer of the plurality of consumers, all transactions in the plurality of transactions associated with the user are retrieved from the blockchain ledger, and a total amount of ecosystem credits consumed by the consumer are determined based on the retrieved transactions. In various embodiments, converting one or more subsets of tokens includes associating metadata with the one or more subsets, where the metadata includes a purchase date and a user identifier. In various embodiments, converting one or more subsets of tokens includes replacing the one or more subsets of tokens with an equivalent amount of a new one or more subsets of tokens that are non-fungible. In various embodiments, one or more subsets of tokens are burned. In various embodiments, the product metadata includes a product name, a production date, a product location, a product identifier. In various embodiments, dividing the tokens includes dividing at least one token into a plurality of subtokens. In some embodiments, tokens associated with an amount of raw agricultural product harvested at a particular production location are divided into subtokens representing portions of the product transferred, for example to producers of different processed products. In some embodiments, tokens associated with an amount of raw agricultural product harvested at a particular production location are divided into subtokens representing portions of the processed products produced from the amount of raw agricultural product, for example tokens associated with an amount of soybeans harvested at a particular production location are divided into subtokens representing the soybean meal and soybean oil produced from the harvested soybeans. In some embodiments, subtokens representing portions of the processed products are generated in proportion with the relative calorie composition of the resulting processed products. In some embodiments, subtokens representing portions of the processed products are generated in proportion with the mass of the resulting processed products. In some embodiments, ecosystem attributes of each processing step applied to the portion of production are appended to a ledger containing the subtoken. In various embodiments, linking includes associating at least one recipient in the plurality of recipients with a party to any crop product transactions associated with the unique product identifier of the one or more subsets.

Figure 4A:
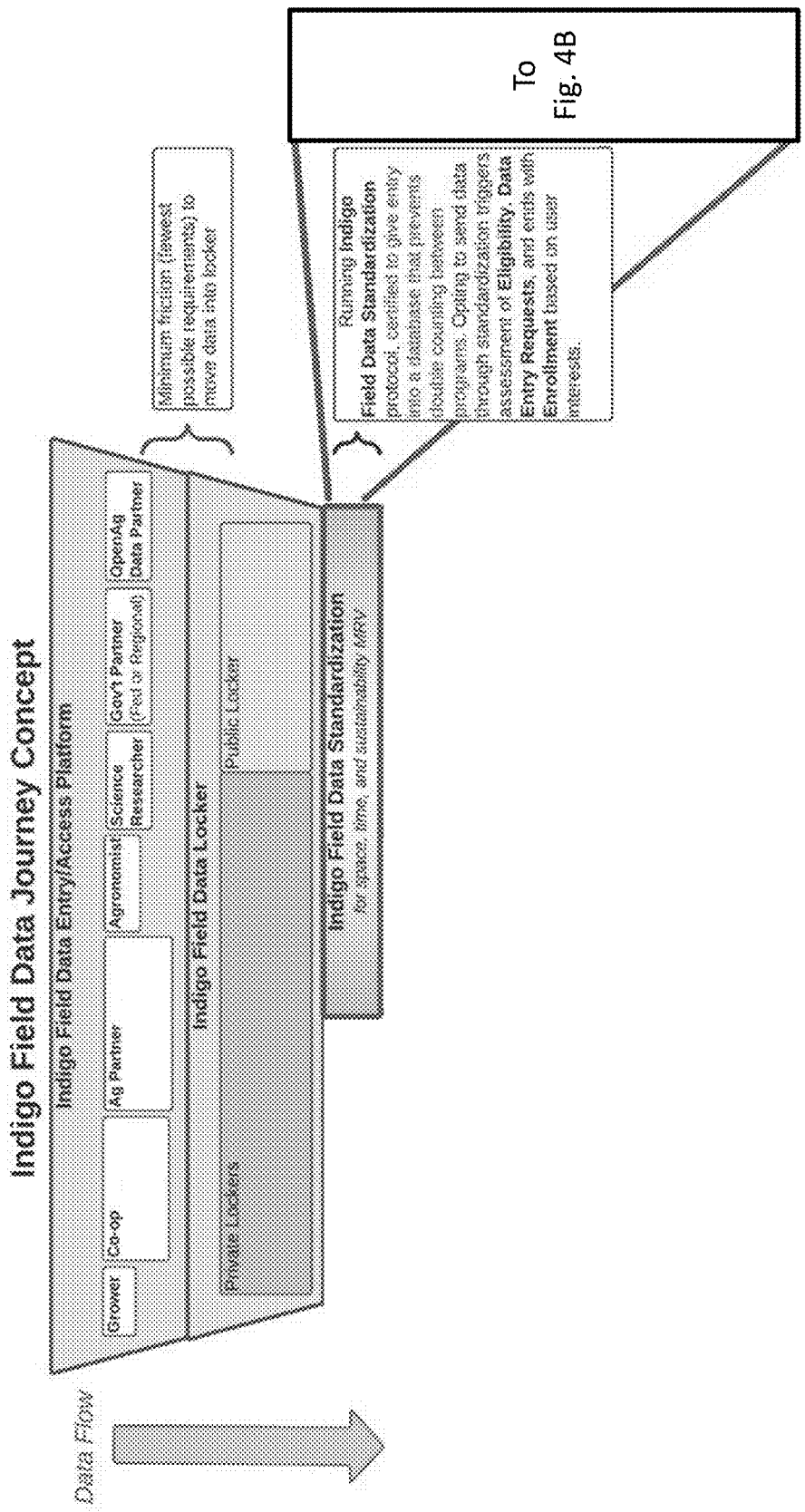

FIGS. 4A-4B illustrate a framework for integrating new field data. In various embodiments, the framework of FIGS. 4A-4B is used to link (e.g., permanently or non-permanently) agronomic management events to geospatial regions, to thereby allow for compliance management and recommendations as described above. In various embodiments, one or more field data user groups are defined. In various embodiments, the field data user groups include an agricultural partner that has a trusted business relationship with a group of growers. In various embodiments, the field data user groups include an agronomist. In various embodiments, the field data user groups include a buyer which represents an entity purchasing creditable products. In various embodiments, the field data user groups include a co-op which is a direct representation of a group or groups of growers. In various embodiments, the field data user groups include a consumer packaged goods (CPG) entity that monitors high level details of products, such as project progress, key performance indicators (KPIs), and/or helps give visibility into projects. In various embodiments, the field data user groups include a government partner which generates data, monitors performance, and/or enforces regulations at federal or more localized scales. In various embodiments, the field data user groups include a grower representing the entity enacting field management practice changes. In various embodiments, the field data user groups include a miller/aggregator that provides growers various functions relating to viewing and/or analyzing data (e.g., sum and sort) within the system, ability to contact people, real-time scoring, and/or an ability to manage a program in which a field is enrolled. In various embodiments, the field data user groups include an open agricultural data partner. In various embodiments, the field data user groups include a verifier that is a third-party entity setting credit requirements and assessing whether a program has met the requirements. In various embodiments, the field data user groups include a science researcher that is a primary investigator or any level of field experimental or model-based researcher (including data providers and/or credit quality stakeholders).

In various embodiments, as shown in FIG. 4A, a field data journey concept includes a field data entry/access platform, a field data locker, field data standardization, credit products, sustainability intelligence products, affiliated agricultural community products, operation-level or stepping stone products, and/or unaffiliated agricultural community products. In various embodiments, the field data entry/access platform includes access for grower, co-ops, agricultural partners, agronomists, science researchers, government partners, and/or open agricultural data partners. In various embodiments, the field data entry platform is connected to a field data locker. In various embodiments, the field data locker includes private lockers. In various embodiments, the system includes permissions for each data locker in the field data lockers defining which users may access the data locker (e.g., private locker). In various embodiments, the private data lockers are available to specific users (e.g., paying users).

In various embodiments, applying one or more data standardization algorithms to field data entered into the system certifies the data and allows the data to be entered into a database. In various embodiments, the database prevents double-counting between programs. In various embodiments, applying a data standardization algorithm triggers an assessment of the eligibility of data entry requests. In various embodiments, applying a data standardization algorithm triggers an enrollment function after eligibility has been confirmed. In various embodiments, the enrollment function is based on user one or more interest(s).

In various embodiments, field data standardization includes generation of metadata for connections between programs. In various embodiments, the metadata allows for detection of double-counting, facilitates interoperability, optimizes program recommendations for growers, and/or aligns programs with scientific development of standards and best practices. In various embodiments, data standardization includes constructs for consistency handling of spatial and temporal data. In various embodiments, constructs for consistency handling include data structures for management events (geospatially explicit groupings of agricultural data), management zones (event-based accounting of space), cultivation cycles (event-based division of continuous time), boundary tracking (boundary provenance, including edits to boundaries over time), and/or sample design (point-to-point stats for scale and uncertainty).

In various embodiments, data standardization includes constructs for consistency in sustainability measurable, reportable, verifiable (MRV) qualifications. In various embodiments, data standardization includes determinations of baselines (event-based, expected results), additionally (automated check of practice changes), sensitive factors (optimize for high performing data), bias assessments (guardrail/adjustment for missing data), confidence (uncertainty quantification), land MRV tracking (manage portfolio of fields/participation), a common agricultural library (model-agnostic conversion service for management data into model inputs), and/or model standardization (cal/val and model updates using protocol standards and/or external expert review).

In various embodiments, a process for field data standardization of carbon (shown in FIG. 4B) is described in more detail with respect to FIGS. 5A to 15B.

FIGS. 5A-5E illustrate steps for constructing baselines for modeling and quantifying SOC emissions within zones of unique management practices for an individual field using geospatially-defined management data. FIGS. 5A-5E provide a high-level summary of steps for how modeled baselines are constructed for the field area of an individual field, using the field boundary (Step 1), spatially and temporally explicit management event boundaries (Steps 2-3), and initial soil sample points (Step 4). In various embodiments, management zones are created from management event boundaries as shown in Step 3 (described in more detail below) and may be used to prorate the quantification of total field area based on the areal extent of unique combinations of management events. In various embodiments, once a management zone is used to construct a set of baselines, these baselines are linked to the field area defined by the management zone. In various embodiments, the link is permanent (e.g., cannot be unlinked).

Figure 5A:
FIGS. 5A-5E illustrate steps for constructing baselines for modeling and quantifying SOC emissions within zones of unique management practices for an individual field using geospatially-defined management data according to embodiments of the present disclosure.
Figure 5B:
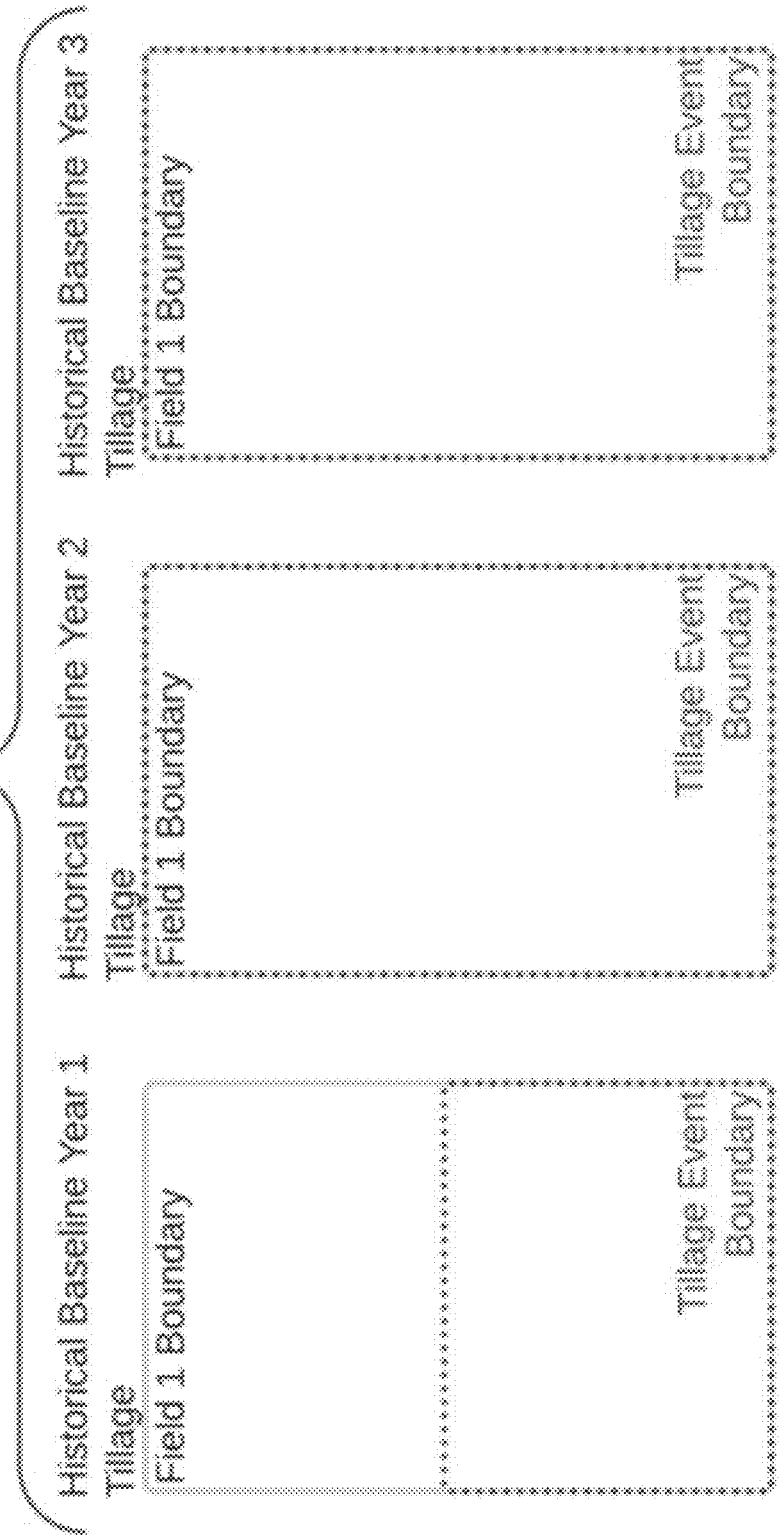
Figure 5C:
Figure 5D:
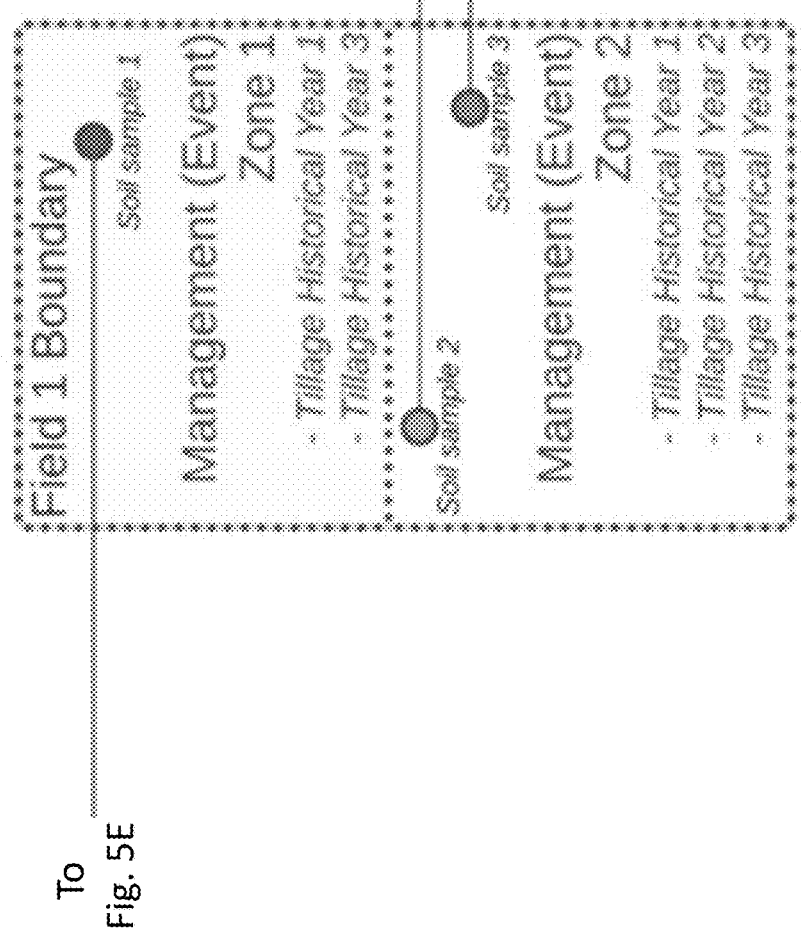
Figure 5E:
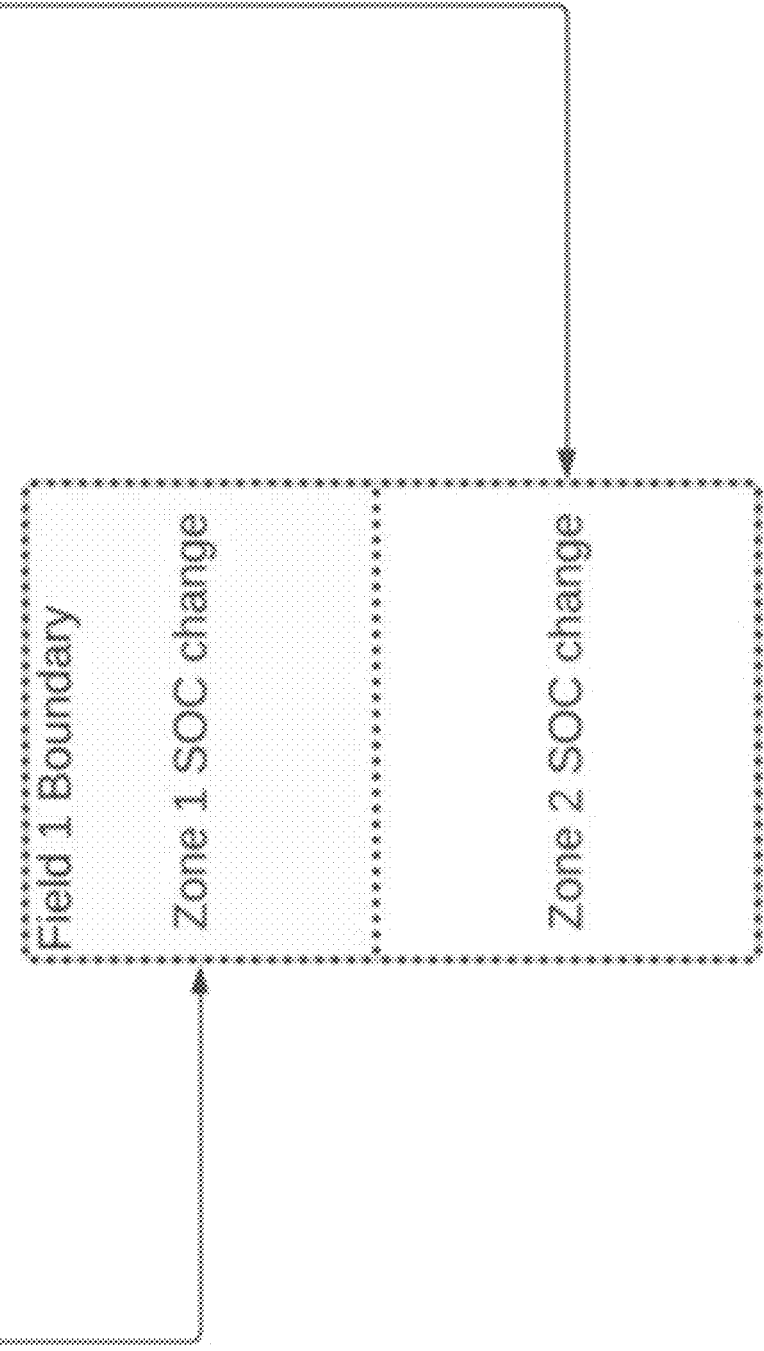

As shown in FIG. 5A, a field boundary is set. In various embodiments, the field boundary is set by a user. In various embodiments the field boundary is determined from a database (e.g., a database of field boundaries). As shown in FIG. 5B, individual management events are defined and each management event includes specific event boundaries within one or more fields. In various embodiments, the management event encompasses the boundary of the field. In various, a portion of a management boundary may include field and non-field regions; the non-field regions are trimmed and discarded. In various embodiments, the management event encompasses a portion (e.g., half) of the boundary of the field. As shown in FIG. 5C, management event boundaries are overlaid on one another. In various embodiments, all management event boundaries are overlaid from any point in time. In various embodiments, two or more management event boundaries divide a field boundary into unique spatial zones. In various embodiments, each zone has a unique baseline history of events that occurred in that specific zone of the field boundary. As shown in FIG. 5D, soil sample points are overlaid on the zones to determine field-level soil enrichment protocol (SEP) requirements (e.g., field-level project start dates). The SEP version 1.0 and supporting documents, including requirements and guidance, (incorporated by reference herein) can be found online at https://www.climateactionreserve.org/how/protocols/soil-enrichment/. As is known in the art, SEP is an example of a carbon registry methodology, but it will be appreciated that other registries having other registry methodologies (e.g., carbon, water usage, etc.) may be used, such as the Verified Carbon Standard VM0042 Methodology for Improved Agricultural Land Management, v1.0 (incorporated by reference herein), which can be found online at https://verra.org/methodology/vm0042-methodology-for-improved-agricultural-land-management-v1-0/. The Verified Carbon Standard methodology quantifies the greenhouse gas (GHG) emission reductions and soil organic carbon (SOC) removals resulting from the adoption of improved agricultural land management (ALM) practices. Such practices include, but are not limited to, reductions in fertilizer application and tillage, and improvements in water management, residue management, cash crop and cover crop planting and harvest, and grazing practices. As shown in FIG. 5E, a baseline is determined for each soil sample point using event data from the zone in which the sample point is located. In various embodiments, the baseline values are determined via one or more models.

In various embodiments, the modeled baselines are used to quantify soil organic carbon (SOC) change over time.

Figure 6:
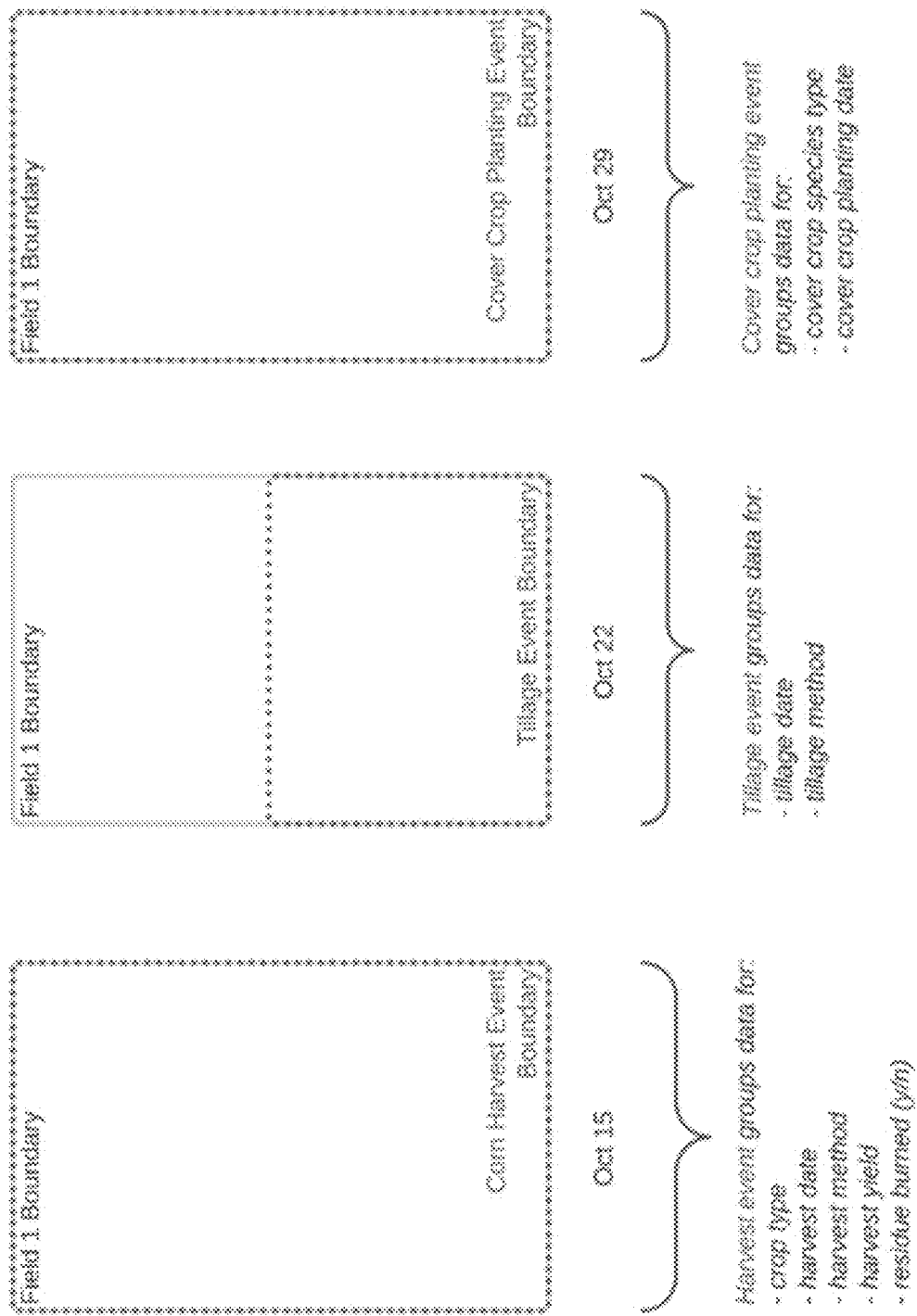
FIG. 6 illustrates an example of management event boundaries (dotted line) compared to overall field boundary (solid line) for a series of season-based management practices in a single field according to embodiments of the present disclosure.

FIG. 6 illustrates an example of management event boundaries (dotted line) compared to overall field boundary (solid line) for a series of season-based management practices in a single field. In various embodiments, the data used to construct baselines is structured based on predetermined data hierarchy requirements. In various embodiments, data associated with management events that are designated as practice changing—i.e. quantifiably associated with adopted practices that qualify a field for credit quantification, are processed with more rigorous requirements (e.g., minimal to no missing data) to ensure data used to made practice changes is high-quality. In various embodiments, higher quality data is used to construct baselines. In various embodiments, data used to construct baselines includes requirements for the length of the required historical baseline period. In various embodiments, management events are a data structure used to group data and evidence, and associate the data and/or evidence with the respective geospatial boundaries within an individual field boundary, as described with respect to FIG. 6. In various embodiments, management data and evidence is permanently associated with the geospatial area of the field contained within the management event boundary once the data and/or evidence pass all requirements. In various embodiments, determined baselines are permanently associated with the spatial extent of unique sets of management events within an individual field, as the management event boundaries will never change. In various embodiments, management event boundaries may be the same as the field boundary, or they may be smaller (e.g., where a field has two or more management event boundaries contained therein).

Figure 7A:
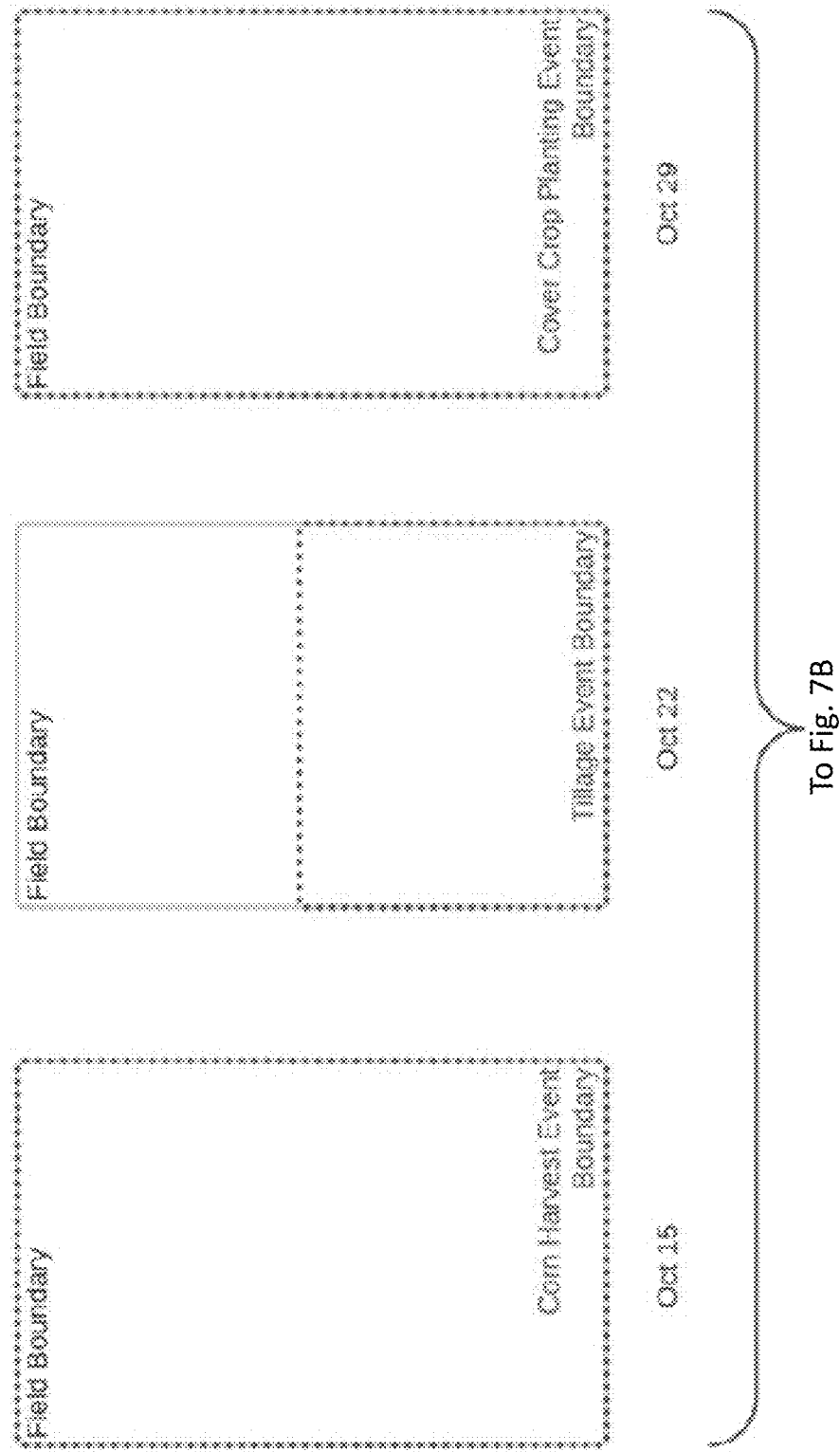
FIGS. 7A-7B illustrate a process for creating management zones according to embodiments of the present disclosure.
Figure 7B:
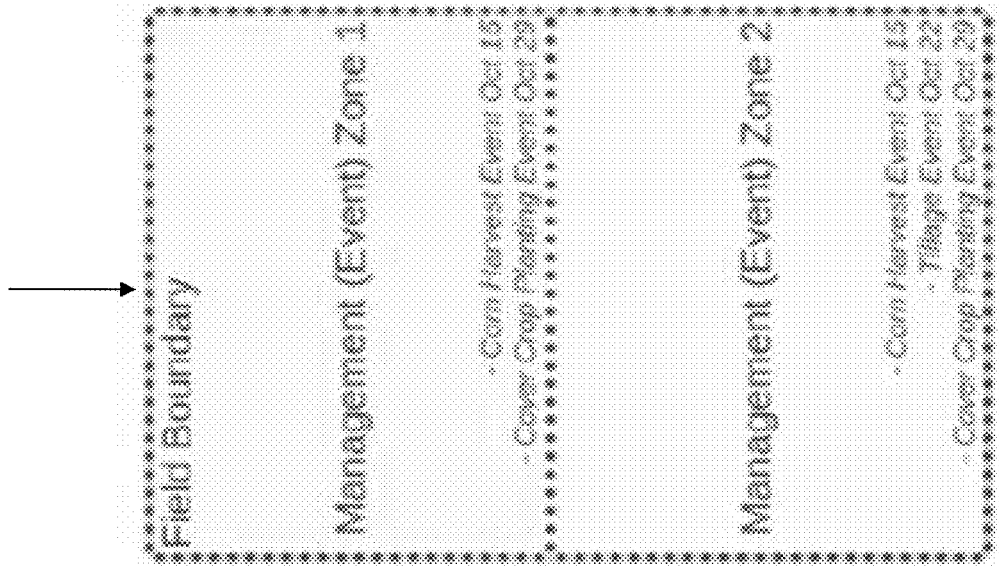
Figure 8A:
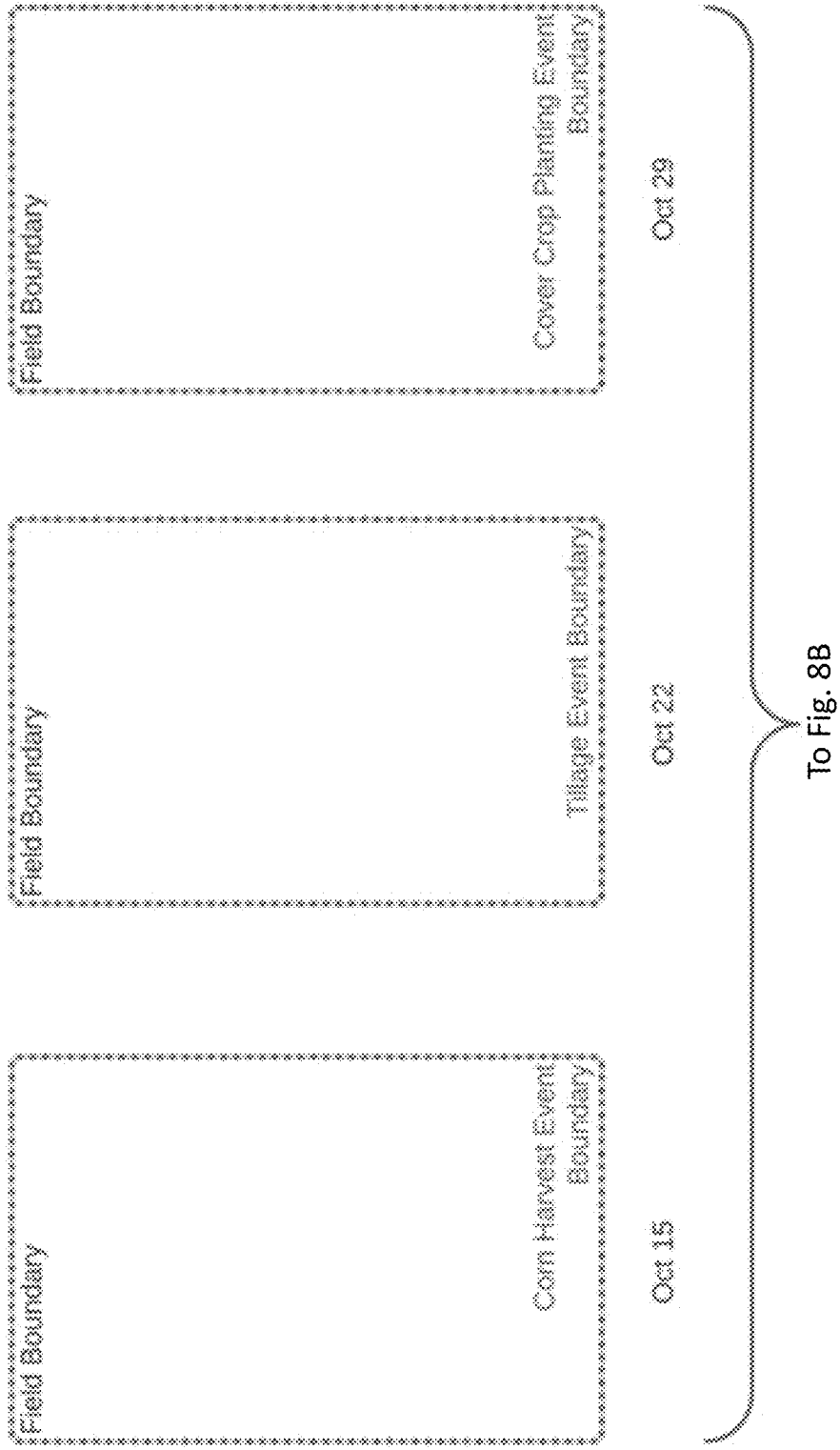
FIGS. 8A-8B illustrate a process for creating management zones according to embodiments of the present disclosure.
Figure 8B:
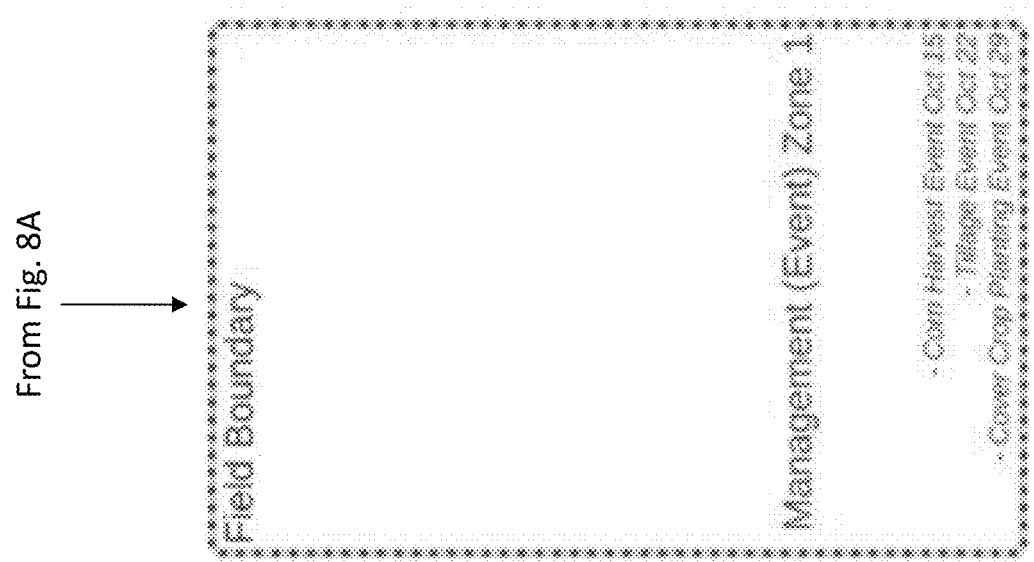
Figure 9A:
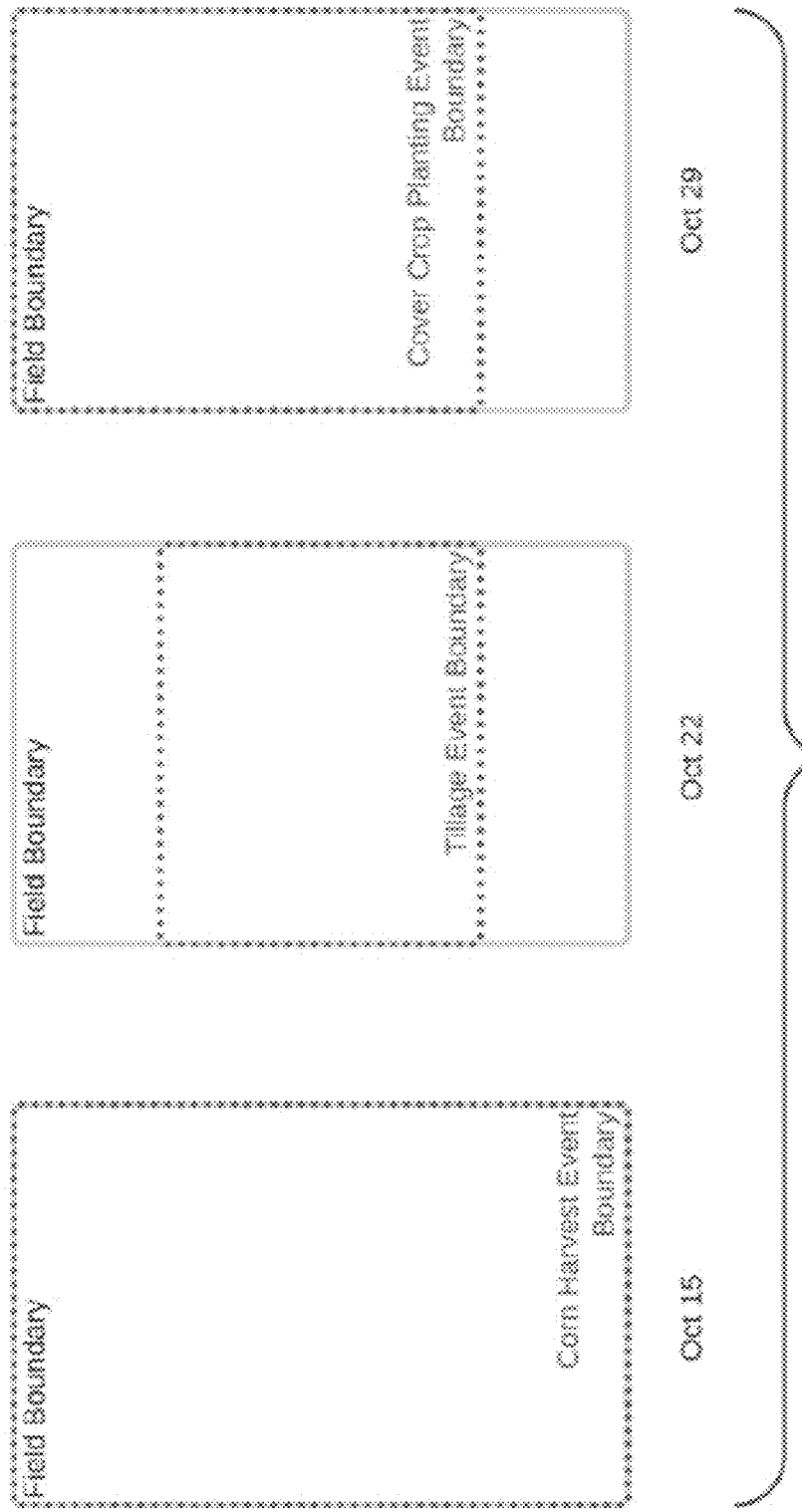
FIGS. 9A-9B illustrate a process for creating management zones according to embodiments of the present disclosure.
Figure 9B:
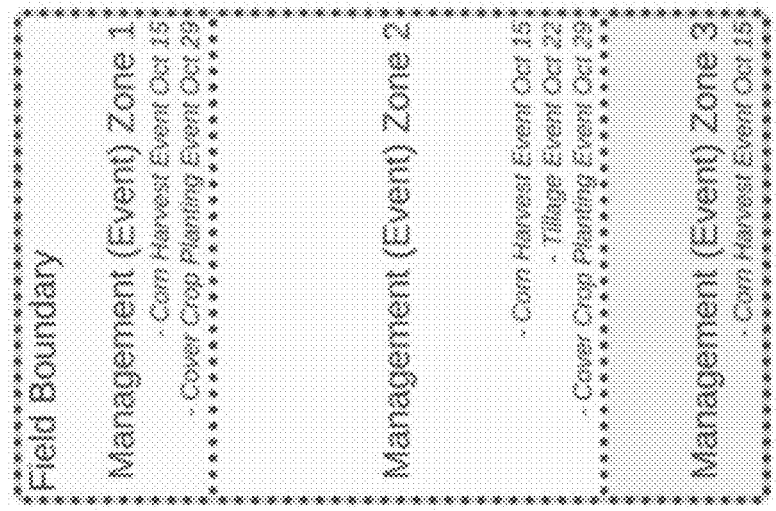

FIGS. 7A-7B, 8A-8B, and 9A-9B illustrate a process for creating management zones. In various embodiments, the boundaries of management events are used to create management zones within a field. In various embodiments, management zones are data-rich, spatially-explicit objects created for each field. In various embodiments, management zones include all management event data available at the point-in-time that the management zones are created. In various embodiments, management zones are generated for each individual field using an algorithm that crawls through all management events and groups the management events into discrete zonal areas based on unique combinations of management events. In various embodiments, the creation of management zones enables prorating of credit quantification for the area within the field boundary based on the geospatial boundaries of management events. FIGS. 7A-7B, 8A-8B, and 9A-9B show three examples of management zone creation, and demonstrates how changes in management event boundaries can change the number of management zones that are generated for an individual field area. As shown in FIGS. 7A-7B, two management zones are determined from the overlapping management event boundaries. As shown in FIGS. 8A-8B, one management zone is determined from the overlapping management event boundaries (e.g., all three management event boundaries include the entire field boundary, and thus the resulting management zone is a single zone). As shown in FIGS. 9A-9B, three management zones are determined from the overlapping management event boundaries.

In various embodiments, requirements are assessed for each unique area of the field within each management zone—i.e., at the management zone level. For example, additionally is assessed for each management zone, based on the unique management events that occurred in that management zone. In various embodiments, management zones are then used to assess field-level requirements. For example, if some management zones qualify for additionally but others do not within an individual field, the area of the qualifying management zones (as compared to the total field area) will determine whether the field meets minimum field-level requirements for inclusion in the project.

Figure 10A:
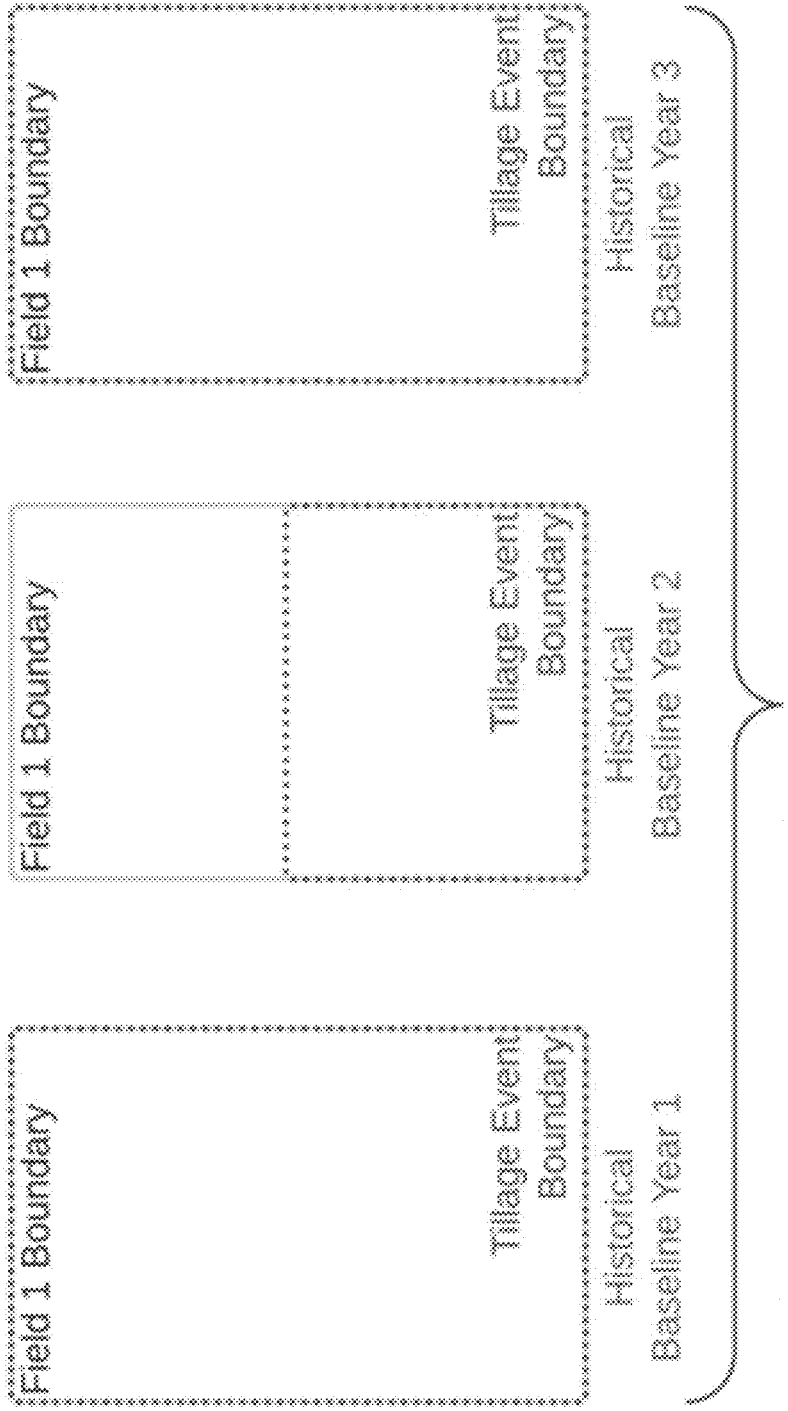
FIGS. 10A-10C illustrate a process of relating baseline construction to unique zonal areas within an individual field according to embodiments of the present disclosure.
Figure 10B:
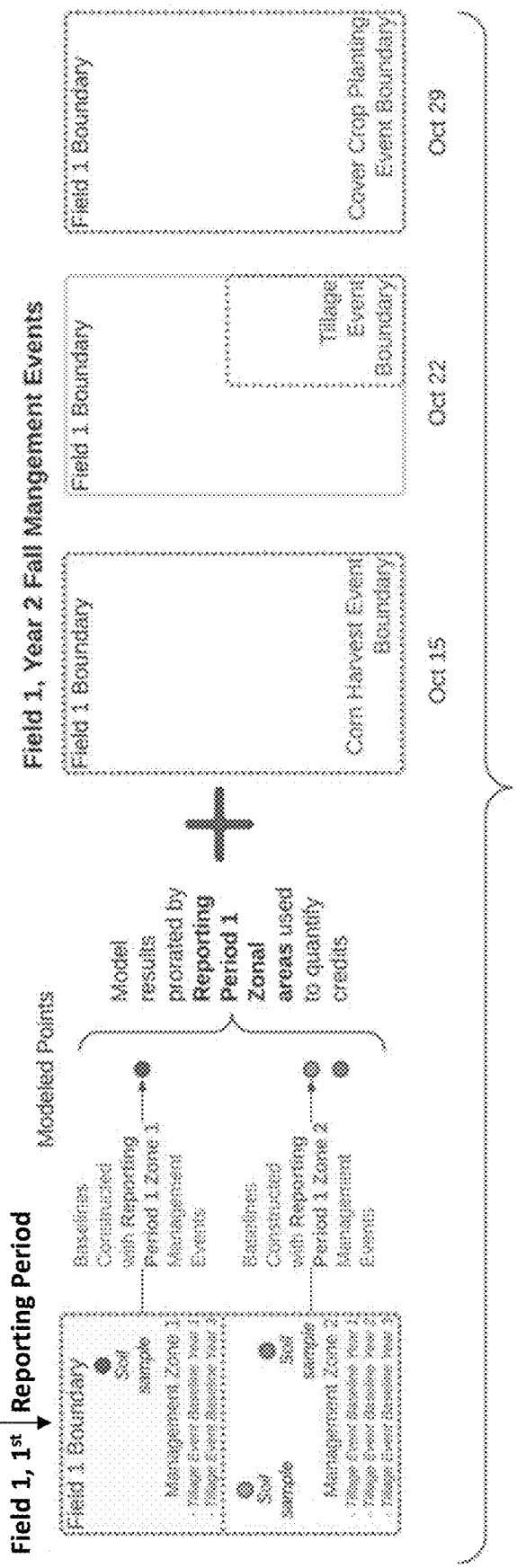
Figure 10C:
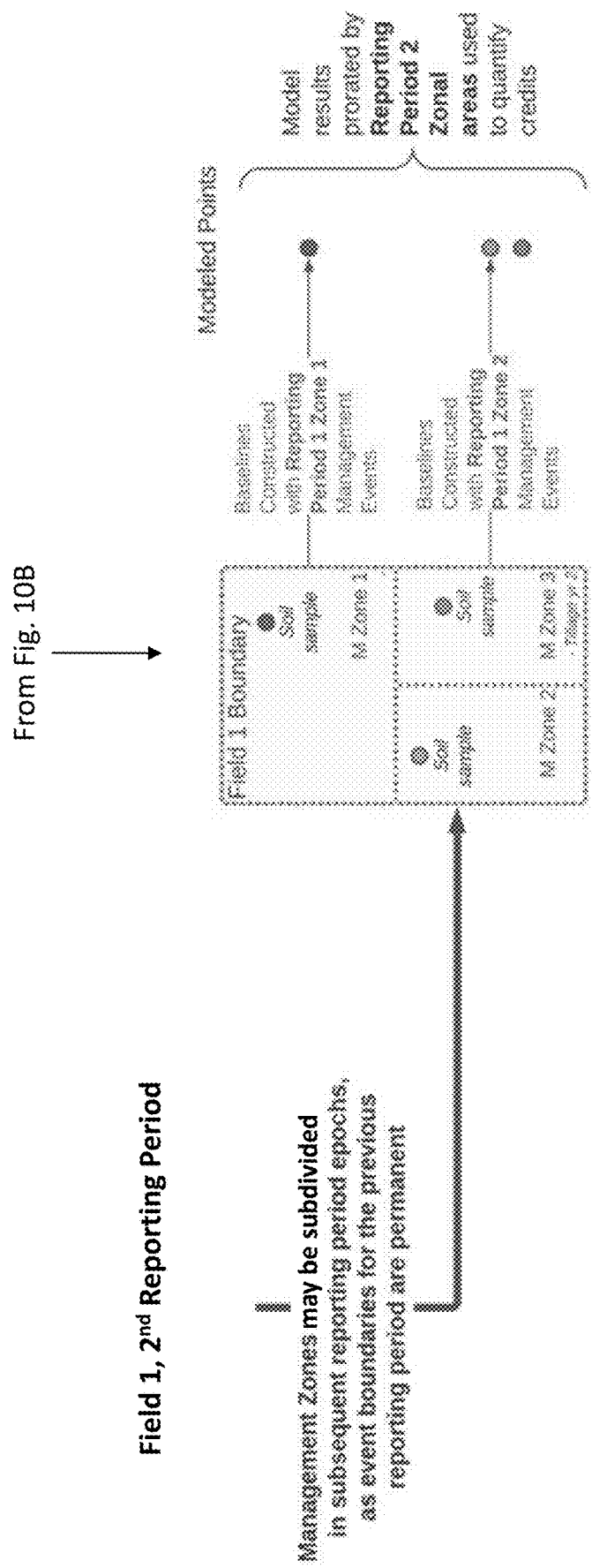

FIGS. 10A-10C illustrate a process of relating baseline construction to unique zonal areas within an individual field. In particular, FIGS. 10A-10C shows an example of how event boundaries lock baseline construction (blue text) permanently to unique zonal areas within an individual field (marked by pink vs blue areas in the 2nd and 3 rows), even if with-project event boundaries vary in the future (noting the unique tillage event boundary that resulted in subdividing the field area). In various embodiments, relating baseline construction to unique zonal areas allows the same baselines to always be used for any quantification of the zonal area for which they have been constructed. In various embodiments, gaps within data may be filled automatically. In various embodiments, after gap-filling, grower data quality control, and grower attestation are all complete, management events boundaries will receive no further additions or modifications (unless an error is found), allowing baseline construction to lock permanently to the spatial extents of historical baseline management events. In various embodiments, constructing baselines using management zones allows quantification methods to prorate according to the explicit spatial area of unique management event combinations. In various embodiments, once event boundaries become locked for a given reporting period, the management zones for a field can only become further subdivided for future reporting periods, as the event boundaries in previous reporting periods will never change, as shown in FIGS. 10A-10C.

Figure 11A:
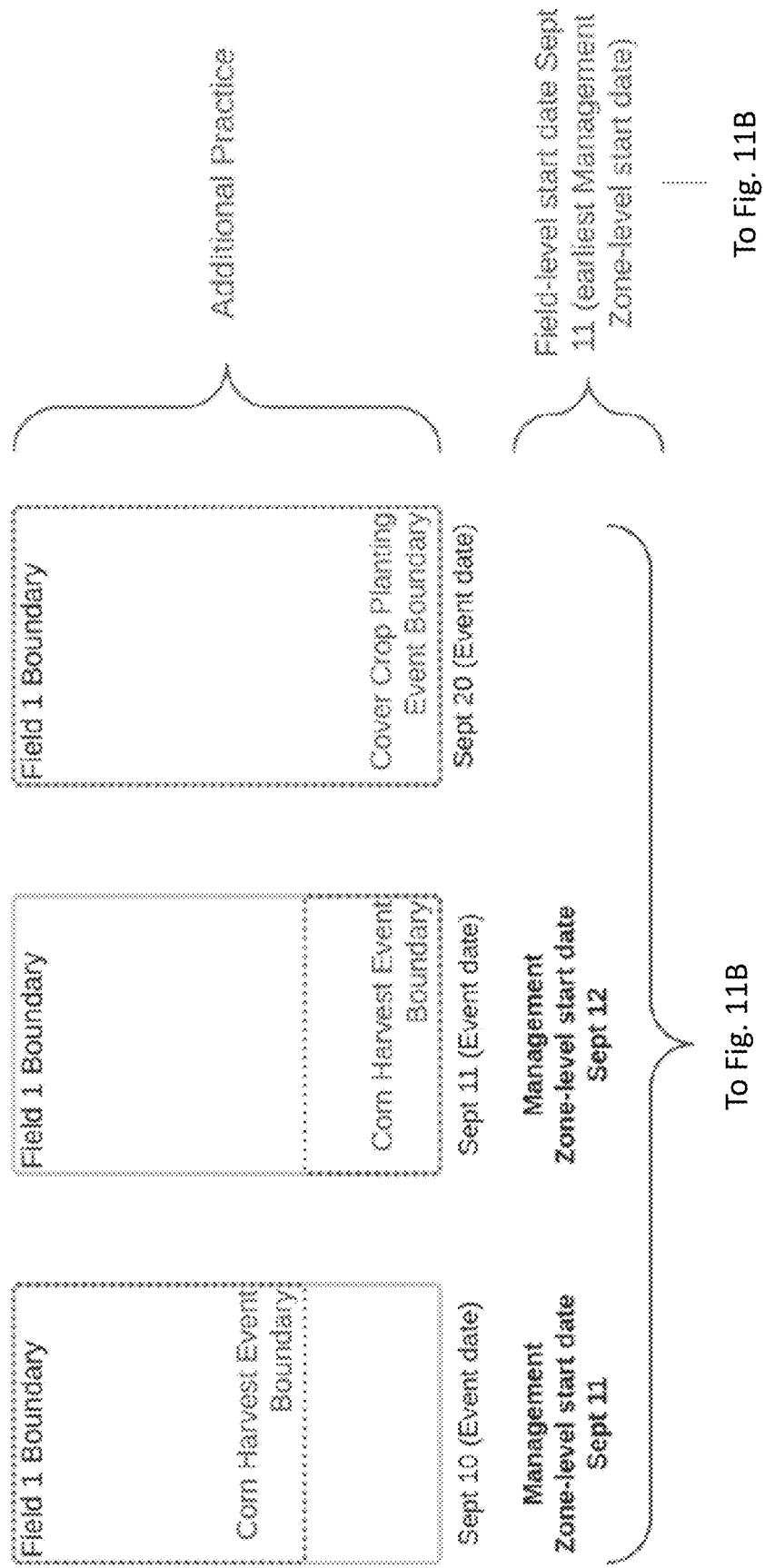
FIGS. 11A-11B illustrate a process for generating baselines from a field-level start date and a management zone-level start date according to embodiments of the present disclosure.
Figure 11B:
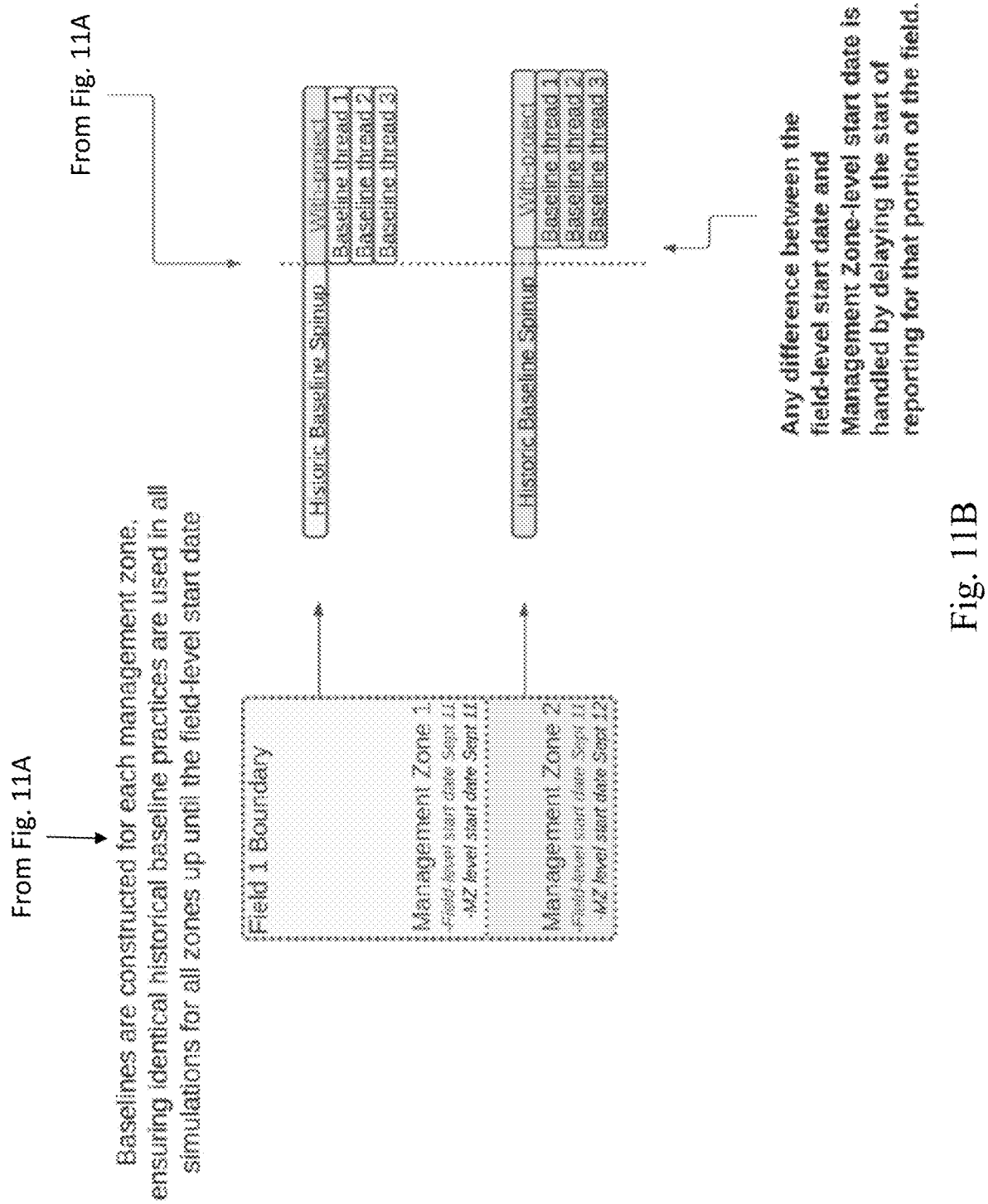

FIGS. 11A-11B illustrate a process for generating baselines from a field-level start date and a management zone-level start date. In particular, FIGS. 11A-11B show an example of how temporally separate harvest events immediately prior to the adoption of an additional practice impact the field-level start date, versus the management zone-level start date, and how these dates are used to construct baselines. In various embodiments, cultivation cycles and crop growing seasons, agricultural events—harvest events, when possible—are used to discretize time. In various embodiments, the spatial boundaries of harvest events—in some circumstances also planting events and fallow periods (i.e., the lack of events)—play an important role in dividing not only space, but also time. In various embodiments, cultivation cycles are determined for each individual management zone. In various embodiments, this ensures that the division of time stays aligned with the prorating of area in the quantification of events, and further keeps time divisions both agronomically sound and spatially consistent.

In various embodiments, a single cultivation cycle on a management zone, considered collectively as a pair (a "zone—cycle"), is the foundational unit of quantification for a given field in a given reporting period. In various embodiments, this supports modeling a baseline for each 'zone-cycle' of the crediting period with complete and qualifying management event data. In various embodiments, the project start date is defined using foundational units as follows:
1. The project-level start date is defined as the earliest qualifying field-level start date in the project. Therefore, reported credits for any field will never begin before the project level start date.
2. The field-level start date is defined as the day starting the earliest zone-cycle (across all management zones within an individual field) that meets predetermined requirements for additionally. Therefore, an individual field will never report credits before the field-level start date.

3. The management zone-level start date is not specified, but conceptually is defined as the day starting the first zone-cycle that meets predetermined requirements for additionally. In various embodiments, additionally is assessed at the management zone level.

In various embodiments, any difference between the field-level start date and management zone-level start date is handled by delaying the start of reporting for that portion of the field, for example, as shown in FIGS. 11A-11B. In various embodiments, this delay in the start of reporting ensures any discrepancies between the field-level and management event-level start dates only ever lead to fewer credits by reducing the time that credits are quantified on that zonal area.

Figure 12A:
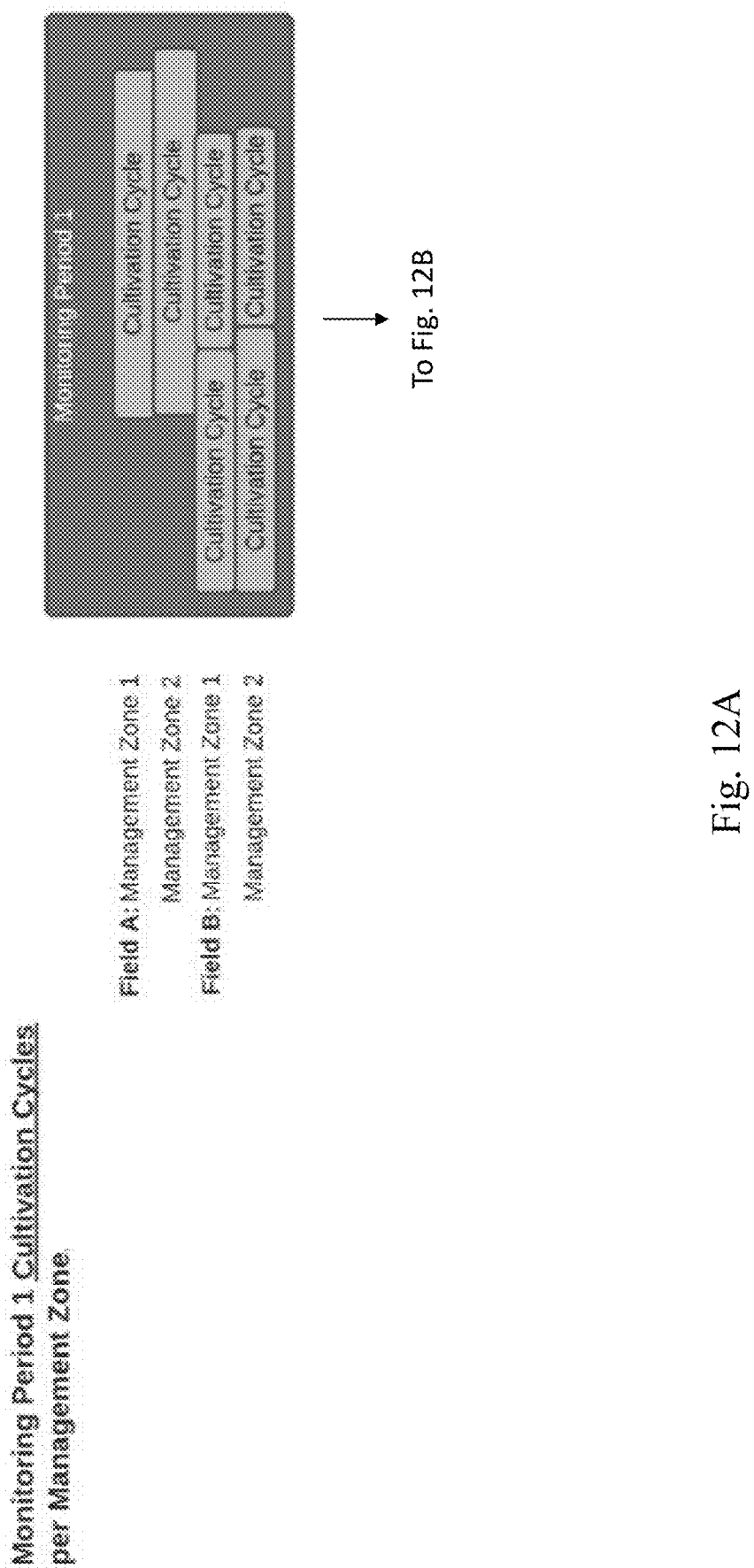
FIGS. 12A-12C illustrate a process of clipping model results for SOC and the truncation of SOC quantification in zone-cycles according to embodiments of the present disclosure.
Figure 12B:
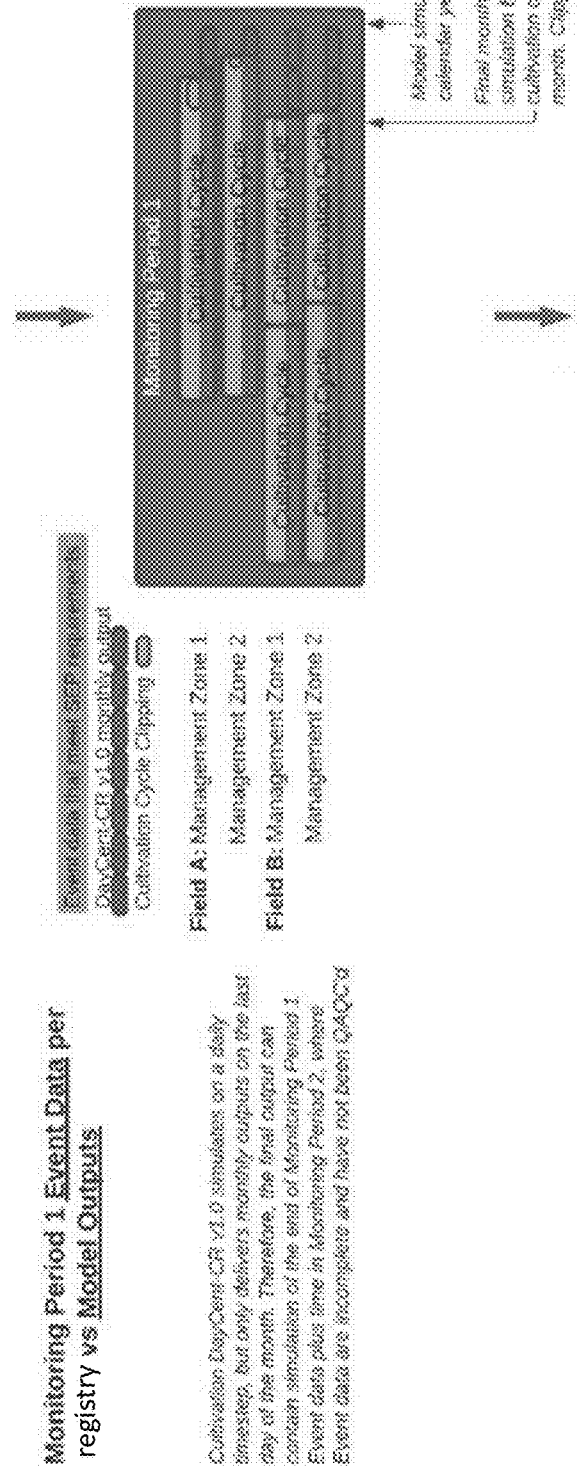
Figure 12C:
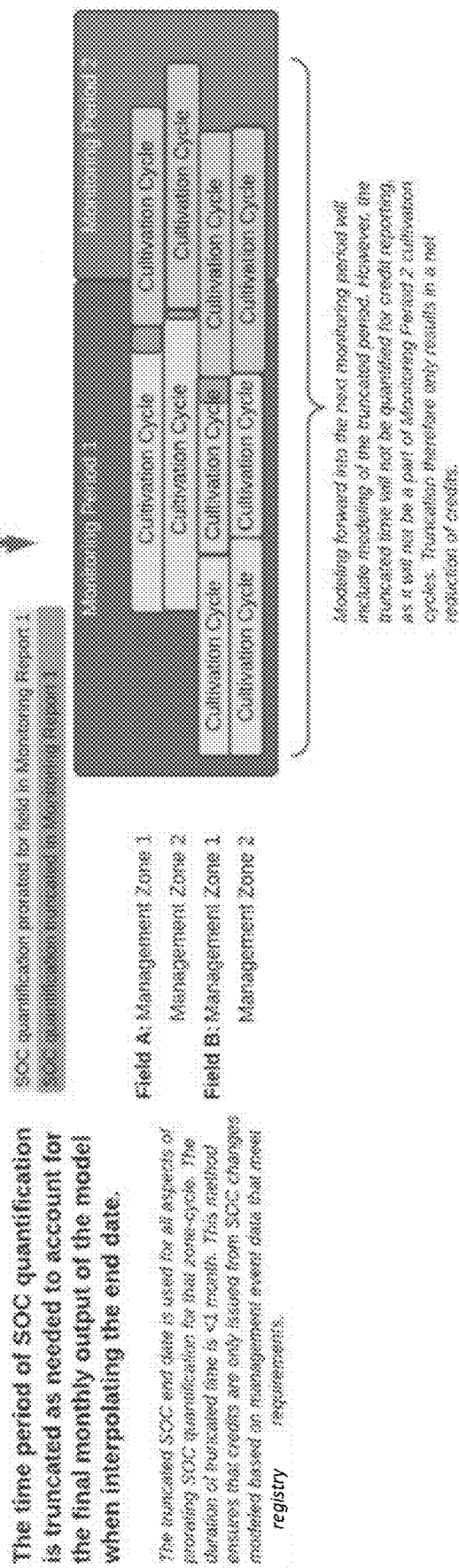

FIGS. 12A-12C illustrate a process of clipping model results for SOC and the truncation of SOC quantification in zone-cycles. In particular, FIGS. 12A-12C illustrate a process of clipping model results for SOC (2nd row) and the truncation of SOC quantification in some zone-cycles in Monitoring Period 1 (3rd row), to adjust interpolation of the monthly model outputs when the final cultivation cycle end date for a given management zone falls on a day other than the last day of the month. In various embodiments, in the subsequent monitoring period, the truncated time is modeled to ensure SOC is initialized correctly (3rd row). In various embodiments, truncated time will never be quantified for credits when zone-cycles are prorated for field-level reporting, ensuring this method will only ever lead to fewer credits. In various embodiments, only completed cultivation cycles are used to quantify credits for project reporting. In various embodiments, zone-cycle foundational units are used to account for the zonal area of completed cultivation cycles quantified in a given reporting period. In various embodiments, to ensure that the same zone-cycle start and end dates are used for all aspects of quantification, a management Zone Attribute Table (ZAT) is used as a common reference. In various embodiments, the ZAT is a relational table with a row per cultivation cycle/baseline thread per management zone. In various embodiments, each row has the necessary data to identify a management zone and the field it is associated with along with the start and end dates of the cycle/thread. In various embodiments, each row is amended with additional information about the specific zone and time period to be used in subsequent quantification steps. For example, the additional information may include soil attributes, such as soil composition, and/or climatology data. In various embodiments, the ZAT is used to account for field area as well as the start and end dates of the zone-cycles reported in the data submission file.

In various embodiments, due to the model structure—specifically, generating monthly outputs and needing to simulate complete calendar years—there are some circumstances when model results for SOC must be truncated (shortened, by a period of less than a single month) for the most recently completed zone-cycle to ensure reporting is conducted on model SOC results that were generated from management events that meet the predetermined requirements for the entire cultivation cycle. In various embodiments, quantification of SOC for the current reporting period accounts for the truncation, meaning that this method shortens the time period of SOC quantified for cultivation cycle reporting for all affected zone cycles. In various embodiments, in the subsequent monitoring report, truncated periods are modeled to extend modeled results forward, but they will not be included in quantification of subsequent cultivation cycles. In various embodiments, this method will only lead to fewer credits being issued. FIGS. 12A-12C show a process for a visualization of this process. Cultivation cycle clipping is shown in the 2nd row (green ovals) and the truncation of SOC quantification in the 3rd row (green segments of cultivation cycles).

In various embodiments, minor human errors in drawing sub-field event boundaries (e.g., boundaries that do not perfectly cover 100% of the field area) are permitted in some circumstances, as long as event boundaries covered at least 95% of the total field. In various embodiments, the system includes the following features:

1. reusing existing event boundaries (to prevent errors with redrawing);
2. 'auto-snapping' of event boundaries to field boundaries (to prevent slivers when not perfectly aligned);
3. a tool to draw circles (to help growers using center-pivot irrigation systems); and
4. auto-drawn boundaries suggested to the grower when <100% of the field area has event boundary coverage (to reduce minor errors from hand drawing).

The Management Zone algorithm can also create very small slivers of field areas1 that are excluded from or duplicated in Management Zones, mainly due to imprecisions from imported data sources and hand-drawn boundaries (especially prior to the addition of the auto-snapping feature described above), but also due to accumulation of numerical errors from repeated intersection and geospatial operations.

In various embodiments, less than 0.5% of total project acres are affected by the combined impacts of the 95% rule for event boundaries and management zone computation errors. In various embodiments, steps can be taken to minimize management zone computational errors, including de-duplication of zonal areas across time prior to credit quantification. In various embodiments, in subsequent reporting periods, the mitigation steps described above will help address some these issues.

Figure 13:
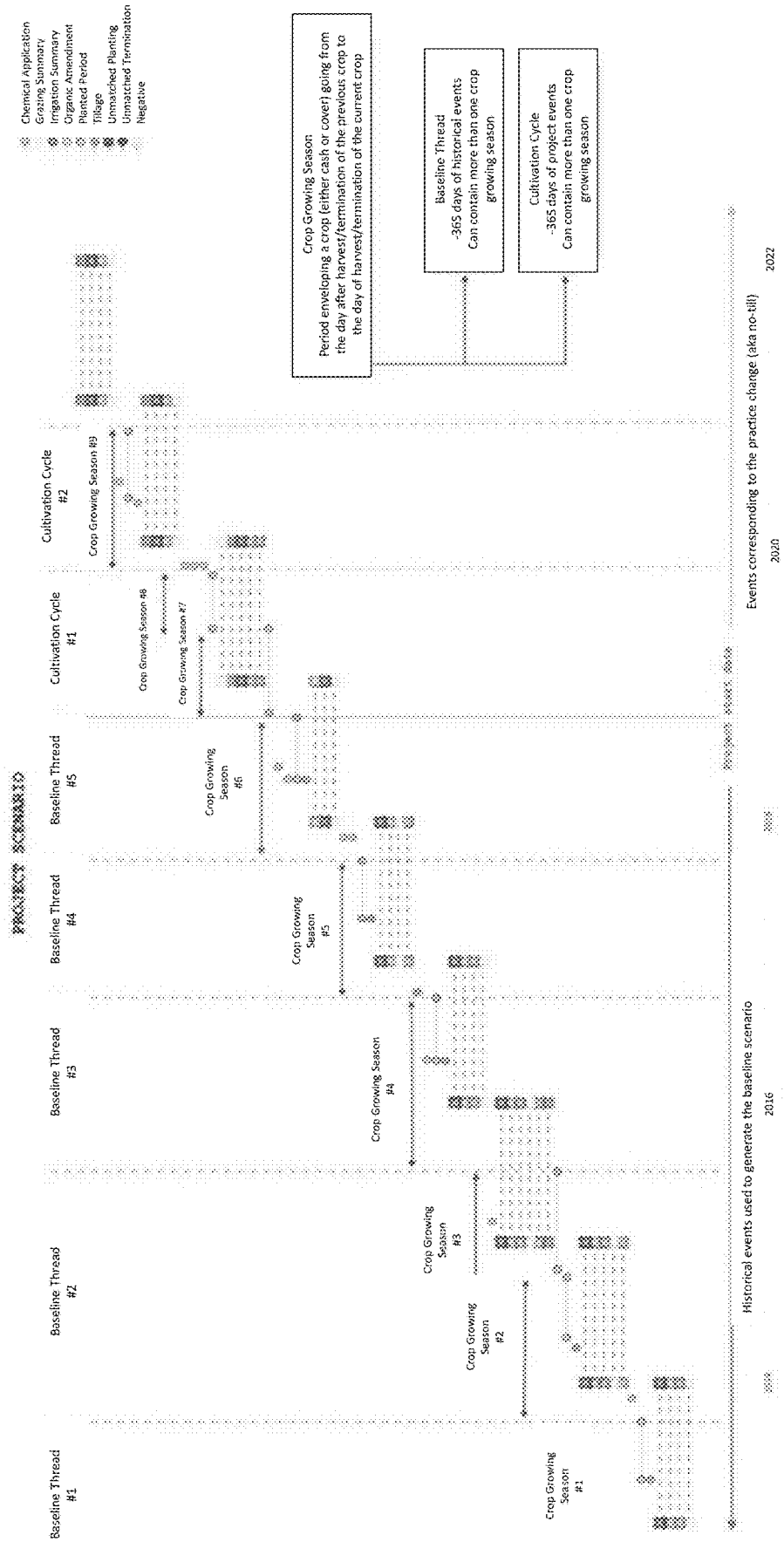
FIG. 13 illustrates an exemplary process of breaking historical events into baseline threads based on crop growing seasons within historical cultivation cycles according to embodiments of the present disclosure.

FIG. 13 illustrates an exemplary process of breaking historical events into baseline threads based on crop growing seasons within historical cultivation cycles. In particular, FIG. 13 shows breaking historical events into baseline threads (blue text at top label thread breaks, which occur at dotted lines to the left of the red line) based on crop growing seasons (marked with purple arrows) within historical cultivation cycles. Two with-project cultivation cycles are also shown in FIG. 13, starting at red lines and going to right.

In various embodiments, baseline simulations and with-project simulations are constructed at the level of management zones for all sample points with that zone, as shown in FIGS. 10A-10C. In various embodiments, for an individual sample point, baseline simulations extend from the same spin-up simulations, which use all required historical baseline period data and additional sources to meet input requirements. In various embodiments, each baseline simulation as well as the with-project simulation have the same model-specific spin-up and required historical baseline period spin-up, such that all simulations have the same value up until the field-level start date.

In various embodiments, in fields with greater than one management zone, simulations may continue to have the same value after the field-level start date, up until the management zone-level start date, in the event there is a discrepancy (see FIGS. 11A-11B for example).

In various embodiments, as shown in FIG. 13, historical cultivation cycles are used to create unique historical segments to start parallel baseline threads. In various embodiments, within each baseline thread, management events from the required historical baseline period are rotated continuously from different starting points such that all historical management events are modeled for each reporting period. In various embodiments, historical segments are defined using crop growing seasons, in order to retain agronomic realism to the greatest extent possible, as shown in FIG. 13. In various embodiments, in the steps of baseline construction logic, the term baseline threads is used as it is applied in code, where baseline threads are the list of historical segments, as defined above, and manipulated as needed to meet predetermined requirements.

In various embodiments, the following baseline logic is used:

1. Baselines are constructed for each management zone.
2. For a given simulated soil sample point (for initial measured SOC), the with-project simulation as well as each simulated baseline will use the same information to spin-up and initialize the model, such that the value of all simulations is the same up to the field-level start date.
3. Baseline threads segment all historical data provided by the grower into non-overlapping periods of time using crop growing seasons to determine historical cultivation cycles (see, e.g., FIG. 13).
4. The number of baseline threads will be, at a minimum, the number of years (in 365 day periods) of the required historical baseline period, and may exceed this number if a grower has provided sufficient additional data.
5. Each unique baseline thread will be used to start a unique baseline simulation.
6. Baseline threads will be rotated in order continuously from whichever thread is used to start an individual baseline simulation.
7. Each baseline thread will start simulating historical crop practices on the first day of the first crop growing season or fallow season that begins in that historical cultivation cycle.
8. For the first historical cultivation cycle (i.e., the earliest), the crop growing season starts the day before the first event, whether that event is positive (i.e., grower attested that a practice occurred) or negative (i.e., grower attested that no practice occurred).
9. If possible, each individual baseline simulations begins on the additionally_start_date (code reference for the field-level start date). If there is a discrepancy between the additionally_start_date and the period_start (code reference for the management zone-level start date), individual baseline simulations will begin the day of the period_start (see, e.g., FIGS. 11A-11B).
10. In order to start an individual baseline simulation, the following logic is used: First, attempt to maintain the calendar date of each event in the baseline thread starting that baseline simulation. The counterfactual historical cultivation cycle is placed in the with-project period such that there is no overlap of previous planted periods for the field. Calendar dates (i.e. day of the year) are preserved for each event within the historical cultivation cycle. Example: using a historical corn planting event from May 1, 2015 to generate a similar event in the project period of the baseline scenario in 2019, by moving the planting event to May 1, 2019.

If it is not possible to maintain the calendar date of each event because the initial baseline thread events conflict with the concluding historical cultivation cycle used for model-spin-up, conflicts are resolved as follows: Concluding historical cultivation cycle crop practices are preserved unchanged, as these events best reflect agronomic reality. If the conflict of event dates is regarding the first planting date of the baseline thread: the planting date of the historical cycle is moved to the day after the harvest of the concluding growing season (see, e.g., FIG. 14A); If the conflict of event dates is regarding field preparation before the first planting date of the baseline thread: First, an attempt is made to move the conflicting events to start the day after the period_start (see, e.g., FIG. 14B). This move is made if there is sufficient time without events between the period_start and the first planting date of the baseline thread. In this case, conflicting events are moved to that time period. If there is no time between the period_start and the first planting date of the baseline thread, or if there is not enough time that all conflicting events can fit while retaining the relative amount of time between the events, conflicting events get clipped (see, e.g., FIG. 14C). The approach ensures that as many counterfactual events are modeled as possible, while still preserving agronomic realism by retaining the completion of crop growing seasons as well as the timing between events. If the starting baseline thread is seasonally separated, a fallow season is generated (see, e.g., FIG. 14D).

11. All constructed baselines will be submitted to be modeled for each monitoring report, regardless of whether the crop rotation being followed on a field allows for the use of the matched versus blended baselines. Baselines simulation results are blended for every modeled location, and in all circumstances the average is calculated using all threads rather than using the subset of matched baselines. In various embodiments, matched baselines are not used because matched baselines may vastly increase complexity of requirements without having a net impact on quantification of emission reductions and these complexities may increase with the use of management zones, which otherwise provide an accurate approach to model baseline practices as they were spatially implemented within a field.

Figure 14A:
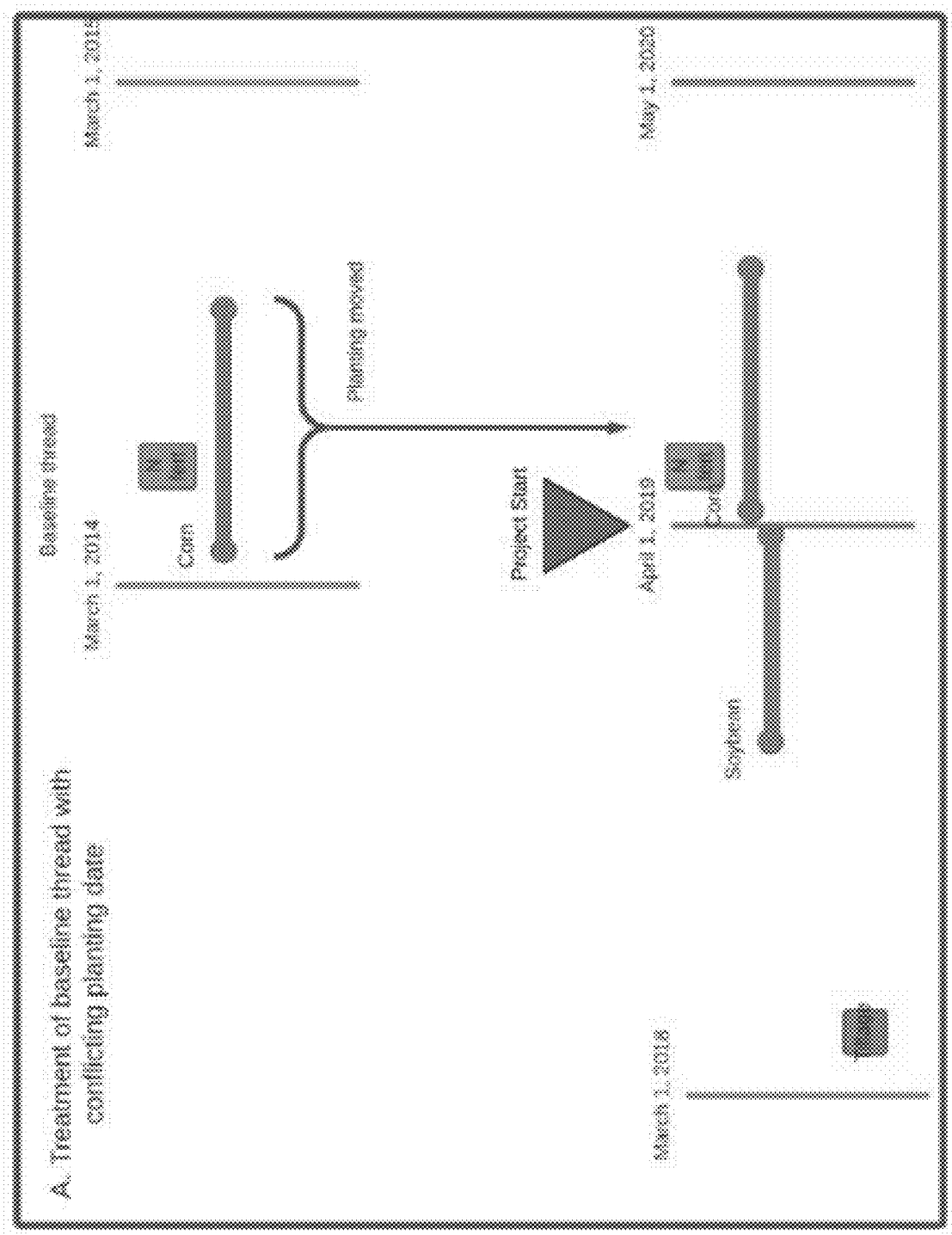
FIGS. 14A-14B illustrate a process for handling historical threads under scenarios of conflicting events according to embodiments of the present disclosure.
Figure 14B:
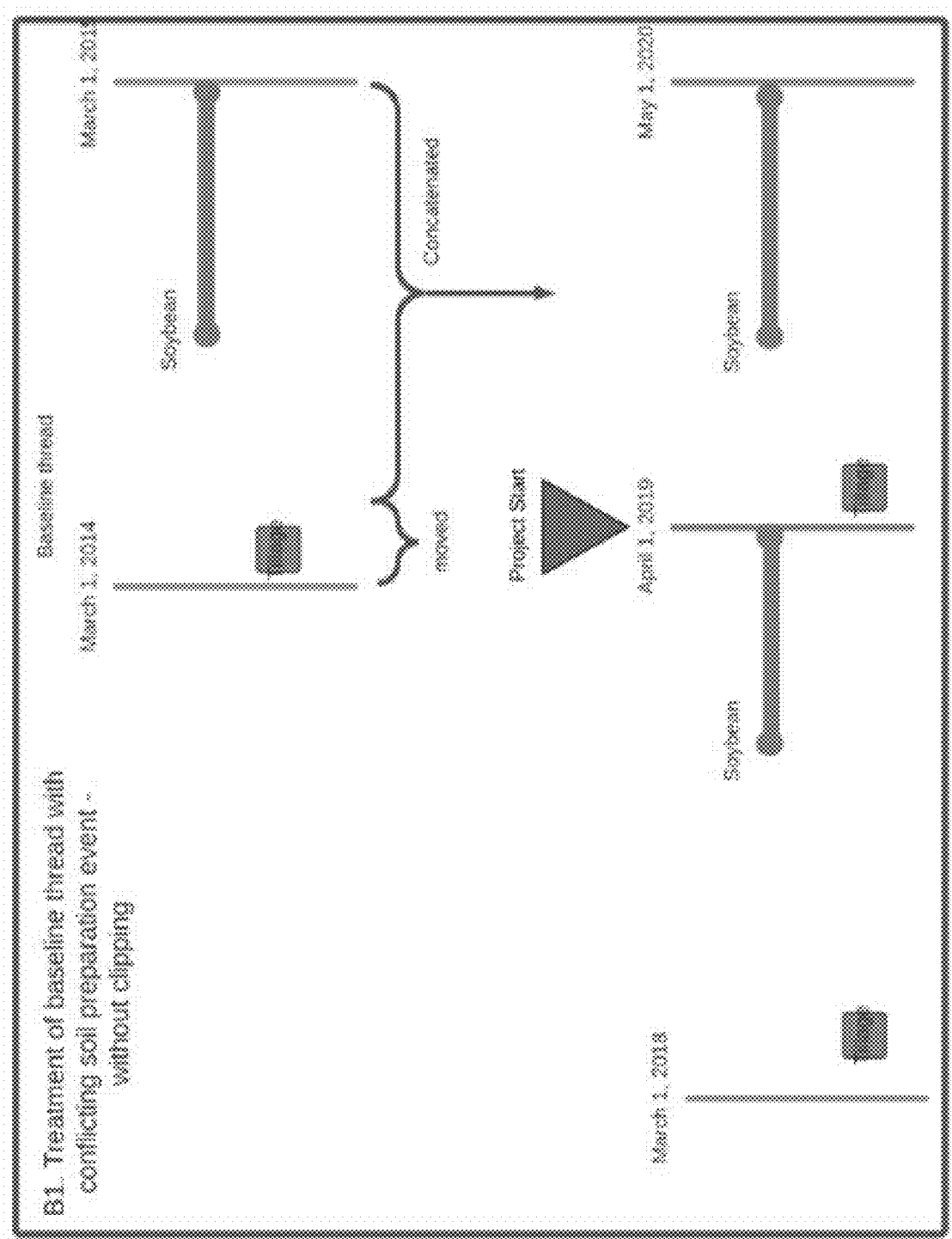

FIGS. 14A-14B illustrate a process for handling historical threads under scenarios of conflicting events.

Figure 15A:
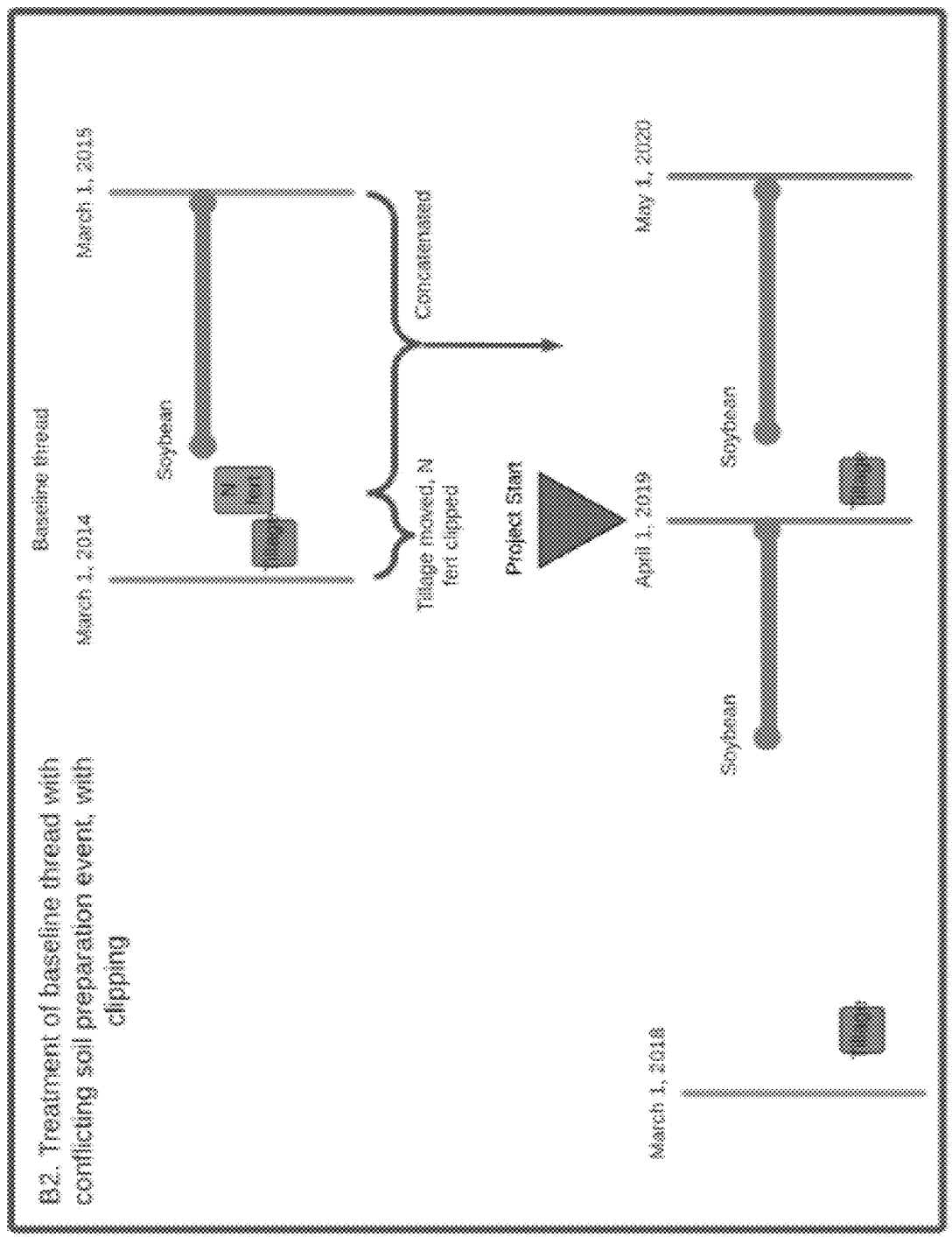
FIGS. 15A-15B illustrate a process for handling historical threads under scenarios where the planting date is seasonally separated according to embodiments of the present disclosure.
Figure 15B:
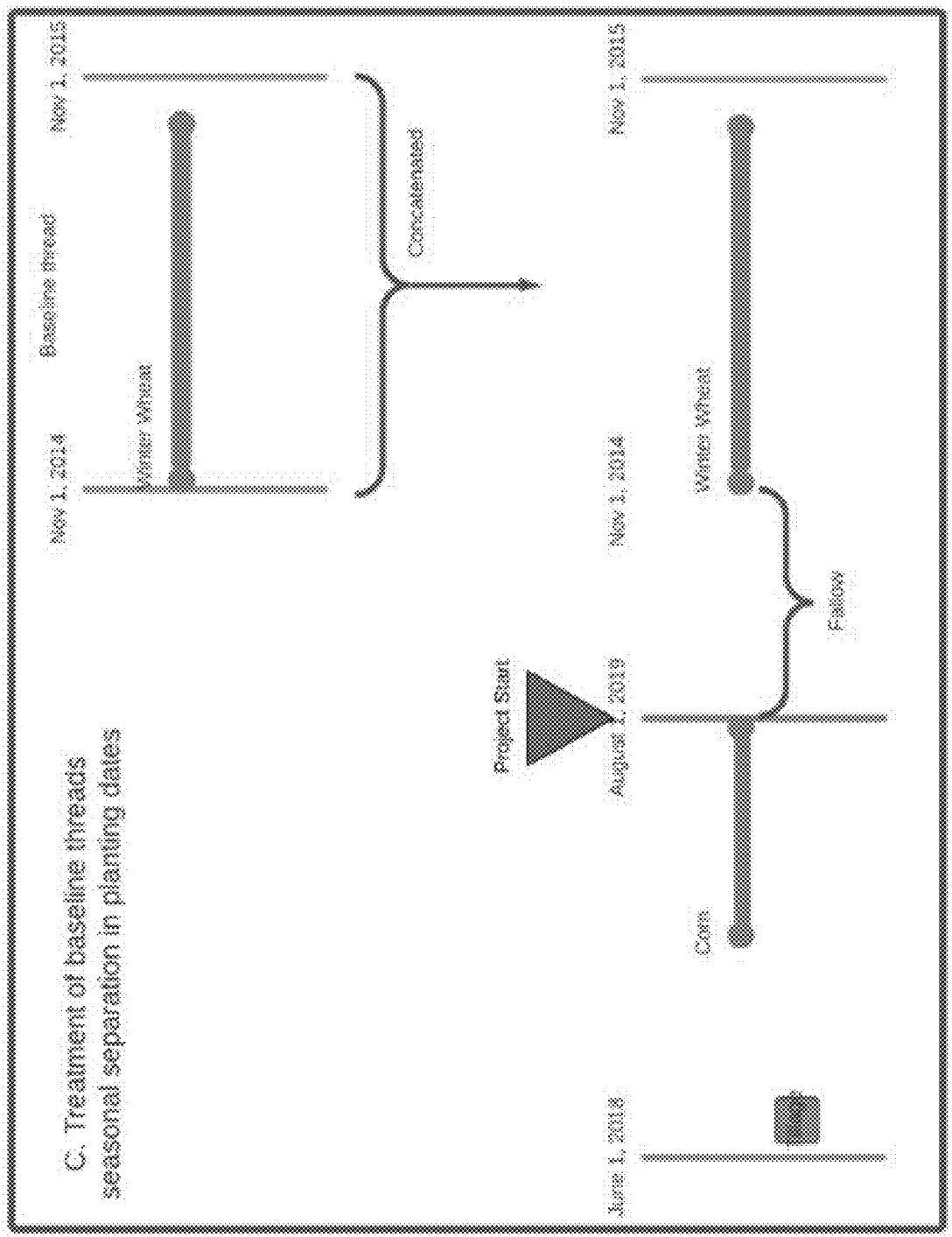

FIGS. 15A-15B illustrate a process for handling historical threads under scenarios where the planting date is seasonally separated.

Figure 16A:
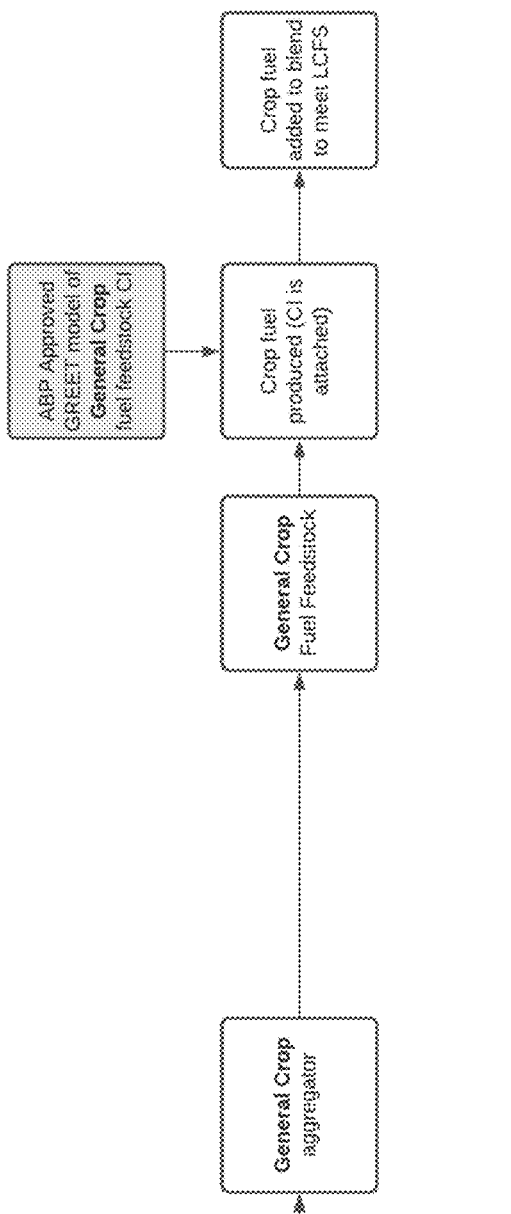
FIGS. 16A-16C illustrate a process to enable growers to apply carbon credits towards a low carbon fuel standard and verify that fields meet regen-certification according to embodiments of the present disclosure.
Figure 16B:
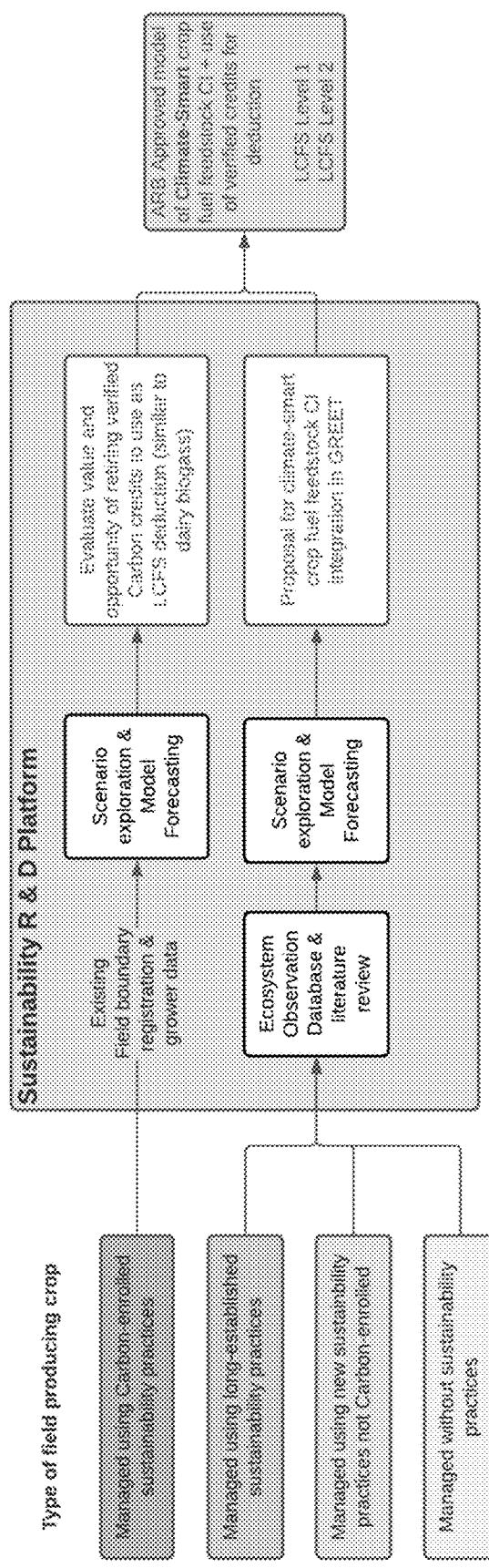
Figure 16C:
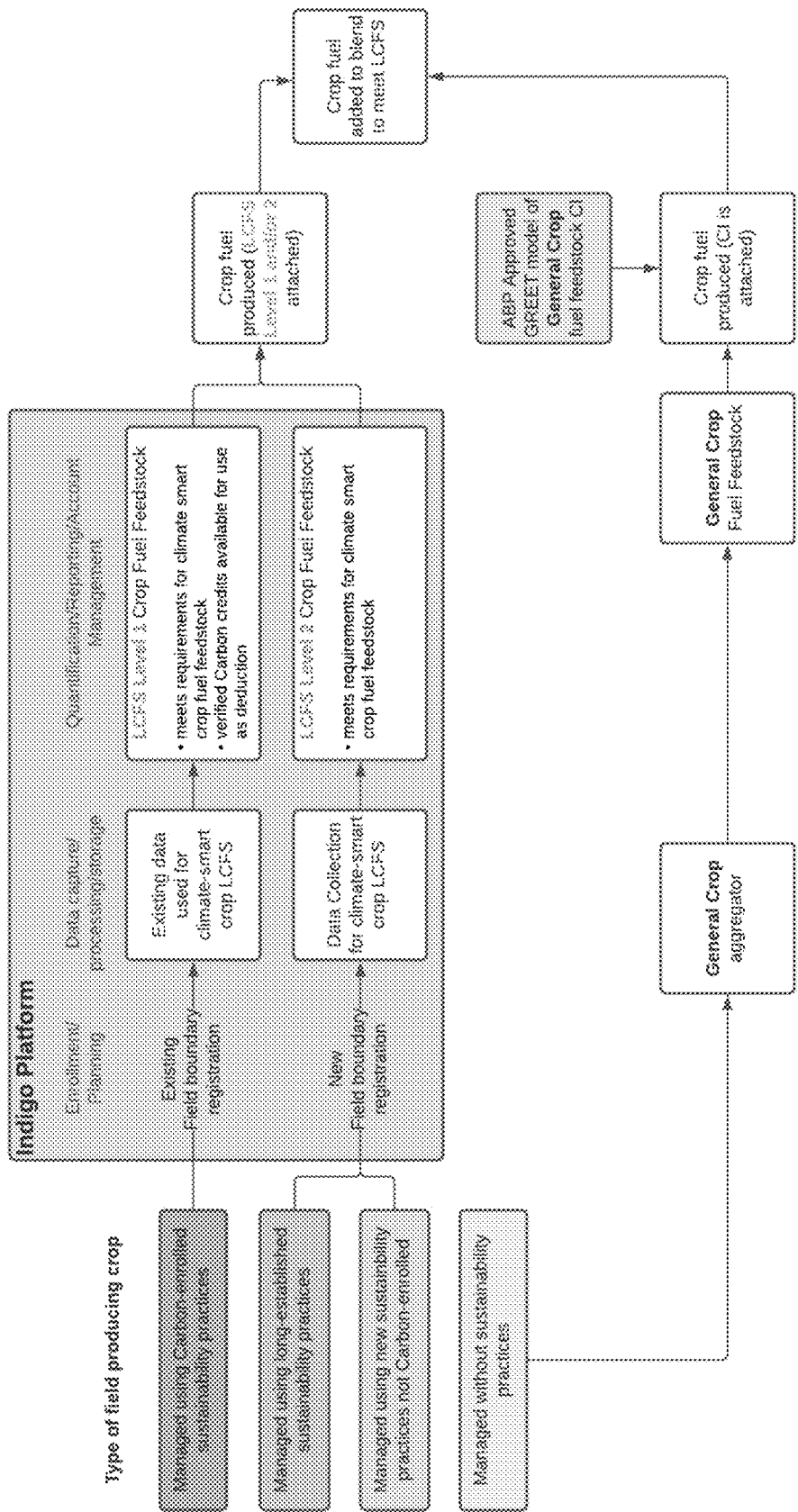

FIGS. 16A-16C illustrate a process to enable growers to apply carbon credits towards a low carbon fuel standard (LCFS) and verify that fields meet regen-certification. LCFS is designed to decrease the carbon intensity of California's transportation fuel pool and provide an increasing range of low-carbon and renewable alternatives, which reduce petroleum dependency and achieve air quality benefits. As shown in FIG. 16A, LCFS currently has no incentive for a crop fuel feedstock to be produced using regenerative practices that may improve the fuel carbon intensity (CI). In various embodiments, as shown in FIG. 16B, various types of fields producing a crop may access a sustainability research and development platform as described herein. For example, the field may be managed using carbon-enrolled sustainability practices, managed using long-established sustainability practices, managed using new sustainability practices not carbon-enrolled, or managed without sustainability practices. In various embodiments, when a field is managed using carbon-enrolled sustainability practices, an existing field boundary registration and grower data may be used. In various embodiments, the system performs scenario exploration and model forecasting, using the modeling described herein. In various embodiments, the system evaluates value and opportunity of retiring verified carbon credits to use as LCFS deduction (similar to dairy biogas). For other fields, the system accesses an ecosystem observation database and performs a literature review.

"Ecosystem observation data" are observed or measured data describing an ecosystem, for example weather data, soil data, remote sensing data, emissions data (for example, emissions data measured by an eddy covariance flux tower), populations of organisms, plant tissue data, and genetic data. In some embodiments, ecosystem observation data are used to connect agricultural activities with ecosystem variables. Ecosystem observation data may include survey data, such as soil survey data (e.g., SSURGO). In various embodiments, the system performs scenario exploration and model forecasting, using the modeling described herein. In various embodiments, the system proposes climate-smart crop fuel feedstock CI integration with an existing model, such as the Greenhouse gases, Regulated Emissions, and Energy use in Technologies Model (GREET), which can be found online at https://greet.es.anl.gov/ (the GREET models are incorporated by reference herein).

In various embodiments, as shown in FIG. 16C, where the field is managed using carbon-enrolled sustainability practices, an existing field boundary registration in the system may be used. In various embodiments, existing data is used for climate-smart crop LCFS. In various embodiments, the system determines LCFS level 1 crop fuel feedstock meets requirements for climate-smart crop fuel feedstock and that verified carbon credits are available for use as a deduction. In various embodiments, where the field is managed using long-established practices or managed using new sustainability practices not carbon-enrolled, new field boundaries are registered with the system using methods as described herein. In various embodiments, the system determines LCFS level 2 crop fuel feedstock meets requirements for climate-smart crop fuel feedstock. In various embodiments, crop fuel produced is verified and LCFS level 1 or level 2 label is attached. In various embodiments, the crop fuel is added to a blend to thereby meet LCFS. In various embodiments, the crop fuel is produced and the carbon intensity (with deduction applied) is linked to the produced fuel. In various embodiments, an ABP approved GREET model of general crop fuel feedstock carbon intensity is applied to the crop fuel produced. Information about the LCFS can be found online at https://ww2.arb.ca.gov/our-work/programs/low-carbon-fuel-standard and is hereby incorporated by reference in its entirety. In various embodiments, LCFS is an ecosystem program that does not require additionally determinations—growers can participate even if they can't meet the additionally or higher data burden of a carbon program.

Remote Sensing Algorithms

Various remote sensing algorithms may be used in connection with embodiments of the present disclosure as discussed further above. Examples are provided in Publication Nos. WO 2021/007352, WO 2021/041666, WO 2021/062147, and WO 2022/020448, which are hereby incorporated by reference and summarized below.

A variety of acronyms are used in this discussion as known in the art. These include CDL (Cropland Data Layer), HLS (Harmonized Landsat Sentinel), SMAP (Soil Moisture Active Passive), NDVI (Normalized Difference Vegetation Index), NDTI (Normalized Difference Tillage Index), SWIR (shortwave infrared), DOY (Day of Year).

The pigment in plant leaves, chlorophyll, strongly absorbs visible light (from 0.4 to 0.7 μm) for use in photosynthesis. The cell structure of the leaves, on the other hand, strongly reflects near-infrared light (from 0.7 to 1.1 μm). The more leaves a plant has, the more these wavelengths of light are affected, respectively. NDVI is calculated from the visible and near-infrared light reflected by vegetation. Healthy vegetation absorbs most of the visible light that hits it, and reflects a large portion of the near-infrared light. Unhealthy or sparse vegetation reflects more visible light and less near-infrared light. Accordingly, the NDVI is computed as near-infrared radiation minus visible radiation divided by near-infrared radiation plus visible radiation, or (NIR−Red)/(NIR+Red).

The NDTI is computed as (SWIR1−SWIR2)/(SWIR1+SWIR2). In exemplary embodiments utilizing Sentinel-2 MSI, Red, NIR, SWIRL and SWIR2 represent bands 4, 8, 11, and 12, respectively. Spectral characteristics of the 2A and 2B sensors onboard the Sentinel-2 satellite are given below.

| | S2A | | S2B | | | |
|---|---|---|---|---|---|---|
| Band Number | Central wavelength (nm) | Band width (nm) | Central wavelength (nm) | Band width (nm) | Spatial resolution (m) | Name |
| 1 | 442.7 | 21 | 442.2 | 21 | 60 | — |
| 2 | 492.4 | 66 | 492.1 | 66 | 10 | Blue |
| 3 | 559.8 | 36 | 559 | 36 | 10 | Green |
| 4 | 664.6 | 31 | 664.9 | 31 | 10 | Red |
| 5 | 704.1 | 15 | 703.8 | 16 | 20 | — |
| 6 | 740.5 | 15 | 739.1 | 15 | 20 | — |
| 7 | 782.8 | 20 | 779.7 | 20 | 20 | — |
| 8 | 832.8 | 106 | 832.9 | 106 | 10 | NIR |
| 8a | 864.7 | 21 | 864 | 22 | 20 | — |
| 9 | 945.1 | 20 | 943.2 | 21 | 60 | — |
| 10 | 1373.5 | 31 | 1376.9 | 30 | 60 | — |
| 11 | 1613.7 | 91 | 1610.4 | 94 | 20 | SWIR1 |
| 12 | 2202.4 | 175 | 2185.7 | 185 | 20 | SWIR2 |

A processing module fetches and processes data from the original source (publicly available remote sensing, weather, crop, and soil moisture data), through a zonal summary engine which performs a spatial reduce step, and finally through the algorithms which generate product outputs.

A tillage algorithm uses statistical inference to determine whether a field has been tilled.

Detecting tillage events with remote sensing relies on an ability to observe residue cover on fields. Fields with residue cover absorb more shortwave infrared (SWIR) radiation than bare soil, with greater absorption at longer SWIR wavelengths. The Normalized Difference Tillage Index (NDTI), which can be calculated with Landsat, Sentinel-2, and MODIS data, among others, can characterize this absorption feature of residue, allowing fields with residue (high NDTI) to be separated from fields with bare soil (low NDTI). However, a number of issues with detecting tillage events with NDTI.

First, NDTI is not sensitive to residue when green vegetation is present. When green vegetation is present on a field, NDTI is no longer sensitive to the amount of residue cover, as healthy green vegetation absorbs strongly in the short wave infrared (SWIR) portion of the spectrum (approximately 1400-3000 nm wavelength). In some embodiments, the methods described here address this by detecting till events when green vegetation cover is low. In some embodiments, by identifying and predicting tillage events during "dormant periods" where at least 2 consecutive observations have NDVI<0.3. In various embodiments, till events are only detected within these dormant periods. In various embodiments, if NDVI jumps above 0.3 for a single observation, then the observation is masked to prevent a single noisy observation from breaking up a dormant period. Dormant periods are optimally at least two weeks (alternatively, at least one month) in length, with calculated dormant periods typically spanning from harvest to planting the following year. If a cover crop is planted, there may be a dormant period on either side of the cover crop. In various embodiments, till events are detected in either or both dormant period.

An additional challenge is NDTI is strongly influenced by soil moisture. As water has strong absorption features in the SWIR bands, NDTI can be significantly influenced by soil moisture. This causes tilled fields with bare soil to resemble fields with high residue cover when fields are wet. In some embodiments, the methods described here address this by using soil moisture estimates from NASA's Soil Moisture Active Passive (SMAP) mission to screen NDTI observations on days when soil moisture is greater than a threshold percentage. In some embodiments, the threshold percentage is greater than 30%, 35%, 40%, 45%, or 50%. SMAP data are available from 2015 to the present at 9 km spatial resolution and a two day temporal frequency (although gaps exist). Once observations with high soil moisture are removed, a field is flagged as too wet to predict in the given year if fewer than two dry observations remain or a gap of more than 100 days between dry observations was created. In various embodiments, a field is considered high moisture is the moisture level is greater than the threshold for more than 75%, 80%, 85%, 90%, 95% of observations during the dormant period or for all observations during the dormant period. In some embodiments, the threshold percentage is equal to or greater than 40% soil moisture. In some embodiments, the threshold percentage is equal to or greater than 40% soil moisture and fields are too wet to predict tillage practices if all of the observations have greater than the threshold percentage of soil moisture. The percentage soil moisture values or "soil moisture scores" are recorded for each dormant period, even where the soil moisture value is less than the threshold value (for example, <40%) as soil moisture values less than the threshold can still influence NDTI. The soil moisture score is recorded for each dormant period and later used to assess the quality of the till/no-till detection.

An additional challenge is atmospheric contamination can resemble a till event. NDTI can decrease and resemble a till event if an observation is contaminated by clouds or other atmospheric effects. While most clouds/noise are removed by preprocessing steps, a number of contaminated observations can remain in the time-series leading to false detection of till events. In some embodiments, the methods described herein screen for contaminated NDTI observations by identifying and removing from further analysis NDTI observations that deviate strongly from both the observation before and after the image (which may be referred to as despiking). Another factor which may be monitored for detecting contaminated observations is that residue cover should not increase in the winter. In another embodiment, the methods described herein screen for contaminated NDTI observations by identifying abrupt increases in NDTI between images, and flagging these observations and or removing then from further analysis. NDTI should only increase in this way following a till event if soil moisture increases. Therefore, if NDTI increases by >0.05 between observations and <5 mm of rain was recorded between observations, we remove the low NDTI observation.

In some embodiments, inputs to the tillage prediction model include NDTI and NDVI. In some embodiments, these indices are prepared by the following steps. Field-level zonal summary time series are generated for NDTI and NDVI. Observations are screened for snow using the Normalized Difference Snow Index (NDSI). Specifically, observations where NDSI is >0 are screened and removed from the analysis. Observations with <85% of available pixels are removed to prevent partially contaminated images from being included. Observations are "despiked", if an image is a spike in either NDVI or NDTI, the image is removed for both.

Inputs to the tillage prediction model also include soil moisture data, precipitation data, and a crop type data layer. Soil moisture data may be obtained, for example, from SMAP. County- or field-level zonal summaries are calculated and interpolated to obtain time series of daily observations. Field-level zonal summary time series are generated for daily observations of precipitation. Field-level zonal summary time series of crop type are generated, for example from the USDA Cropland Data Layer (CDL), which provides annual predictions of crop type.

A "crop type data layer" is a data layer containing a prediction of crop type, for example USDA Cropland Data Layer provides annual predictions of crop type, and a 30 m resolution land cover map is available from MapBiomas (https://mapbiomas.org/en). A crop mask may also be built from satellite-based crop type determination methods, ground observations including survey data or data collected by farm equipment, or combinations of two or more of: an agency or commercially reported crop data layer (e.g. CDL), ground observations, and satellite-based crop type determination methods. Field-level zonal summary time series of crop type are generated.

The tillage prediction model features as described above are shown below in Table 1.

TABLE 1

Tillage prediction model features

| Parameter | Description |
| --- | --- |
| till_class | Binary classification of till vs no till on an annual basis |
| model_type | The model type run. Four exemplary model types are described below: primary, primary_uncalibrated, usda_backup, and global_backup. |
| ndti_min_date | Date on which NDTI was minimum, representing our best estimate of tillage date (but is strongly influenced by observation density) |
| start_date | Annual start date for searching for till events. For all crops besides winter wheat, this corresponds to Sept 1 of the previous year. For winter wheat, it corresponds to May 1 of the previous year. Date windows are determined using the CDL crop label from the previous year, not the current year. |

TABLE 1-continued

Tillage prediction model features

| Parameter | Description |
|---|---|
| end_date | Annual end date for searching for till events. For all crops besides winter wheat, this corresponds to Aug 31 of the target year. For winter wheat, this corresponds to April 31 of the target year |
| period_start | First date of the dormant period. If multiple dormant periods exist, the one with the lowest recorded NDTI is reported, as this period is most likely to have a till event. |
| period_end | Last date of the dormant period |
| num_obs | Total number of clear observations between start_date and end_date |
| max_gap | Maximum gap in days between images. If large gaps exist, a till event might be missed. As January/February typically have low observation density and low probability of till events, gaps during these months are not counted. |
| num_obs_period | Total number of clear observations during dormant period |
| max_gap_period | Maximum gaps in days during dormant period. Again, gaps in January/February are not counted. |
| smap_period | Average soil moisture on observation dates during the dormant period (as a proportion) |
| ndti_min | Minimum NDTI during the dormant period. This is the only input to certain decision tree classifiers, as discussed below. |
| ndti_drop | Difference between minimum NDTI and the 90th percentile of NDTI from 2013-2020. Only dormant period observations are used to calculate. This is a measure of how much NDTI dropped during the dormant period, and is used in the global_backup model, described below. |
| crop_class | CDL class for the previous growing season (used to determine start_date and end_date and which model is applied) |
| data_quality | A data quality flag that incorporates max_gap, max_gap_period, and smap_period (described in Table 2) |
| error_code | If tillage could not be predicted for a given year, an error code is logged for why it could not be predicted (e.g., too few observations, no dormant period, too wet). |

Data quality flags are generated and used as model features. It will be recognized that the flag labels are immaterial and the particular values for features that define each flagged category are approximate and may be modified depending on data availability and model performance. Fields with missing SMAP data may be given alternate data quality scores based solely on max_gap and max_gap_period (Table 2). For example, fields that were missing SMAP but otherwise meet the description of the "Excellent" flag were assigned data_quality=1.5, fields that were missing SMAP but otherwise meet the description of the "Good" flag were assigned data_quality=2.5, fields that were missing SMAP but otherwise meet the description of the "Moderate" flag were assigned data_quality=3.5, and so forth. The data quality flags as described above are shown below in Table 2.

TABLE 2

Data quality flags

| Flag label | Description |
|---|---|
| Excellent (data_quality = 1) | max_gap < 50 days, max_gap_period < 20 days, smap_period < 25% |
| | Alternatively, max_gap < 50 days, max_gap_period < 20 days, smap_period < 35% |
| | Excellent, but missing SMAP (data_quality = 1.5) |
| Good (data_quality = 2) | max_gap < 70 days, max_gap_period < 40 days, smap_period < 30% |
| | Alternatively, max_gap < 70 days, max_gap_period < 40 days, smap_period < 35% |
| | Good, but missing SMAP (data_quality = 2.5) |
| Moderate (data_quality = 3) | max_gap < 90 days, max_gap_period < 60 days, smap_period < 40% |
| | Alternatively, max_gap < 90 days, max_gap_period < 60 days, smap_period < 35% |
| | Moderate, but missing SMAP (data_quality = 3.5) |
| Poor (data_quality = 4) | max_gap < 110 days, max_gap_period < 80 days, smap_period < 40% |
| | Poor, but missing SMAP (data_quality = 4.5) |
| Very Poor (data_quality = 5) | max_gap > 110 days, max_gap_period > 80 days, smap_period > 40% |
| Not predicted (data_quality = 6) | |

In various embodiments, models generate error codes where the input data are insufficient. For example, exemplary error codes and conditions are provided in Table 3.

TABLE 3

Error Codes

| Error Code | Description |
| --- | --- |
| Observation density too low (error_code = 1) | Observation density is low enough that a dormant period might be completely missed |
| Field too green to predict (error_code = 2) | Either no dormant period observed, or the only dormant period was < 1 month |
| Observation density too low during dormant period (error_code = 3) | |
| Soil moisture too high to predict > 40% (error_code = 4) | |

In some embodiments, NDTI from the Harmonized Landsat Sentinel (HLS) dataset are used to classify fields as tilled or not tilled on an annual basis. For fields that are detected as tilled, an estimated tillage date is assigned to the date when NDTI is lowest. In one example, two NDTI features are used to classify fields as tilled or not tilled fields during each year: the minimum NDTI and the difference between the minimum NDTI and the 90th percentile of NDTI from historical data (for example, NDTI from 2013-2020). Only NDTI observations occurring during dormant periods are used to calculate minimum NDTI and the 90th percentile of NDTI. If multiple dormant periods exist in a single year, the dormant period with the lowest NDTI minimum is used. As till events occur between harvest and planting, the annual window for calculating minimum NDTI is set based on harvest and planting practices in the geographic region. For example, the annual window for calculating minimum NDTI for summer crops in North America was set between September 1st of the previous year to August 31st of the current year (e.g., September 2013 to September 2014 for the 2014 product year). The window was shifted to May 1st to April 31st for fields planted with winter wheat in the previous year. In order to determine thresholds for the two model features, thresholds were chosen that maximized accuracy against the field datasets while maintaining high correspondence with state-level adoption rates. This resulted in a decision tree classifier where a field was mapped as tilled if minimum NDTI was <0.05 or the difference between minimum NDTI or the 90th percentile of NDTI was >0.09.

In this example, the tillage prediction module applied to the data described above resulted in greater than 70% accuracy for all models and crops. The model trained for corn, soy, sorghum, and winter wheat was applied correctly predicted tillage practice status (no tillage or conventional tillage) on 319 of 364 corn fields (88%), 152 of 194 soy fields (78%), 46 of 64 winter wheat fields (72%), and 24 of 26 sorghum fields (92%), for an overall accuracy rate of 83%.

In some embodiments, the methods of the present invention can be applied to historical data to generate an estimation of the number of years individual fields have utilized no-till practices.

In various embodiments, different model types can be applied to make a tillage prediction, with the choice of model type determined by data availability for model training. Four particular model types are described below: the primary model, the primary_uncalibrated model, the USDA_backup model, and the global_backup model.

Primary Model

The primary tillage model is a decision tree that is trained at the Crop Management Zone (CMZ) level using field data sources. This model type is applied when two conditions are met: 1) there are sufficient training samples (>50 no-till and >50 tilled samples) across the CMZ and 2) Remote sensing data are available for all fields within the county. Field samples are first split into two groups: no-till samples and till samples.

No-till samples includes fields labelled as no-till that have >50% residue cover. Till samples include fields labelled as conventionally tilled that have <25% residue cover, or fields labeled as minimum tilled that have between 25-50% residue cover.

Within each CMZ, an equal number of training fields is subsampled from each group for model training. As residue cover on cotton fields is lower than other crops, which affects our ability to detect tillage practices with remote sensing, cotton fields were removed before model training. Eventually, when sufficient cotton samples exist, a separate primary tillage model will be constructed for cotton.

Once an equal number of no-till and till samples are selected, the decision tree model is trained on a single feature: min_ndti (See Model Features, above). While min_ndti is typically calculated over the entire dormant period of a field, a shorter time period was required for calculating min_ndti for training fields, as it is possible for the condition of a field to change during the dormant period. For example, a field may have been recorded as no-till at the time of visit on March 15th, but the field was later tilled before planting. If min_ndti was calculated over the full dormant period, min_ndti would capture the till event before planting, and the field would no longer represent a true no-till sample. Therefore, when calculating min_ndti for training fields, the dormant period end date was set to a maximum of two weeks following the field visit, which served as a compromise between obtaining additional remote sensing observations after the visit while limiting the chance that the condition of a field could change.

Inter-annual variability in soil moisture and RS observation density can lead to inter-annual variability in min_ndti, which can decrease prediction accuracy when predictions are made outside of the years used for model training. Therefore, prior to model application, min_ndti is first stabilized across years using county-level statistics. The underlying assumption of the approach is that county-level tillage adoption rates should not change drastically from one year to the next. Therefore, if the entire distribution of min_ndti shifts between years, this shift in the distribution is likely due to external factors influencing min_ndti. The goal of min_ndti stabilization is to remove large shifts in the county-level distribution of min_ndti between years. To accomplish this, min_ndti is first calculated for all fields in a county for each year that will be modeled (typically 2015-Present). Within each year, the 10th and 90th percentile of min_ndti across the county is calculated. The distribution of min_ndti is then scaled within each year until the 10th and 90th percentiles match those from 2020 (the primary year on which models were trained). This process ensures that the range of min_ndti is stabilized across years, while allowing the center of the distribution to vary. These scaling parameters are stored in the model file for each county, allowing the primary model to be applied to arbitrary fields within the county.

Primary Uncalibrated Model

In order to stabilize min_ndti across years, the primary model requires remote sensing data for all fields within a county. Wall-to-wall data is available for 1500 counties across the US, which allows the min_ndti stabilization to be performed for most major crop producing counties. However, if tillage needs to be predicted for a field outside of these 1500 counties, or in counties where there are fewer than 100 fields, this stabilization cannot be performed. Therefore, the primary_uncalibrated model represents the scenario where a decision tree model can be applied (there are sufficient training data within the CMZ), but min_ndti cannot be stabilized first. Therefore, caution should be given to predictions with the primary_uncalibrated model type, especially in early years (2015-2017) where HLS observation density is lower, and min_ndti is less stable.

USDA_backup Model

When there is insufficient training data within a CMZ (<50 no-till fields or <50 tilled fields), but remote sensing data is available for all fields within the county, the USDA_backup is applied. This approach aims to optimize the min_ndti threshold at the county-level in order to achieve a direct match to the no-till rate reported by 2017 USDA Ag Census. Specifically, the min_ndti threshold is iteratively varied for each county, and the % of acres classified as no-till with each threshold is calculated. The threshold that achieves the closest match to the USDA Ag Census is then selected for each county. Using the same approach as the primary model, min_ndti is first stabilized across years before applying the min_ndti threshold to make predictions. However, in this model, the min_ndti range is matched to 2017 (the year of the Ag Census), instead of 2020.

Global_backup Model

When the primary, primary_uncalibrated, and usda_backup model cannot be applied, a global_backup model is applied, which consists of globally defined thresholds. In the global_backupmodel, a field is classified as tilled if min_ndti<0.05 or ndti_drop>0.09. Thresholds for the two model features were chosen which maximized accuracy against the field dataset while maintaining high correspondence with USDA state-level adoption rates in 2017.

Field Data

Two dataset were used for model training/testing (Indigo Fields and Turbo Window Scouting). To prevent overfitting models to the no till fields, an equal sample of till and no till fields were included in model training. It will be appreciated that certain crops may be particularly prone to overfitting, such as soy.

As set forth further above, in one example, two models were trained. A first model was trained for corn, soy, sorghum, and winter wheat, as these crops showed a similar separation in NDTI between no till and till. A separate model was trained for cotton, as NDTI for no till fields was significantly lower than other crops.

Cover Crop Prediction Module

The cover crop algorithm analyzes seasonal time series of vegetation greenness indices, and historical crop type information, to determine whether a cover crop was grown on the field during the dormant season.

Detection of cover crops from satellite remote sensing is largely based on the identification of seasonal changes in greenness beyond expected behavior associated with winter/summer commodity crops. In general, cover crops are most likely prevalent when wintertime greenness is anomalously high and at least one additional peak is detected between harvest and planting. Finally, in order to adjust for regional or interannual differences in winter climate which results in increased weed growth (and, therefore, relative overestimation of cover crop adoption), the Euclidean distance (in greenness) is measured between a given field and other fields of the same crop type within the same county during a single year.

Inputs to the cover crop prediction module include a vegetative index. A vegetative index ("VI") is computed from one or more spectral bands or channels of remote sensing data. Examples include simple ratio vegetation index ("RVI"), perpendicular vegetation index ("PVI"), soil adjusted vegetation index ("SAVI"), atmospherically resistant vegetation index ("ARVI"), soil adjusted atmospherically resistant VI ("SARVI"), difference vegetation index ("DVI"), normalized difference vegetation index ("NDVI"). NDVI is a measure of vegetation greenness which is particularly sensitive to minor increases in surface cover associated with cover crops. To prepare a vegetative index for use in the cover crop prediction module field-level zonal summary time series are generated. Observations with fewer than 5 cloud/snow-free pixels or less than 25% of all available pixels are removed, and time series are "despiked" using an outlier detection method and smoothed, for example using a Savitzky Golay filter.

In some embodiments, an additional input to the cover crop prediction module includes the USDA Cropland Data Layer ("CDL"). CDL provides annual predictions of crop type, which can be used to alter the logic imposed for detecting cover crops on a calendar basis (e.g., winter wheat vs. corn). An additional input to the cover crop prediction module may also include median VI time series across all fields of a given crop type during a single year (the median time series profile, or "median_ts"). In some embodiments, the VI of the median time series profile is NDVI. The median time series profile is preferably assessed when the majority of cover crops are grown in the region, for example between December 1 and August 1 (when a majority of cover crops are grown across the eastern US).

The cover crop prediction model parameters as described above are shown below in Table 4. Time window parameters ("gs_window", "peak_window", "winter_window", and "median_window") are selected according to a priori knowledge of approximate summer and winter crop calendars for the crop type and geographic region of interest. The "threshold_nveg" parameter was defined according to previous phenological research indicating relative NDVI associated with emerging vegetation.

The cover crop prediction model features as described above are shown below in Table 5. A selection of these features are calculated for each field-year using a suite of time series analysis and heuristic methods, as well as the model parameters described above. In an exemplary embodiment, the raw zonal summary observations are first interpolated at daily time resolution using a Savitzky-Golay filter. Signal processing techniques are used to detect peaks in the interpolated time series with sufficient NDVI amplitude. If two or more peaks are detected during "peak_window", the first detected peak is identified as the cover crop peak, while the final peak is identified as the summer crop peak. Phenology metrics ("spr_15_max", "spr_50_max, "sos_cc" and "eos_cc") are then detected based on the timing of percentage thresholds of the normalized amplitude of each of these peaks. It will be appreciated that alternative selections of features may be used, as set forth in further examples below.

The cover crop prediction model classifications as described above are shown below in Table 6. Field-level classifications are made according to a manual decision tree.

TABLE 4

Cover crop prediction model parameters

| Parameter | Description |
|---|---|
| gs_window | window used to calculate maximum gap between cloud-free observations during the growing season (for example, between March 1 and September 1 of each year) |
| peak_window | window used to count seasonal peaks of NDVI (for example, between September 1 of previous and current years; winter wheat is July 15) |
| winter_window | window used to compute wintertime NDVI composite (for example, between November 1 and May 1 for northern hemisphere summer crops; winter wheat is September 1 and March 1) |
| median_window | window used to calculate median VI time series across all geo-ids for each crop type within a county (for example, November 1 and June 1) |
| threshold_nveg | threshold of wintertime NDVI required to detect cover crop (NDVI > 0.3) |
| threshold_max_gap | threshold of maximum gap required to detect cover crop (n > 75 days) |
| threshold_snow_free_obs | threshold of number of wintertime cloud-free observations required to generate wintertime composite (n > 2) |
| threshold_spr_len | threshold of number of days between timing of 15% and 50% of normalized amplitude in spring (n > 30) This is used in cases when NDVI increases due to cover crop emergence but does not decrease due to significant gap in cloud-free images. |
| threshold_spr_halfmax | threshold of number of spring greenups (VI peaks) required to detect cover crops (n > 1) |
| threshold_distance | threshold of euclidean distance (in greenness) between VI time series of geo-id and median VI time series across all fields of same crop type during a given year (NDVI = 2) |
| min_NDVI_threshold | minimum NDVI which is considered vegetation (NDVI = 0.05) Observations with NDVI below min_NDVI_threshold are excluded from the analysis. |
| threshold_proportion_missing | proportion of bad/total observations from a given field zonal summary time series required to run the algorithm (n > 0.001) |
| amp_threshold | amplitude of NDVI peak required to detect a cover crop (NDVI = 0.1) |

TABLE 5

Cover crop prediction model features

| Feature | Description |
|---|---|
| max_gap | maximum gap between cloud-free observations between March 1 and September 1 |
| spr_15_max | day of year when NDVI reaches 15% of the normalized amplitude of the last detected peak during peak_window |
| spr_50_max | day of year when NDVI reaches 50% of the normalized amplitude of the last detected peak during peak_window |
| spr_length | number of days between spr_15_max and spr_50_max |
| spr_halfmax_count | number of greenups during peak_window |
| sos_cc | day of year when NDVI reaches 50% of the normalized amplitude of the increasing side of the first detected peak during peak_window (assumed to be associated with spring emergence of cover crop) |
| eos_cc | day of year when NDVI reaches 50% of the normalized amplitude of the decreasing side of the first detected peak during peak_window (assumed to be associated with termination of cover crop) |

TABLE 5-continued

Cover crop prediction model features

| Feature | Description |
| --- | --- |
| pk_vi_cc | magnitude of NDVI of first detected peak during peak_window |
| distance | euclidean distance between VI time series and median VI time series across all geo-ids of the same crop type during median_window |
| winter_vi_90 | 90th percentile of smoothed NDVI during winter_window |
| winter_vi_10 | 10th percentile of smoothed NDVI during winter_window |
| winter_vi_obs | number of cloud-free observations during winter_window |

TABLE 6

Cover crop prediction model classifications

| Classification | Description |
| --- | --- |
| Not observed (cover_crop_class = 0) | a. Fewer than 3 cloud-free observations during winter_window<br>b. Maximum gap larger than 75 days between cloud-free observations during peak_window |
| No cover crop (cover_crop_class = 1) | a. Fewer than 2 greenups and winter greenness less than a threshold value (for example, winter_vi_90 < 0.3)<br>b. Fewer than 2 greenups, winter greenness greater than a threshold value (for example, winter_vi_90 ≥ 0.3), and spring length less than a threshold number of days (for example, spr_length < 30 days) (likely an early greening summer commodity crop)<br>c. Fewer than 2 greenups and winter wheat CDL |
| Wintergreen cover crop (cover_crop_class = 3) | a. Fewer than 2 greenups, winter greenness greater than a threshold value (for example, winter_vi_90 ≥ 0.3), spring length greater than a threshold number of days (for example, spr_length > 30 days), and not winter wheat CDL<br>Note: winter wheat fields with no cover crops typically had long spring lengths<br>b. At least 2 greenups and winter greenness greater than a threshold value (for example, winter_vi_10 or winter_vi_90 > 0.3)<br>c. Distance ≥ 2 |
| Winterkill cover crop (cover_crop_class = 4) | a. At least 2 greenups and winter greenness less than a threshold value (for example, winter_vi_90 < 0.3)<br>b. Distance ≥ 2 |
| Perennial (cover_crop_class = 5) | a. CDL = 36 (alfalfa), 37 (hay) or 62 (grass/pasture) |
| High uncertainty (cover_crop_class = 6) | a. Any field with Wintergreen/Winterkill/Perennial characteristics and distance < 2 |

In one example, the crop prediction module was applied to a test set of 137 fields having a cover crop label and correctly classified 123 (89.8%) as having cover crops.

In another example, the crop prediction module was applied to a test set of annual crop planting and harvesting information from 2014-2019. The crop prediction module correctly identified presence/absence of cover crops in 297 (73%) of the 408 total field/years. Of the 70 field-years with observed cover crop planting and predicted cover crop absence, 26 experienced greater than 20% negative growing degree day (GDD) anomalies relative to the 2014-2019 average. Removal of these field years increases the overall accuracy to 79%. This phenomenon illustrates the importance of using training data where cover crop was known to have reached mature growth stages.

In another example, the cover crop prediction module was applied to an input data set comprising 2,855 fields. The cover crop prediction module correctly identified presence/absence of cover crops in 2,696 (94.4%) of the fields.

During vegetation growth, the NDVI value will gradually increases, reaches a certain highest value (which is called peak), and then decreases (which resembles a bell shape). Depending on the crop management practice, each field can grow one or multiple crops per year. For the model, the features are created based on the peak development. For each field, there will be features for 3 peaks. If a field has fewer than 3 peaks, all the features will be equal to 0. If a field has more than 3 peaks, only the first 3 peaks' features will be chosen.

For each peak, the following are detected: (1) the timing of inflection the inflection point between the current and previous peak (sos_start), (2) the timing of 15%, 50% and 85% of normalized amplitude during the increasing (sos_15, sos_50 and sos_85) and decreasing (eos_15, eos_50 and eos_85) portions of the peak and (3) the timing of inflection point between the current and subsequent peak (eos_end). Using these dates, the following features are computed, which are used to train a decision tree classifier: the NDVI value within the time period as noted in the table; boundary date features; and rate of NDVI change between first and third quantile for start of season/end of season. Boundary date features are calculated in days. The boundary date is set at August 1st of the previous year to the date where the maximum NDVI happens in the current year of the observation.

TABLE 7

Decision Tree Features

| Classification | Description |
|---|---|
| sos_quant_1 | 90th percentile NDVI between sos_start and sos_15 |
| sos_quant_2 | 90th percentile NDVI between sos_15 and sos_50 |
| sos_quant_3 | 90th percentile NDVI between sos_50 and sos_85 |
| eos_quant_1 | 90th percentile NDVI between eos_85 and eos_50 |
| eos_quant_2 | 90th percentile NDVI between eos_50 and eos_15 |
| eos_quant_3 | 90th percentile NDVI between eos_15 and eos_end |
| sos_halfmax | difference in days between boundary date and sos_50 |
| eos_halfmax | difference in days between eos_50 and boundary_date |
| sos_rate_change | (sos_quant_3 − sos_quant_1)/# of days between sos_15_date and sos_85_date |
| eos_rate_change | (eos_quant_3 − eos_quant_1)/# of days between eos_15_date and eos_85_date |

In an exemplary embodiment, three type of models were evaluated: Random Forest Classifier, k-nearest neighbor algorithm, and XGBoost Classifier. Random Forest Classifier offers the most consistent performance across all the zones. However, XGBoost Classifier allows a more flexible approach regarding customized loss function.

Since each zone has different crop management practices and different class ratio among training data, the model is trained within each zone. Instead of having a set of fixed parameters, each model was trained using GridSearchCV method with customized scoring (scores is based on: accuracy, recall_weighted, precision_weighted). This method eliminates unnecessary manual changes in parameters when switching between zones.

Besides keeping some parameters as default, the below parameters list is evaluated by GridSearchCV to find the most suitable parameter for each zone is: {'n_estimators': [100, 150,200], 'max_depth':[13, 15, 17], 'min_samples_split': [3, 5], 'min_impurity_decrease': [0.01, 0.001], 'min_samples_leaf':[1, 3], 'max_features':['auto','log 2', None], 'class_weight': ['balanced_subsample'], 'bootstrap': [False]}

The model classify 3 classes: None/Weeds (label as 0), Cover Crop (label as 1), Other Crop (label as 2).

Regenerative Practice Module

Outcomes of a regenerative practice prediction (e.g. module can be aggregated to generate regenerative practice reports. The scalable methods of the present disclosure can be scaled to generate predictions for cover crop and no-till acres for geographic regions, for example for every state or province in a country or one or more agricultural districts in a county. A geographic region may be any area having a defined boundary, including an administratively defined boundary such as a city, county, state, or production region (for example, USDA production region), a boundary estimated from analysis of remote sensing imagery (for example, a field boundary), or a user defined boundary (for example, field or farm boundary including as defined in shape file). For example, the methods of the present invention include, in some embodiments, additional steps of estimating the total percentage of farming acres utilizing regenerative practices (e.g. tillage practices, and cover crops).

Embodiments of disclosed methods may also include tracking changes in utilization of regenerative practices over time. In one example, methods of the present disclosure were applied to historical and present data for farmland in the United States. These results predicted that cover crop acreage peaked in 2017 in the United States at 19.8M acres and steeply dropped in 2018 to 14M acres. A similar peak and steep decline was reported for all agricultural districts producing at least 10M bushels of corn and soybeans with estimates of 6.7M acres (5.3%) of cover crops in 2017 and 3.3M acres (2.6%) in 2018, a 50% decrease in acreage year-over-year. In the same region, it was estimated that annual cover crop adoption rates for corn, soybeans and small grains grew from 2.6% to 2.9% from 2018 and 2019, a 400 k acreage increase.

In some embodiments, locations predicted to utilizing one or more regenerative practice (e.g. cover crops or no- or low-tillage practices) are displayed on a map and summarized by geographic region.

Methods of the present disclosure may also be used to assess the relative health of regenerative and conventionally grown crops. For example, methods of the present disclosure were used to identify fields for employing cover crop and no-till practices for 2 or more years between 2016-2019 and at planted with least 3 crop types between 2013-2018 ("Regenerative Profile 1"), and Non-Regenerative Profile 1 fields defined as 0 years cover crops, 0 years no-till, and less than 3 crop types during the same period.

In an additional example methods of the present disclosure were used to identify fields employing cover crops for 2 or more years ("Regenerative Profile 2"), and Non-Regenerative Profile 2 fields defined as 0 years cover crops.

In some embodiments, methods of the present disclosure are used to predict effects of environmental disturbances (for example, flooding) on crop production (for example, risk of crop loss), crop health, and crop management practices (for example, planting and replanting).

In some embodiments, a map displaying a representation of regenerative practice utilization is displayed within a user interface of a client device such as a cell phone or personal computer. In some embodiments, a map representation of predicted regenerative practices is displayed within a user interface based on the user's proximity to a location displayed on the map, for example as identified by a GPS on the user's mobile device. In some embodiments, application of a regenerative practice prediction module to one or more fields is triggered by receiving a notification from a user's mobile device that the user is within a specified distance of the one or more fields. A user interface may also comprise a prompt requesting user input to confirm presence or absence of one or more regenerative practices at a map location. In some embodiments, the user interface displays directions to one or more map locations. In other embodiments, application of a regenerative practice prediction module to a geographic region, triggers a request for user confirmation of presence or absence of one or more regenerative practices to be automatically sent to one or more user's mobile devices. In some instances, the one or more users are selected based on their proximity to a field within the geographic region.

As set forth above, various embodiments employ certain classifiers. It will be appreciated that while the above examples describe certain classifiers, additional classifiers are suitable for use according to the present disclosure. Suitable alternative classifiers include random decision forests, linear classifiers, support vector machines (SVM), or neural networks such as recurrent neural networks (RNN). In some embodiments, the classifier is pre-trained using training data. In some embodiments training data is retrospective data. In some embodiments, the retrospective data is stored in a data store. In some embodiments, the learning system may be additionally trained through manual curation of previously generated outputs.

The UN's Food and Agriculture Organization reports that irrigated agriculture accounts for 20 percent of the world's cultivated land and 40% of the produced food, with 324 MM hectares equipped for irrigation and 275 MM actually irrigated. Despite its prevalence, mapping irrigation at high resolution is challenging due to limited data availability and aggregation to large administrative regions, limiting its utility for field-scale analyses.

Summaries of irrigation practices are made available publicly by the USDA, but these summaries are based on manual data collection, and so lack comprehensive coverage, lack field-specific data, data, and are not necessarily up to date. Moreover, no datasets of field or sub-field level irrigated land is available over the continental US.

Accordingly, there is a need for automated and timely determination of irrigation at high enough resolution to enable field level analysis. The present disclosure provides for automated prediction and display of irrigation practices from medium to high resolution ($\leq$30 m scale) remote sensing imagery, for example using the Harmonized Landsat Sentinel (HLS) sensor. In general, resolution on the order of tens of meters is considered medium resolution, while resolution on the order of meters is considered high resolution.

As set out below, the present disclosure enables pixel level mapping of remote sensing imagery. When combined with field delineation, the methods set out herein enable field-level mapping. By training a model on field-level irrigation labels across multiple years and irrigation equipment, a robust approach is developed suitable for medium to high spatial resolutions. In various embodiments, a boosted tree approach is employed, which minimizes overfitting and increase interpretability. This enables the irrigation layer created by the model to be used for field-level and sub-field level decision making, in addition to making aggregated summaries. Although various examples are provided herein in terms of HLS, it will be appreciated that the methods described herein are applicable to multiple data sources with various temporal frequencies. Moreover, while various examples are provided with respect to seasonal prediction, it will be appreciated that the in-season (e.g., monthly) models may be trained, allowing more detailed predictions.

In alternative approaches, other satellite data sets may be used. For example, Landsat may be used in place of HLS (which is only available since 2016). However, Landsat lacks the high temporal frequency of HLS and so is less suited for in-season predictions. In addition, HLS merges the information from two satellites, Landsat and Sentinel 2. The calibration and corrections applied result in a high quality product, in particular with respect to (NIR). Similarly, using aggregated annual data precludes conclusions on in-season irrigation status.

In other alternative approaches, training data are based on regional aggregations of center pivots over large regions (like states or counties). Such approaches are useful for regional aggregation, but do not provide the precision necessary to provide field or subfield-level irrigation estimates.

Irrigation data are used to determine ground truth labels for the training of a classifier. In an exemplary embodiment, three years of proprietary irrigation data (2016-2019) over corn, cotton, and soybean fields farmed in the U.S. were transformed into ground truth labels. Features are extracted from remote sensing data (such as the Harmonized Landsat Sentinel-2 (HLS) product) and combined with weather data (for example, from the gridMET dataset).

In various embodiments, the remote sensing data is processed to determine one or more indices for each point in time for which data is available at each pixel of the input rasters from remote sensing data. In some embodiments, surface reflectance images (e.g., from HLS) are processed to create a three-band product consisting of normalized difference vegetation index (NDVI), land surface water index (LSWI), and mean brightness (BRT). These three indices represent the three principal axes of variability of optical data, and may be referred to as greenness, wetness, and brightness. In the example shown, each of three indices contains a plurality of snapshots in time. Each snapshot is a raster, or image, whose pixel intensity indicates the index value.

In alternative embodiments, different indices are selected, resulting in a different number of bands. For example, in some embodiments, the brightness band described above is omitted. Brightness, greenness, and wetness are generally the most dominant modes of variability for optical remote sensing bands. However, it will be appreciated that a variety of different combinations of bands and specific computation of bands may be used for field delineation according to the present disclosure. For example, Enhanced Vegetation Index (EVI) or EVI2 may be used in place of NDVI.

Remote sensing data may be available on an irregular schedule, for example due to orbital periods of satellites within a given constellation. The HLS source images are provided irregularly in time, and may contain gaps which propagate into the indices. To address this variability, in some embodiments, the index images are composited within pre-specified time windows, enabling delivery of a small number of high-value variables for use in the downstream algorithms. It will be appreciated that various techniques may be used to composite the source images prior to index computation. However, compositing the index images is advantageous as it reduces noise and lowers the dimensionality of the problem, thereby enabling more efficient computation.

In some embodiments, the predetermined time windows correspond to phases of the growing season (phenology periods). In some embodiments, the time windows correspond to the early growing season, the mid-season, and the late growing season for a given crop. In an exemplary embodiment, a first window spans April and May, a second window spans June and July, and a third window spans August and September. It will be appreciated that these exemplary windows are calibrated to spring crops in the continental United States. Time windows may be shifted for use in different geographies depending on weather events or farming practices (such as crop rotation and irrigation practices). Time windows may be consecutive (for example, for most spring crops in the continental US) or non-consecutive (for example for winter crops such as winter wheat). Winter crops such as winter wheat may be covered with snow for many months between planting and harvest. During this dormancy period, where the crop is covered by snow, the reflective indices captured might not be relevant to the model, while earlier or later time windows would be more informative for the methods disclosed herein.

In various embodiments, compositing comprises performing a temporal linear interpolation to reduce potential bias from having the distribution of measurements in time significantly different for different places. In some such embodiments, linear interpolation is performed between available observations, which due to clouds and overpass constraints, may not be evenly distributed in time. After interpolation, for each pixel, the average in time within a window is taken. In an exemplary embodiment in which three indices are assessed over three time windows, the result is a nine band (3 indices×3 windows) image stack.

It will be appreciated that the above process may be performed for a global data set, or only for certain areas of interest. In some embodiments, the resulting image stack is downsampled to a predetermined resolution in order to limit the overall storage size necessary to maintain the image stacks. In some embodiments, the target resolution is 0.15 degrees. This resolution allows for storage of a global dataset while providing sufficient resolution for further downstream processing.

In an exemplary embodiment, the above process is applied to HLS to derive composite images of vegetation and water indices at a 30 m spatial resolution for early-, middle- and late-growing-season time periods, which correspond to the phenology windows of spring crops in the continental US. In this exemplary embodiment, NDVI, EVI2, Brightness, and NDWI indices are used. However, as set out herein, alternative indices may be used in various embodiments.

A similar process is applied to weather data in order to determine one or more values for each point in time for which data is available in weather data. In some embodiments, weather data comprises rasters, with weather values provided for each pixel. In some embodiments, weather data comprises data aggregated over a larger region, such as a county. In embodiments where data is provided over regions such as counties, subsampling is applied to arrive at a raster, either prior to compositing, or afterwards. In some embodiments, cumulated precipitation (e.g., precipitation in millimeters, abbreviated PMM) and growing degree days (GDD) are processed to create a two-band product. In some embodiments, an average, such as a ten-year average makes up an additional band. In the example shown, each of three values contains a plurality of snapshots in time. Each snapshot contains either regional information, or a raster whose pixel intensity indicates the magnitude of the value. In addition to PMM and GDD, alternative embodiments may include additional or substitute weather data, such as Palmer Drought Severity Index (PDSI), evaporation, or other indices known in the art.

In some embodiments, images are composited within pre-specified time windows, enabling delivery of a small number of high-value variables for use in the downstream algorithms. In some embodiments, the predetermined time windows correspond to phases of the growing season (phenology periods). In some embodiments, the time windows correspond to the early growing season, the mid-season, and the late growing season for a given crop. In an exemplary embodiment, a first window spans April and May, a second window spans June and July, and a third window spans August and September. It will be appreciated that these windows are suitable for spring crops in the continental US, and would be redefined for use in other geographies and other crops (e.g., winter crops).

In various embodiments, compositing comprises performing a temporal linear interpolation to reduce potential bias from having the distribution of measurements in time significantly different for different places. In some such embodiments, linear interpolation is performed between available observations. After interpolation, for each pixel or region, the average in time within a window is taken. In an exemplary embodiment in which three values are assessed over three time windows, the result is a nine band (3 indices×3 windows) image stack.

It will be appreciated that the above process may be performed for a global data set, or only for certain areas of interest. In some embodiments, the resulting image stack is downsampled to a predetermined resolution in order to limit the overall storage size necessary to maintain the image stacks. In some embodiments, the target resolution is 0.15 degrees. This resolution allows for storage of a global dataset while providing sufficient resolution for further downstream processing.

In an exemplary embodiment, the above process is applied to GridMet data to determine two-month composites of cumulated precipitation and growing degree days (GDD) and ten-year averages. In an exemplary embodiment, 30 m spatial resolution composites are determined for early-, middle- and late-growing-season time periods, which correspond to the phenology windows of spring crops in the continental US. These weather data serve as both a proxy for geography and as a complement to the information contained in the HLS-based water index.

In various embodiments, crop type labels are used to filter composites to only pixels containing crops of interest, yielding filtered composites. In an exemplary embodiment, crop type labels are drawn from the NASS Cropland Data Layer (CDL). This layer may be referred to as a crop mask. For 2008-2018, the CDL data may be used for the year in question. For years prior to 2008, an alternating rotation of crops is assumed, and thus 2008's map is used for 2006 and 2004 and 2009's map is used for 2007, 2005 and 2003. This serves as the best proxy for what would have been. For the current year, 2019, the 2017 CDL is used to build the crop mask. However, this may be replaced in-season with a mask built from satellite-based crop type determination methods. In an exemplary embodiment, the NASS Cropland Data Layer (CDL) is used to filter images for corn, cotton, and soybean pixels for a given year.

Classifier is trained using the pixels in filtered raters and ground truth labels to predict irrigation status.

In some embodiments, the classifier is a random decision forest. However, it will be appreciated that a variety of other classifiers are suitable for use according to the present disclosure, including linear classifiers, support vector machines (SVM), or neural networks such as recurrent neural networks (RNN).

Suitable artificial neural networks include but are not limited to a feedforward neural network, a radial basis function network, a self-organizing map, learning vector quantization, a recurrent neural network, a Hopfield network, a Boltzmann machine, an echo state network, long short term memory, a bi-directional recurrent neural network, a hierarchical recurrent neural network, a stochastic neural network, a modular neural network, an associative neural network, a deep neural network, a deep belief network, a convolutional neural networks, a convolutional deep belief network, a large memory storage and retrieval neural network, a deep Boltzmann machine, a deep stacking network, a tensor deep stacking network, a spike and slab restricted Boltzmann machine, a compound hierarchical-deep model, a deep coding network, a multilayer kernel machine, or a deep Q-network.

In various embodiments, the learning system employs Extreme Gradient Boosting (XGBoost) for predicting county scale yields. This algorithm is employed in various embodiments because: 1) its tree-based structure can handle the non-linear relationships between predictors and outcomes and 2) it automatically captures interactions among features well, so they do not need to be pre-computed. Additionally, XGBoost is computationally efficient relative to similar machine learning methods.

Once trained, classifier predicts irrigation status on a pixel level based on input rasters, which allows for the creation of large-scale irrigation maps without requiring field boundaries. When field boundaries are available, the pixel-level predictions can be aggregated to field-level predictions. In some embodiments, field predictions are determined via a voting procedure, yielding a field-level prediction with an immediate, and interpretable uncertainty. In some embodiments, the number of pixels classified as irrigated are counted, and then compared to predetermined ratio to determine whether a field should be classified as irrigated. In some embodiments, a ratio of 0.2 or less is considered not irrigated, while a ratio of 0.8 or higher is considered irrigated. However, it will be appreciated that a variety of ratios may be used in various embodiments, for example, not-irrigated ratios of 0.1, 0.2, 0.3, 0.4, 0.5, or irrigated ratios of 0.5, 0.6, 0.7, 0.8, or 0.9. Pixel-level predictions are also valuable for their ability to respond to subfield variability.

As set out herein, in various embodiments, field irrigation mapping takes advantage of both the HLS medium resolution satellite imagery and the automated field delineation product to generate yearly maps of irrigated and dryland spring crops fields. Aggregating the pixel-level model predictions to field-level allows display of the uncertainty surrounding the estimation of the irrigation status. In addition, the model may be trained over multiple years and is agnostic to the geography, which makes it transferable to a global application.

In some embodiments, separate models are constructed on a rolling basis. That is, the models are updated as new data become available (e.g., from day to day). Thus, in some embodiments a daily, independent model approach is adopted. Independent daily models capture the varying importance and relevance of features as the season progresses.

A method of generating an irrigation map is provided. Initially, irrigation labels are collected to serve as training data. Each field within a training region is labeled with a binary value indicating whether irrigation is present. In some embodiment, to fill gaps in data availability, it is assumed that irrigation is present for all years of a training set if present for any of those years. The fields are filtered to those having crops of similar phenology stages. While the crop type itself is not used for training the model, the integrity of the training set requires that the crops in the training set are going through similar growth stages at the same time. For example, the vegetation indices of corn and soy in June in Iowa will be similar as these crops are in early stages of emergence, but winter wheat in the same region and time period would be starting to senesce prior to harvest. Polygons are generated for fields containing irrigation.

Pixel-level remote sensing data are collected. Composites are determined for predetermined time periods (e.g., 2-month periods reflecting growth stage) and predetermined indices (e.g., brightness (reflectance), vegetation (NDVI, EVI2), wetness (NDWI)) derived from raw remote sensing data.

Weather data is collected. In some embodiments, weather data is available at a regional level, such as a county. Composites are determined for predetermined time periods (e.g., 2-month periods reflecting growth stage) and predetermined values (e.g., cumulative precipitation (PMM) and growing degree days (GDD)). The irrigation labels and/or weather data are sub sampled to generate pixel level data from regional data.

A model is trained using a Boosted Tree classification algorithm (for example, an XGBoost Classifier or Gradient Boosted Machine Classifier). In various embodiments, the model is trained on pixel level data. Using pixel level data increases the number of samples fed into the model.

The trained model is applied to naïve data to determine outputs prediction of irrigation status at the pixel level. Post-processing is performed. In some embodiments, post-processing comprises field-level smoothing of predictions. In particular, noisy model output is smoothed using field shape files. The proportion of pixel-level positive predictions within a field provide a measure of uncertainty in the field-level label assignment.

Figure 17:
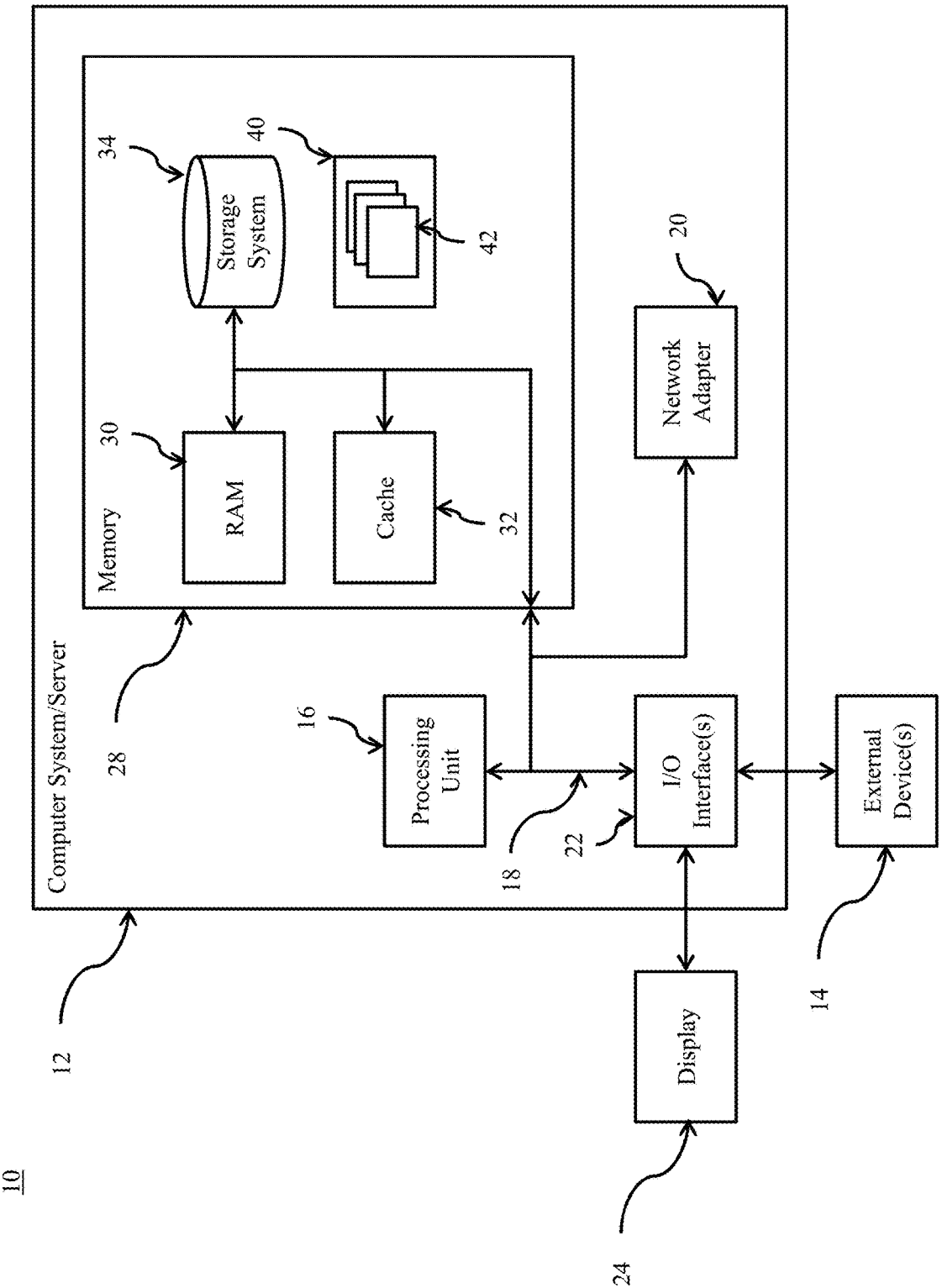
FIG. 17 depicts a computing node according to an embodiment of the present disclosure.

Referring now to FIG. 17, a schematic of an example of a computing node is shown. Computing node 10 is only one example of a suitable computing node and is not intended to suggest any limitation as to the scope of use or functionality of embodiments described herein. Regardless, computing node 10 is capable of being implemented and/or performing any of the functionality set forth hereinabove.

In computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 17, computer system/server 12 in computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus, Peripheral Component Interconnect Express (PCIe), and Advanced Microcontroller Bus Architecture (AMBA).

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the disclosure.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

The present disclosure may be embodied as a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
    receiving, at a computing node, field data comprising geospatial boundaries of one or more field;
    accessing, by the computing node, one or more methodology;
    for each of the one or more fields, accessing, by the computing node, one or more farming practice, wherein each farming practice comprises a location and time;
    determining, by the computing node, one or more farming practice that is missing or non-compliant;
    accessing, by the computing node, remote sensing data and, optionally, historical farming practice data;
    applying, by the computing node, a trained machine learning model to the remote sensing data and, optionally, historical farming practice data, to generate an estimate of the one or more missing or non-compliant farming practice;
    updating the one or more farming practice with the estimate of the one or more missing or non-compliant farming practice;
    generating, by the computing node, for each of the one or more fields, for each crop production period, an ecosystem attribute by applying one or more ecosystem attribute quantification methods to each spatially and temporally unique set of one or more updated farming practices; and
    optimizing, by the computing node, selection of one or more program for each field based on a set of selected programs being compatible within the field and production period,
    wherein optimization is based on one or more of: maximizing a beneficial change in an ecosystem attribute, maximizing permanence of an ecosystem attribute, reducing a permanence risk of an ecosystem attribute, maximizing a benefit to plant health, maximizing a benefit to soil health, reducing uncertainty in a quantification of an ecosystem attribute, and maximizing the overall ecosystem impact for the field.

2. The computer-implemented method of claim 1, further comprising:
    accessing a field boundary for each of the one or more fields, wherein the accessed field boundary is a proposed field boundary,
    reading one or more boundary validation criteria,
    validating the proposed field boundary against the one or more boundary validation criteria, and
    generating a revised boundary based on the proposed field boundary and the validation criteria.

3. The computer-implemented method of claim 2, wherein validating the proposed field boundary against the one or more boundary validation criteria comprises:
    defining one or more boundaries of ineligible areas, wherein the ineligible areas at least partially overlap with an area within field boundary, and
    generating a revised boundary of the area within field boundary minus the ineligible area.

4. The computer-implemented method of claim 2, wherein validating the proposed field boundary against the one or more boundary validation criteria comprises:
   accessing remote sensing data corresponding to the field area;
   using one or more computer vision or machine learning algorithms to detect one or more of: land use type one or more structure, a number of years of agricultural production, and wetlands; and
   applying the one or more boundary validation criteria to the remote sensing derived values.

5. The computer-implemented method of claim 1, wherein the accessed one or more farm practices comprise at least one farm practice that meets an additionally requirement of a methodology, wherein accessing at least one farming practice meeting an additionally requirement automatically triggers a verification program.

6. The computer-implemented method of claim 1, wherein accessing one or more farming practice comprises applying a validation program comprising one or more of:
   confirming each farming practice is within a range of permitted values, wherein the range of permitted values is a confidence interval determined based on: one or more characteristic of the management event type inferred from remote sensing data, historical farming practice data, or combinations thereof.

7. The computer-implemented method of claim 1, further comprising:
   determining one or more farming practice of the field is missing or non-compliant;
   accessing historical farm practices of a plurality of fields within the same geographic regions as the field; and
   appending the most frequent value for the missing or non-compliant farming practice based on the historical farm practices data for the geographic region to the data record for the field.

8. The computer-implemented method of claim 1, wherein accessing one or more farming practice comprises:
   accessing geospatial boundaries corresponding to one or more region where one or more farming practice is applied or avoided; and
   determining one or more management zones based on the accessed farming practice boundaries, wherein determining the one or more management zone comprises dividing the field area into non-overlapping spatial regions co-extensive with the field area, wherein regions having identical farming practices are considered a single management zone.

9. The computer-implemented method of claim 1, wherein accessing one or more farming practice comprises:
   accessing geospatial boundaries corresponding to one or more region where one or more farming practice is applied or avoided;
   determining one or more management zones based on the accessed farming practice boundaries, wherein determining the one or more management zone comprises:
      sequentially intersecting a geospatial boundary defining a contiguous region wherein management zones are being determined with each farming practice boundary occurring within that contiguous region, wherein each of the sequential intersection operations creates two branches: one with the intersection of the geometries and one with the difference, wherein this process is repeated for all farming practice boundaries that occurred in the geospatial boundary defining the contiguous region, wherein the final set of leaf nodes in this branching process define the geospatial extent of the set of management zones within the contiguous region, wherein each management zone is non-overlapping and each individual management zone contains a unique set of farming practices relative to any other management zone within the contiguous region.

10. The computer-implemented method of claim 1, wherein generating the ecosystem attribute further comprises:
    quantifying ecosystem attribute uncertainty using a frequentist statistical method, a Bayesian statistical method, or other statistical method.

11. The computer-implemented method of claim 1, wherein generating the ecosystem attribute further comprises generating a baseline ecosystem attribute comprising:
    for each spatially and temporally unique set of one or more farming practices generating a spatially coextensive counterfactual set of farming practices wherein at least one of the farming practices has not been applied or avoided within the geographic region; and
    generating a baseline ecosystem attribute by applying the one or more ecosystem attribute quantification methods to the spatially coextensive counterfactual set of farming practices.

12. The computer-implemented method of claim 1, wherein generating the ecosystem attribute further comprises generating a baseline ecosystem attribute comprising:
    for each spatially and temporally unique set of one or more farming practices; and
    generating a baseline ecosystem attribute by applying one or more ecosystem attribute quantification methods to a spatially coextensive set of farming practices applied or avoided during a different production period.

13. The computer-implemented method of claim 1, wherein generating the ecosystem attribute further comprises generating a baseline ecosystem attribute comprising:
    accessing remote sensing data comprising a plurality of fields within the geographic region;
    applying a machine learning model to the remote sensing data of the plurality of fields to determine field-level farming practice combinations and their co-occurrence probabilities;
    applying the one or more ecosystem attribute quantification methods to the ecosystem observation data and field-level farming practice combinations; and
    generating a baseline ecosystem attribute by weighing the ecosystem attributes of the field-level farming practice combinations by the co-occurrence probability of that practice combination within the geographic region.

14. The computer-implemented method of claim 1, further comprising immutably recording in a ledger of one or more of: a field boundary; a management zone boundary; validated and verified farm practice data; a permanence value; an uncertainty; one or more ecosystem attribute; a methodology; a version number of a methodology; an ecosystem attribute quantification method; a version number of a model; a model parameter set; or a model input data, wherein the ledger is a blockchain ledger.

15. The computer-implemented method of claim 1, wherein generating an ecosystem attribute by applying one or more ecosystem attribute quantification methods, comprises generating an ecosystem attribute for both a set of farming practices that has been applied or avoided, and also for at least one set of farming practices comprising at least one farming practice that has not yet been applied or avoided.

16. The computer-implemented method of claim 15, wherein an improvement in one or more ecosystem attribute based on inclusion of a farming practice that had not yet been applied or avoided, triggers automatic evaluation of current or prior program enrollment for compatibility with the at least one farming practice that has not yet been applied or avoided and the ecosystem quantification method.

17. The computer-implemented method of claim 15, wherein an optimized recommendation of one or more farming practice to apply or avoid is based on an improvement in one or more ecosystem attribute based on inclusion of a farming practice that had not yet been applied or avoided in the ecosystem attribute quantification.

18. The computer-implemented method of claim 17, wherein the optimization is further based on one or more of: minimizing requirements for future management events, minimizing current or future data collection requirements, maximizing long or short term financial incentives for the user, minimizing a cost of implementation, and providing a desired cash flow profile.

* * * * *